US009428695B2

(12) United States Patent
Narayanaswamy et al.

(10) Patent No.: US 9,428,695 B2
(45) Date of Patent: *Aug. 30, 2016

(54) CONVERSION OF PLASTICS TO OLEFIN AND AROMATIC PRODUCTS WITH PRODUCT RECYCLE

(71) Applicant: Saudi Basic Industries Corporation, Riyadh (SA)

(72) Inventors: Ravichander Narayanaswamy, Bangalore (IN); Krishna Kumar Ramamurthy, Bangalore (IN); P. S. Sreenivasan, Bangalore (IN)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 57 days.

This patent is subject to a terminal disclaimer.

(21) Appl. No.: 13/764,932

(22) Filed: Feb. 12, 2013

(65) Prior Publication Data

US 2014/0228606 A1    Aug. 14, 2014

(51) Int. Cl.
*C10G 1/10* (2006.01)
*C10G 1/08* (2006.01)
(Continued)

(52) U.S. Cl.
CPC ............... *C10G 1/10* (2013.01); *B01J 29/005* (2013.01); *B01J 29/40* (2013.01); *B01J 29/80* (2013.01);
(Continued)

(58) Field of Classification Search
CPC ............. C07C 4/00; C07C 4/02; C07C 4/06; C07C 11/00; C07C 11/02; C07C 11/04; C07C 11/06; C10G 1/00; C10G 1/10; C10G 51/00; C10G 51/02; C10G 51/023; C10G 51/026; C10G 51/04; C10G 57/00; C10G 55/02; C10G 55/04; C10G 55/06; C10G 65/00; C10G 65/10; C10G 65/12; C10G 69/00; C10G 69/02; C10G 69/04; C10G 69/06

USPC ....... 585/240, 241, 317, 319, 324, 329, 330, 585/408, 410, 648, 650, 651
See application file for complete search history.

(56) References Cited

U.S. PATENT DOCUMENTS

| 4,746,406 A | 5/1988 | Timmann |
| 4,851,601 A | 7/1989 | Fukuda |

(Continued)

FOREIGN PATENT DOCUMENTS

| CA | 1050956 | 3/1979 |
| CN | 1246510 | 3/2000 |

(Continued)

OTHER PUBLICATIONS

Manos et al., Catalytic degradation of high-density polyethylene over different zeolitic structures, Ind. Eng. Chem. Res. 2000, vol. 39, pp. 1198-1202.*

(Continued)

*Primary Examiner* — In Suk Bullock
*Assistant Examiner* — Philip Louie
(74) *Attorney, Agent, or Firm* — Paul I. Herman; Grady K. Bergen; Griggs Bergen LLP

(57) ABSTRACT

A method of producing olefins and aromatic compounds from a feedstock is accomplished by introducing a hydrocarbon feedstock and a catalyst composition within a reactor. At least a portion of the reactor is at a reactor temperature of from 470° C. to 730° C. The catalyst composition is comprised of a fluidized catalytic cracking (FCC) catalyst and a ZSM-5 zeolite catalyst, wherein the amount of ZSM-5 zeolite catalyst makes up from greater than 0 wt. % of the total weight of the FCC catalyst and the ZSM-5 zeolite catalyst. At least a portion of the feedstock is converted to products of at least one of olefins and aromatic compounds within the reactor, with at least some of the products being contained in a liquid product stream. At least a portion of the liquid product stream is directed to different downstream processes to increase production of at least one of olefins and aromatic compounds.

20 Claims, 16 Drawing Sheets

(51) Int. Cl.

| | | |
|---|---|---|
| *B01J 29/80* | (2006.01) | |
| *B01J 29/40* | (2006.01) | |
| *C10G 69/04* | (2006.01) | |
| *C10G 69/08* | (2006.01) | |
| *C10G 11/18* | (2006.01) | |
| *B01J 29/00* | (2006.01) | |
| *B01J 38/12* | (2006.01) | |
| *B01J 29/03* | (2006.01) | |
| *B01J 29/08* | (2006.01) | |
| *B01J 29/18* | (2006.01) | |
| *B01J 29/82* | (2006.01) | |
| *B01J 29/90* | (2006.01) | |

(52) U.S. Cl.
CPC .............. *C10G 11/18* (2013.01); *C10G 69/04* (2013.01); *C10G 69/08* (2013.01); *B01J 29/0308* (2013.01); *B01J 29/08* (2013.01); *B01J 29/18* (2013.01); *B01J 29/82* (2013.01); *B01J 29/90* (2013.01); *B01J 38/12* (2013.01); *B01J 2229/42* (2013.01); *C10G 2400/30* (2013.01)

(56) References Cited

U.S. PATENT DOCUMENTS

| | | | |
|---|---|---|---|
| 4,871,426 A | 10/1989 | Lechert | |
| 4,941,952 A | 7/1990 | Betz | |
| 5,079,385 A | 1/1992 | Wu | |
| 5,136,117 A | 8/1992 | Paisley | |
| 5,354,930 A | 10/1994 | Atkins | |
| 5,364,995 A | 11/1994 | Kirkwood | |
| 5,447,622 A | 9/1995 | Kerby et al. | |
| 5,464,800 A * | 11/1995 | Galperin et al. | 502/66 |
| 5,481,052 A | 1/1996 | Hardman | |
| 5,744,668 A | 4/1998 | Zhou | |
| 5,821,395 A | 10/1998 | Price | |
| 6,143,940 A * | 11/2000 | Miller et al. | 585/240 |
| 6,797,155 B1 | 9/2004 | Chester et al. | |
| 6,866,830 B2 | 3/2005 | Kwak | |
| 7,122,493 B2 | 10/2006 | Ou et al. | |
| 7,932,424 B2 | 4/2011 | Fujimoto | |
| 7,976,696 B2 | 7/2011 | Ying | |
| 7,981,273 B2 | 7/2011 | Nicholas | |
| 8,007,663 B2 | 8/2011 | Ying | |
| 8,008,223 B2 | 8/2011 | Garcia-Martinez | |
| 2005/0239634 A1 | 10/2005 | Ying | |
| 2007/0083071 A1 | 4/2007 | Choi et al. | |
| 2007/0173673 A1 | 7/2007 | Fujimoto | |
| 2008/0035528 A1 | 2/2008 | Marker | |
| 2009/0227823 A1 | 9/2009 | Huber | |
| 2010/0210782 A1 | 8/2010 | Fader | |
| 2010/0212215 A1 | 8/2010 | Agblevor | |
| 2011/0127193 A1 | 6/2011 | Xie | |
| 2011/0154720 A1 | 6/2011 | Bartek | |
| 2011/0163002 A1 | 7/2011 | White | |
| 2011/0166397 A1 | 7/2011 | Fujimoto | |
| 2011/0178347 A1 | 7/2011 | Feugnet | |
| 2011/0207979 A1 | 8/2011 | Kim | |
| 2011/0207984 A1 | 8/2011 | Almeida | |
| 2012/0203042 A1* | 8/2012 | Huber et al. | 585/241 |
| 2012/0215043 A1 | 8/2012 | Gaffney | |
| 2013/0204054 A1* | 8/2013 | Bartek et al. | 585/240 |

FOREIGN PATENT DOCUMENTS

| | | |
|---|---|---|
| CN | 1462790 | 12/2003 |
| DE | 4329434 A1 | 3/1995 |
| DE | 4417386 A1 | 3/1995 |
| DE | 4413093 A1 | 11/1995 |
| EP | 124716 A2 | 11/1984 |
| EP | 297408 A2 | 1/1989 |
| EP | 502618 A1 | 9/1992 |
| EP | 659867 A2 | 6/1995 |
| EP | 2027918 A1 | 2/2005 |
| EP | 2334759 A1 | 6/2011 |
| EP | 2351820 A2 | 8/2011 |
| EP | 2364342 A1 | 9/2011 |
| JP | 57121093 A | 7/1982 |
| JP | 57209988 A | 12/1982 |
| JP | 9221681 A | 8/1997 |
| JP | 2000095894 A | 4/2000 |
| JP | 2001316517 A | 11/2001 |
| JP | 2002088375 A | 3/2002 |
| JP | 2002121318 A | 4/2002 |
| JP | 2003105125 A | 4/2003 |
| JP | 2003119472 A | 4/2003 |
| JP | 2003654858 B2 | 6/2005 |
| JP | 2005154510 A | 6/2005 |
| JP | 2005154517 A | 6/2005 |
| TW | 265174 B | 11/2006 |
| TW | 200720329 A | 6/2007 |
| WO | 8700082 | 1/1987 |
| WO | 9424228 A1 | 10/1994 |
| WO | 9718892 A1 | 5/1997 |
| WO | 00/66656 A1 | 11/2000 |
| WO | 0066656 A1 | 11/2000 |
| WO | 0105908 A1 | 1/2001 |
| WO | 03010258 A1 | 2/2003 |
| WO | 03012009 A1 | 2/2003 |
| WO | 2005061673 | 7/2005 |
| WO | 2005094990 A1 | 10/2005 |
| WO | 200786348 A1 | 8/2007 |
| WO | 2008126040 A2 | 10/2008 |
| WO | 2011103026 A1 | 8/2011 |
| WO | 2011103697 A1 | 9/2011 |
| WO | 2011115785 A1 | 9/2011 |

OTHER PUBLICATIONS

International Search Report in counterpart International Application No. PCT/IB2013/060827, May 26, 2014, pp. 1-4, received from International Searching Authority.

Written Opinion of the International Searching Authority for counterpart International App. No. PCT/IB2013/060827, May 26, 2014, pp. 1-5, received from International Searching Authority.

Grittner N., et al, Fluid bed pyrolysis of anhydride-hardened epoxy resins and polyether-polyurethane by the Hamburg process, Journal of Analytical and Applied Pyrolysis, Jun. 1993, 293-299, vol. 25 (Abstract only).

W. Kaminsky, et al, Fluidized Bed Pyrolysis of Oil Sand and Oil Shale, German Chemical Engineering, 1983, 306-311, vol. 6—Issue 5 (Abstract only).

W. Kaminsky, Pyrolysis of plastic waste and scrap tyres in a fluid bed reactor, Resource Recovery and Conservation, 1980, 205-216, vol. 5—Issue 3 (Abstract only).

W. Kaminsky, et al, Industrial prototypes for the pyrolysis of used tyres and waste plastic materials, Chem. Ingenieur Techn, 1979, 419-429, vol. 51—Issue 5 (Abstract only).

W. Kaminsky, et al, Pyrolysis of Plastics Wastes and Used Tyres in a Fluidised Bed Reactor, Kunstst Ger Plast, 1978, 14-17, vol. 68—Issue 5 (Abstract only).

H. Sinn, et al, Production of Chemical Raw Materials from Plastics Waste and Wastetires by Means of Pyrolysis, Dechema Monogr, 1976, 1616-1638, vol. 80 (Abstract only).

H. Sinn, et al, Processing of synthetic material residues and used tyres to give chemical raw materials, especially by pyrolysis, Angewandte Chemie, 1976, 737-750, vol. 88—Issue 22 (Abstract only).

W. Kaminsky, et al, Recycling of plastics, Conservation and Recycling, 1976, 91-110, vol. 1—Issue 1 (Abstract only).

J.-S. Kim, et al, Recycling of a fraction of municipal plastic wastes depleted in chlorine for a feedstock in a steam cracker, Polymer Recycling, 1997, 55-59, vol. 3—Issue 1 (Abstract only).

T. Bhasker, et al, Effect of polyethylene terephthalate (PET) on the pyrolysis of brominated flame retardant-containing high-impact polystyrene (HIPS-Br), Journal of Material Cycles and Waste Management, Nov. 2010, 332-340, vol. 12—Issue 4 (Abstract only).

(56) References Cited

OTHER PUBLICATIONS

N. Miskolczi, et al, Thermogravimetric analysis and pyrolysis kinetic study of Malaysian refuse derived fuels, Journal of the Energy Institute, 2010, 125-132, vol. 83—Issue 3 (Abstract only).
I.F. Elbaba, et al, Quantification of polybrominated diphenyl ethers in oil produced by pyrolysis of flame retarded plastic, Journal of the Energy Institute, 2008, 158-163, vol. 81—Issue 3 (Abstract only).
W.J. Hall, et al, Pyrolysis of waste electrical and electronic equipment: Effect of antinomy trioxide on the pyrolysis of styrenic polymers, Environmental Technology, 2007, 1045-1054, vol. 28—Issue 9 (Abstract only).
R. Marsh, et al, Thermal degradation of polyethylene film materials due to successive recycling, Journal of Mechanical Engineering Science, 2006, 1099-1108, vol. 220—Issue 8 (Abstract only).
P.T. Williams, et al, Recovery of value-added products from the pyrolytic recycling of glass-fibre-reinforced composite plastic waste, Journal of the Energy Institute, 2005, 51-61, vol. 78—Issues 2 (Abstract only).
A.M. Cunliffe, et al, Recycling of composite plastics in construction and demolition waste by pyrolysis, Proceedings of the International Conference on Sustainable Waste Management and Recycling: Construction Demolition Waste, 2004, 341-348 (Abstract only).
A.M. Cunliffe, et al, Pyrolysis of flame retardant brominated polyester composites, Environmental Technology, 2004, 1349-1356, vol. 25—Issue 12 (Abstract only).
Paul T. Williams, et al, Hydrocarbon gases and oils from the recycling of polystyrene waste by catalytic pyrolysis, International Journal of Energy Research, 2004, 31-44, vol. 28—Issue 1 (Abstract only).
Paul T. Williams, et al, Recovery of fibres, fuels and chemicals from the pyrolysis of fibre reinforced composite plastic waste, Proceedings of the International Symposium, 2003, 127-136, Recycling and Reuse of Waste Materials (Abstract only).
Paul T. Williams, Recycling tricky materials using pyrolysis, Materials World, 2003, 24-36, vol. 11 Issue 7 (Abstract only).
R. Bagri, et al, Fluidised-bed catalytic pyrolysis of polystyrene, Journal of the Institute of Energy, 2002, 117-123, vol. 75 (Abstract only).
R. Bagri, et al, Composition of products from the catalytic pyrolysis of plastics, Proceedings of the TMS Fall Extraction and Processing Conference, 1999, 357-366, vol. 1 (Abstract only).
Paul T. Williams, et al, Product composition from the fast pyrolysis of polystyrene, Environmental Technology, 1999, 1109-1118, vol. 20 Issue 11 (Abstract only).
Paul T. Williams, et al, Recycling plastic waste by pyrolysis, Journal of the Institute of Energy, 1998, 81-93, vol. 71 (Abstract only).
E.A. Williams, et al, The pyrolysis of individual plastics and a plastic mixture in a fixed bed reactor, Journal of Chemical Technology and Biotechnology, 1997, 9-20, vol. 70 Issue 1 (Abstract only).
Paul T. Williams, et al, Polycyclic aromatic hydrocarbons in polystyrene derived pyrolysis oil, Journal of Analytical and Applied Pyrolysis, 1993, 325-334, vol. 25 C (Abstract only).
Paul T. Williams, et al, Pyrolysis of municipal solid waste, Journal of the Institute of Energy, 1992, 192-200, vol. 65 (Abstract only).
Y.H. Lin, et al, Catalytic degradation of high density polyethylene over mesoporous and microporous catalysts in a fluidised-bed reactor, Polymer Degradation and Stability, 2004, 121-128, vol. 86, Department of Chemical Engineering, Kao Yung Institute of Technology, Taiwan, Republic of China.
Y.H. Lin, et al, Deactivation of US-Y zeolite by coke formation during the catalytic pyrolysis of high density polyethylene, Thermochimica Acta, 1997, 45-50, vol. 294, Environmental Technology Centre, Department of Chemical Engineering, Manchester, UK.
Y. H. Lin, et al, Catalytic pyrolysis of polyolefin waste into valuable hydrocarbons over reused catalyst from refinery FCC units, applied Catalysis A: General, 2007,132-139, vol. 328, Department of Chemical and Biochemical Engineering, Kao Yuan University, Kaohsiung, Taiwan, ROC.

Hung-Ta Lin, et al, Hydrocarbons fuels produced by catalytic pyrolysis of hospital plastic wastes in a fluidizing cracking process, Fuel Process Technology, 2010, Department of Dentistry, Cathay General Hospital, Taipei, Taiwan.
Y. H. Lin, et al, Production of valuable hydrocarbons by catalytic degradation of a mixture of post-consumer plastic waste in a fluidized-bed reactor, Polymer Degradation and Stability, 2009, 1924-1931, vol. 94 Department of Chemical and Biochemical Engineering, Kaohsiung, Taiwan, ROC.
Y. H. Lin, et al, Tertiary Recycling of Commingled Polymer Waste Over Commercial FCC Equilibrium Catalysts for Producing Hydrocarbons, Polymer Degradation and Stability, 2009, 25-33, vol. 94, Department of Chemical and Biochemical Engineering, Kao Yuan University, Kaohsiung, Taiwan, ROC.
Y. H. Lin, et al, Acid-Catalyzed Conversion of Chlorinated Plastic Waste Into Valuable Hydrocarbons Over Post-Use Commercial FCC Catalysts, Journal of Analytical and Applied Pyrolysis, 2010, 154-162, vol. 87, Deparment of Chemical and Biochemical Engineering, Kao Yuan University, Kaohsiung, Taiwan, TOC.
Y. H. Lin, et al, A Combined Kinetic and Mechanistic Modelling of the Catalytic Degradation of Polymers, Journal of Molecular Catalysis, 2001, 143-151, vol. 171, R&D Department, Kaohsiung Chemistry, Taiwan, Republic of China.
T. T. Wei, et al, Chemical Recycling of Post-Consumer Polymer Waste Over Fluidizing Cracking Catalysts for Producing Chemical and Hydrocarbon Fuels, Resources, Conservation and Recycling, 2010, 952-961, vol. 54, Department of Chemical and Biochemical Engineering, Kao Yuan University, Kaohsiung, Taiwan, ROC.
Y. H. Lin, et al, Tertiary Recycling of Polyethylene Waste by Fluidised-bed Reactions in the Presence of Various Cracking Catalysts, Journal of Analytical and Applied Pyrolysis, 2008, 101-109, vol. 83, Department of Chemical and Biochemical Engineering, Kao Yuan University, Taiwan, Republic of China.
I.F. Elbaba, et al, Catalytic Pyrolysis-Gasification of Waste Tire and Tire Elastomers for Hydrogen Production, Energy Fuels, 2010, 3928-3935, vol. 24.
G. Elordi, et al, Product Distribution Modelling in the Thermal Pyrolysis of High Density Polyethylene, Journal of Hazardous Materials, 2007, 708-714, vol. 144.
G. Elordi, et al, Role of Pore Structure in the Deactivation of Zeolites by Coke in the Pyrolysis of Polyethylene in a Conical Spouted Bed Reactor, Applied Catalysts B: Environmental, 2011, 224-231, vol. 102.
E. A. Williams, et al, Analysis of Products Derived From the Fast Pyrolysis of Plastic Waste, Journal of Analytical and Applied Pyrolysis, 1997, 347-363, vol. 40-41.
W. J. Hall, et al, Analysis of Products from the Pyrolysis of Plastics Recovered from the Commercial Scale Recycling of Waste Electrical and Electronic Equipment, Journal of Analytical and Applied Pyrolysis, 2007, 375-386, vol. 79.
P.T. Williams, et al, Analysis of Products from the Pyrolysis and Liquefaction of Single Plastics and Waste Plastic Mixtures, Conservation and Recycling, 2007, 754-769, vol. 51, Resources.
C. Wu, et al, A Novel Ni—Mg—Al—CaO Catalyst with the Dual Functions of Catalysis and CO2 Sorption for H2 Production from the Pyrolysis-Gasification of Polypropylene, Fuel, 2010, 1435-1441, vol. 89.
C. Wu,, et al, Ni/CeO2/ZSM-5 Catalysts for the Production of Hydrogen from the Pyrolysis-Gasification of Polypropylene, International Journal of Hydrogen Energy, 2009, 6242-6252, vol. 34.
A.M. Cunliffe, et al, Characterisation of Products from the Recycling of Glass Fibre Reinforced Polyester Waste by Pyrolysis, Fuel, 2003, 2223-2230, vol. 82.
W. Kaminsky, Chemical Recycling of Mixed Plastics by Pyrolysis, Advances in Polymer Technology, 1995, 337-344, vol. 14 No. 4.
J.A. Onwudili, et al, Composition of Products from the Pyrolysis of Polyethylene and Polystyrene in a Closed Batch Reactor: Effects of Temperature and Residence Time, Journal of Analytical and Applied Pyrolysis, 2009, 293-303, vol. 86.
N.M.M. Mitan, et al, Effect of Decabromodiphenyl Ether and Antimony Trioxide on Controlled Pyrolysis of High-Impact Polystyrene Mixed with Polyolefins, Chemosphere, 2008, 1073-1079, vol. 72.

(56) References Cited

OTHER PUBLICATIONS

T. Bhaskar, et al, Controlled Pyrolysis of Polyethylene/Polypropylene/Polystyrene Mixed Plastics with High Impact Polystyrene Containing Flame Retardant: Effect of Decabromo Diphenylethane (DDE), Polymer Degradation and Stability, 2007, 211-221, vol. 92.
W. Kaminsky, et al., Pyrolysis of plastics waste and old pneumatic tyres in a fluidization reactor, Materiaux Techn.,1978, pp. 146-153, vol. 66, No. 4.
W. Kaminsky, et al.,Raw Materials by Fluidized Bed Pyrolysis of Plastic Wastes and Other Hydrocarbon Containing Materials, Materials and Energy from Refuse, 1981, pp. 9.93-9.100.
W. Kaminsky, et al., Oil and Gas Recovery From Plastics and Sewage Sludge by Pyrolysis in a Fluidized Bed, American Chemical Society, Polymer Preprints, Division of Polymer Chemistry, 1983, p. 438, vol. 24, No. 2.
A.B. Ross, et al, Development of Pyrolysis—GC with Selective Detection: Coupling of Pyrolysis—GC to Atomic Emission Detection (py-GC-AED), Journal of Analytical and Applied Pyrolysis, 2001, 371-385, vol. 58-59.
W. J. Hall, et al, Fast Pyrolysis of Halogenated Plastics Recovered from Waste Computers, Energy & Fuels, 2006, 1536-1549, vol. 20.
W. Kaminsky, et al, Feedstock Recycling of Polymers by Pyrolysis in a Fluidised Bed, Polymer Degradation and Stability, 2004, 1045-1050, vol. 85.
W. Kaminsky, Feedstock Recycling by Pyrolysis in a Fluidized Bed, Institute for Technical and Macromolecular Chemistry University of Hamburg, Hamburg, Germany.
W.J. Hall, et al, Thermal Processing of Toxic Flame-Retarded Polymers Using a Waste Fluidized Catalytic Cracker (FCC) Catalyst, Energy & Fuels, 2008, 1691-1697, vol. 22, Leeds, United Kingdom.
Paul T. Williams, et al, Fluidised Bed Pyrolysis of Low Density Polyethylene to Produce Petrochemical Feedstock, Journal of Analytical and Applied Pyrolysis, 1999, 107-126, vol. 51 Department of Fuel and Energy, Leeds, United Kingdom.
C. Wu, et al, Hydrogen Production by Steam Gasification of Polypropylene with Various Nickel Catalysts, Applied Catalysis B: Environmental, 2009, 152-161, vol. 87, Energy & Resources Research Institute, Leeds, United Kingdom.
Walter Kaminsky, et al, Catalytical and Thermal Pyrolysis of Polyolefins, Journal of Analytical and Applied Pyrolysis, 2007, 368-374, vol. 79, University of Hamburg, Institute of Technical and Macromolecular Chemistry, Hamburg, Germany.
J. Mertinkat, et al, Cracking Catalysts Used as Fluidized Bed Material in the Hamburg Pyrolysis Process, Journal of Analytical and Applied Pyrolysis, 1999, 87-95, vol. 49, University of Hamburg, Institute of Technical and Macromolecular Chemistry, Hamburg, Germany.
M. Predel, et al, Pyrolysis of Mixed Polyolefins in a Fluidised-Bed Reactor and on a Pyro-GC/MS to Yield Aliphatic Waxes, 2000, 373-385, vol. 70, Institute of Technical and Macromolecular Chemistry, University of Hamburg, Hamburg, Germany.
W. Kaminsky, et al, Olefins from Polyoflefins and Mixed Plastics by Pyrolysis, Journal of Analytical and Applied Pyrolysis, 1995, 19-27, vol. 32, University of Hamburg, Institute for Technical and Macromolecular Chemistry, Hamburg, Germany.
Gorka Elordi, et al, Products Yields and Compositions in the Continuous Pyrolysis of High-Density Polyethylene in a Conical Spouted Bed Reactor, Industrial & Engineering Chemistry Research, Department of Chemical Engineering, Bilbao, Spain.
C. Wu, et al, Hydrogen Production from the Pyrolysis-Gasification of Polypropylene: Influence of Steam Flow Rate, Carrier Gas Flow Rate and Gasification Temperature, Energy Fuels, 2009, 5055-5061, vol. 23, Energy and Resources Research Institute, Leeds, United Kingdom.
M. Olazar, et al, Influence of FCC Catalyst Steaming on HDPE Pyrolsis Product Distribution, Journal of Analytical and Applied Pyrolysis, 2009, 359-365, vol. 85, University of Basque Country, Bilbao, Spain.
A. Lopez, et al, Influence of Time and Temperature on Pyrolysis of Plastic Wastes in a Semi-Batch Reactor, Chemical Engineering Journal, 2011, 62-71, vol. 173, Chemical and Environmental Department, School of Engineering of Bilbao, Bilbao, Spain.
Paul T. Williams, et al, Interaction of Plastics in Mixed-Plastics Pyrolysis, Energy & Fuels, 1999, 188-196, Department of Fuel and Energy, The University of Leeds, Leeds, United Kingdom.
C. Wu, et al, Investigation of Ni—Al, Ni—Mg—Al and Ni—Cu—Al Catalysts for Hydrogen Production from Pyrolysis-Gasification of Polypropylene, Applied Catalysis B: Environmental, 2009, 147-156, vol. 90, Energy & Resources research Institute, The University of Leeds, Leeds, United Kingdom.
C. Wu, et al, Investigation of Coke Formation Ni—Mg—Al Catalyst for Hydrogen Production from the Catalytic Steam Pyrolysis-Gasification of Polypropylene, Applied Catalysis B: Enviromental, 2010, 198-207, vol. 96, Energy & Resources Research Institute, The University of Leeds, Leeds, United Kingdom.
W. Kaminsky, Recycling of Polymer by Pyrolysis, Journal de Physique, 1993, 1543-1552, vol. 3, Institute for Technical and Macromolecular Chemistry, University of Hamburg, Hamburg, Germany.
S. T. Kenny, et al, Up-Cycling of PET to the Biodegradable Plastic PHA, Environ. Sci. Technol., 2008, 7696-7701, vol. 42, Dublin, Republic of Ireland.
J. S. Kim, et al, Pyrolysis of a Fraction of Mixed Plastic Wastes Depleted in PVC, Journal of Analytical and Applied Pyrolysis, 1997, 365-372, vol. 40-41, University of Hamburg, Institute of Technical and Macromolecular Chemistry, Hamburg, Germany.
Roberto Aguado, et al, Kinetic Study of Polyolefin Pyrolysis in a Conical Spouted Bed Reactor, Ind. Eng. Chem. Res., 2002, 4559-4566, vol. 41, Departamento de Ingenieria Quimica, Universidad del Pais Vasco, Bilbao, Spain.
Roberto Aguado, et al, Kinetics of Polystyrene Pyrolysis in a Conical Spouted Bed Reactor, Chemical Engineering Journal, 2003, 91-99, vol. 92, Departamento de Ingenieria Quimica, Universidad del Pais Vasco, Bilbao, Spain.
W. Kaminsky, et al, Pyrolysis of Mixed Plastics into Aromatics, Journal of Analytic and Applied Physics, 1999,127-134, vol. 51, University of Hamburg, Institute for Technical and Macromolecular Chemisty, Hamburg, Germany.
Roberto Aguado, et al, Defluidization Modelling of Pyrolysis of Plastics in a Conical Spouted Bed Reactor, 2005, 231-235, vol. 44, Departamento de Ingenieria Quimica, Facultad de Ciencias, Universidad del Pais Vasco, Bilbao, Spain.
W. Kaminsky, et al, Monomer Recovery by Pyrolysis of Poly(methyl methacrylate) (PMMA), Journal of Analytical and Applied Pyrolysis, 1991, 311-318, vol. 19, Elsevier Science Publishers B.V., Amsterdam.
Walter Kaminsky, et al, Feedstock Recycling of Synthetic and Natural Rubber by Pyrolysis in a Fluidized Bed, Journal of Analytical and Applied Pyrolysis, 2008, 4, Elsevier, Hamburg, Germany.
M. Artetxe, et al, Operating Conditions for the Pyrolysis of Poly(ethylene terephthalate) in a Conical Spouted-Bed Reactor, Ind. Eng. Chem. Res., 2010, 2064-2069, vol. 49, University of the Basque Coutnry, Department of Chemical Engineering, Bilbao, Spain.
T. Yoshioka, et al, Pyrolysis of poly(ethylene terephthalate) in a Fluidised Bed Plant, Polymer Degradation and Stability, 2004, 499-504, vol. 86, Environmental Conservation Research INstittue, Tohoku University, Aoba-ku Sendai, Japan.
Walter Kaminsky, et al, Pyrolysis of Filled PMMA for Monomer Recovery, Journal of Analytical and Applied Pyrolysis, 2001,781-787, vol. 58-59, University of Hamburg, Institute for Technical and Macromolecular Chemistry, Hamburg, Germany.
Y.-H. Lin, et al, Fluidised Bed Pyrolysis of Polypropylene Over Cracking Catalysts for Producing Hydrocarbons, Polymer degradation and Stability, 2005, 101-108, vol. 89, Department of Biochemical Engineering & Graduate Institute of Environmental Polymeric Materials, Kao Yuan Institute of Technology, Kaohsiung, Taiwan, ROC.

(56) References Cited

OTHER PUBLICATIONS

N. Miskolczi, et al, Production of Oil with Low Organobromine Content from the Pyrolysis of Flame Retarded HIPS and Abs Plastics, Journal of Analytical and Applied Pyrolysis, Department of Hydrocarbon and Coal Processing, University of Pannonia, Veszprem, Hungary.

C. Wu, et al, Pyrolysis-Gasification of Plastics, Mixed Plastics and Real-World Plastic Waste with and without Ni—Mg—Al Catalyst, Fuel, Energy & Resources Research Institute, The University of Leeds, Leeds, United Kingdom.

C. Wu, et al, Pyrolysis-Gasification of Post-Consumer Municipal Solid Plastic Waste for Hydrogen Production, International Journal of Hydrogen Energy, 2010, 949-957, vol. 35, Energy & Resources Institute, The University of Leeds, Leeds, UK.

W. J. Hall, et al Pyrolysis of Brominated Feedstock Plastic in a Fluidised Bed Reactor, Journal of Analytical and Applied Pyrolysis, 2006, 75-82, vol. 77, Energy and Resources Research Institute, University of Leeds, Leeds, UK.

A. M. Cunliffe, et al, Recycling of Fibre-Reinforced Polymeric Waste by Pyrolysis: Thermo-Gravimetric and Bench-Scale Investigation, Journal of Analytical and Applied Pyrolysis, 2003, 315-338, vol. 70, Department of Fuel and Energy, The University of Leeds, Leeds, United Kingdom.

A. Lopez, et al, Pyrolysis of Municipal Plastic Wastes II: Influence of Raw Material Composition Under Catalytic Conditions, Waste Management, 2011, 1973-1983, vol. 31, Chemical and Environmental Engineering Department, School of Engineering of Bilbao, Alda, Urquijo, Bilbao Spain.

A. Lopez, et al, Pyrolysis of Municipal Plastic Wastes: Influence of Raw Material Composition, Waste Management, 2010, 620-627, vol. 30, Chemical and Environmental Engineering Department, School of Engineering of Bilbao, Alda, Urquijo, Bilbao, Spain.

H. Schmidt, et al, Pyrolysis of Oil Sludge in a Fluidised Bed Reactor, Chemosphere, 2001, 285-290, vol. 45, Institute of Techinical and Macromolecular Chemistry, University of Hamburg, Hamburg, Germany.

C. M. Simon, et al. Pyrolysis of Polyolefins with Steam to Yield Olefins, Journal of Analytical and Applied Pyrolysis, 1996, 75-87, vol. 38, University of Hamburg, Institute for Technical and Macromolecular Chemistry, Hamburg, Germany.

I.D. Marco, et al, Pyrolysis of the Rejects of a Waste Packaging Separation and Classification Plant, Journal of Analytical and Applied Pyrolysis, 2009, 384-391, vol. 85, Dpto. Ingenieria Quimica y del Medio Ambiente, Escuela T.S. de Ingenieria, Bilbao, Spain.

I.D. Marco, et al, Recycling of Automobile Shredder Residues by Means of Pyrolysis, Journal of Analytical and Applied Pyrolysis, 2007, 403-408, vol. 79, Dpto. INgenieria Quimica y del Medio Ambientem Escuela Superior de Ingenieroes de Bilbao, Bilbao, Spain.

W. Kaminsky, et al, Recycling of Mixed Plastics by Pyrolysis in a Fluidised Bed, Macromolecular Symposium, 2000, 191-199, vol. 152, Institute of Technical and Macromolecular Chemistry, University of Hamburg, Hamburg, Germany.

F. A. Buzeto, et al, Recycling of Polyolefins by Pyrolysis in a Fluidized Bed Reactor, Department of Polymer Technology, College of Chemical Engineering.

G. Lopez, et al, Recycling poly-(methyl methacrylate) by Pyrolysis in a Conical Spouted Bed Reactor, Chemical Engineering and Processing: Process Intensification, 2010, 1089-1094, vol. 49, University of the Basque Country, Department of Chemical Engineering, Bilbao, Spain.

W. J. Hall, et al, Removal of Organobromine Compounds from the Pyrolysis Oils of Flame Retarded Plastics Using Zeolite Catalysts, Journal of Analytical and Applied Pyrolysis, 2008, 139-147, vol. 81, Energy and Resources Institute, University of Leeds, Leeds, United Kingdom.

W. Kaminsky, et al, Thermal Degradation of Mixed Plastic Waste to Aromatics and Gas, Polymer Degradation and Stability, 1996, 189-197, vol. 53, University of Hamburg, Institute for Technical and Macromolecular Chemistry, Hamburg, Germany.

W. Kaminsky, et al, Thermal Recycling of Polymers, Journal of Analytical and Applied Pyrolysis, 1985, 439-448, vol. 8, Hamburg, Germany.

Jose M. Arandes, et al, Thermal Recycling of Polystyrene and Polystyrene-Butadiene Dissolved in a Light Cycle Oil, Journal of Analytical and Applied Pyrolysis, 2003, 747-760, vol. 70, Bilbao, Spain.

P. G. Ward, et al, A Two Step Chemo-biotechnological Conversion of Polystyrene to a Biodegradable Thermoplastic, Environ. Sci. Technol., 2006, 2433-2437, vol. 40, Hamburg Germany.

Lee, Kyong-Hwan, et al., Thermal and Catalytic Degradation of Waste High-Density Polyethylene (HDPE) Using Spent FCC Catalyst, Korean Journal of Chemical Engineering, 2003, 20(4), pp. 693-697.

Weitkamp, Jens, Zeolites and Catalysis, Solid State Ionics, 2000, vol. 131, pp. 175-188.

Manos, George, et al., Catalytic Degradation of High Density Polyethylene on an Ultrastable Y Zeolite, Nature of Initial Polymer Reactions, Patter of Formation of Gas and Liquid Products, and Temperature Effects., Ind. Eng. Chem. Res., 2000, 39, 1203-1208.

S.A. Rovenskaja et al., Aromatization of Light Naptha Fractions on Zeolites 1. Kinetic Model, Chem. Ind., 2003, pp. 399-404, 57 (9).

T. M. Mateeva et al., Kinetics of the Hydrogenation of C6-C9 Olefins in the Presence of Aromatic Hydrocarbons on Palladium Sulfate Catalyst, N.D. Zelinskii Institute of Organic Chemistry, Academy of Sciences of the USSR, 1985, pp. 2437-2442, No. 11.

A. Corma et al., Hydrogenation of Aromatics in Diesel Fuels on Pt/MCM-41 Catalysts, Journal of Catalysis, 1997, pp. 480-489, 169.

Office Action received in counterpart Chinese Patent Application No. CN2013875571 dated May 30, 2016, pp. 1-10.

First Examination Report received in counterpart European Patent Application No. EP20130848133.8 dated Jun. 23, 2016, pp. 1-5.

* cited by examiner

US 9,428,695 B2

CONVERSION OF PLASTICS TO OLEFIN AND AROMATIC PRODUCTS WITH PRODUCT RECYCLE

TECHNICAL FIELD

The invention relates to the conversion of plastics and other hydrocarbons to olefin and aromatics through pyrolysis.

BACKGROUND

Waste plastics are mostly diverted to landfills or are incinerated, with a smaller fraction being diverted to recycling. Over the years, with increased regulations and levies on landfills, the percentage of the post-consumer waste being recycled or incinerated for energy recovery is gradually increasing. The 2009 statistics by Plastics Europe indicate that approximately 24.4 million tons of waste plastics were generated in Europe. Of this, 54% was treated either through recycling (22.6%) or energy recovery (31.3%). Plastics diverted to landfills were approximately 46.1%. Thus, waste plastics disposal into landfills is becoming increasingly difficult.

Pyrolysis of waste plastics to products like naphtha, ethylene, propylene and aromatics can be classified under the category of feedstock recycling of waste plastics. With the naphtha prices increasing dramatically, steam crackers operating on naphtha feed are at a disadvantageous position compared to steam crackers operating on cheaper gaseous hydrocarbon feeds. If a portion of the naphtha feed to the steam crackers is replaced by an equivalent amount of products from plastics conversion processes, like pyrolysis, the economic situation for the steam crackers operating on naphtha feed will improve.

In order to make an impact on the economics of very large volumes in continuous steam cracker plant operations, it is necessary that the pyrolysis process is also continuous. No large scale plants exist today that directly convert waste plastics in a single step to petrochemicals. Previous attempts around the world have been focused on generation of liquid fuels from waste plastics. These plants were small in scale or modular in nature. Reactions carried out in such small scale plants are also carried out for longer residence times, making them less suitable for continuous operations on larger scales. Some earlier attempts have also focused at generating feedstocks for steam crackers from waste plastics. These rely on the availability of steam cracker furnaces for being successful, however. Furthermore, conversion of these produced steam cracker feeds in cracker furnaces would typically result in production of high amounts of methane, which is undesirable.

What is therefore needed is a process for the conversion of plastics directly to petrochemical products, such as olefins and aromatics, that minimize formation of methane, and that maximizes the yield of olefins and aromatics.

SUMMARY

A method of producing olefins and aromatic compounds from a feedstock is achieved by introducing a hydrocarbon feedstock and a catalyst composition within a reactor at least a portion of the reactor being at a reactor temperature of from 420° C. to 730° C. The catalyst composition comprises a fluidized catalytic cracking (FCC) catalyst and a ZSM-5 zeolite catalyst, wherein the amount of ZSM-5 zeolite catalyst makes up from greater than 0 wt. % of the total weight of the FCC catalyst and the ZSM-5 zeolite catalyst. At least a portion of the feedstock is allowed to be converted to products of at least one of olefins and aromatic compounds within the reactor, at least some of the products being contained in a liquid product stream. At least a portion of the liquid product stream is directed to one or more of the following (A) through (E), wherein:

(A) is a catalytic reformer under conditions suitable for producing aromatics to form reformed products containing aromatic compounds and non-aromatic compounds, and directing the reformed products to a separating unit to provide an aromatic-rich separated product and a non-aromatic-rich separated product from at least a portion of the reformed products and recycling the non-aromatic-rich product to the reactor;

(B) is a separation unit to provide an aromatic-rich separated product and a non-aromatic-rich separated product, and directing at least a portion of the non-aromatic-rich separated product to the reactor;

(C) is a hydroprocessing unit under conditions suitable for hydroprocessing to provide a hydroprocessed product and recycling at least a portion of the hydroprocessed product to the reactor;

(D) is a separation unit to provide an aromatic-rich separated product and a non-aromatic-rich separated product, and directing at least a portion of the non-aromatic-rich separated product as a feed to a hydroprocessing unit under conditions suitable for hydroprocessing to provide a hydroprocessed product and recycling at least a portion of the hydroprocessed product to the reactor; and E) is a pyrolysis reactor to provide a liquid and gas pyrolysis product stream of which the liquid product is separated into an aromatics-rich product and a non-aromatics-rich product, the non-aromatic-rich product being recycled back to the reactor with or without being hydroprocessed prior to being recycled.

In certain more specific embodiments, the FCC catalyst may be comprised of at least one of an X-type zeolite, a Y-type zeolite, mordenite, faujasite, nano-crystalline zeolites, MCM mesoporous materials, SBA-15, a silico-alumino phosphate, a gallophosphate, and a titanophosphate.

In some applications, the amount of ZSM-5 zeolite catalyst of the catalyst composition may make up from 10 wt. % to 50 wt. % of the total weight of the FCC catalyst and the ZSM-5 zeolite catalyst. In other applications, the amount of ZSM-5 zeolite catalyst of the catalyst composition may make up from 30 wt. % to 45 wt. % of the total weight of the FCC catalyst and the ZSM-5 zeolite catalyst.

In certain embodiments, at least a portion of the reactor may be at a reactor temperature of 570° C. to 680° C.

The feedstock and catalyst composition may be introduced into the reactor at a catalyst-to-feed ratio of from 6 or greater in some instances.

In specific embodiments, the reactor has at least one of 1) a time-interval average catalyst bed temperature of from 420° C. to 730° C. wherein the time interval is 3 minutes or less from the start of the reaction; 2) a temperature in the reactor of from 420° C. to 730° C. at at least one location that is from 0.3 L or less from the at least one inlet where the feedstock and the catalyst composition are introduced, where L is the length of the reactor flow path; and 3) a weight-averaged catalyst bed temperature in the reactor of from 420° C. to 730° C. weight-averaged at two or more locations that is from 0.3 L or less and/or to 0.3 L or greater from the at least one inlet where the feedstock and the catalyst composition are introduced, where L is the length of the reactor flow path can result increased yields of light gas olefins and aromatics.

The feedstock may comprise at least one of polyolefins, polyethylene, polypropylene, polystyrene, polyethylene terephthalate (PET), polyvinyl chloride (PVC), polyamide, polypolycarbonate, polyurethane, polyester, natural and synthetic rubber, tires, filled polymers, composites, plastic alloys, plastics dissolved in a solvent, biomass, bio oils, and petroleum oils in some applications.

The reactor may be at least one of a fluidized bed reactor, bubbling bed reactor, slurry reactor, rotating kiln reactor, and packed bed reactor.

In certain instances, at least a portion of the liquid product stream is directed to (A). In others, at least a portion of the liquid product stream is directed to (B). In still others, at least a portion of the liquid product stream is directed to (C). In others, at least a portion of the liquid product stream is directed to (D). And in still other instances, at least a portion of the liquid product stream is directed to (E).

In another aspect of the invention, a method of producing olefins and aromatic compounds from a plastic feedstock is achieved by introducing a plastic feedstock and a catalyst composition within a reactor. The reactor has at least one of 1) a time-interval average catalyst bed temperature of from 420° C. to 730° C. wherein the time interval is 3 minutes or less from the start of the reaction; 2) a temperature in the reactor of from 420° C. to 730° C. at at least one location that is from 0.3 L or less from the at least one inlet where the plastic feedstock and the catalyst composition are introduced, where L is the length of the reactor flow path; and 3) a weight-averaged catalyst bed temperature in the reactor of from 420° C. to 730° C. weight-averaged at two or more locations that is from 0.3 L or less and/or to 0.3 L or greater from the at least one inlet where the plastic feedstock and the catalyst composition are introduced, where L is the length of the reactor flow path. The catalyst composition comprises a fluidized catalytic cracking (FCC) catalyst and a ZSM-5 zeolite catalyst, wherein the amount of ZSM-5 zeolite catalyst makes up from 10 wt. % to 50 wt. % of the total weight of the FCC catalyst and the ZSM-5 zeolite catalyst. At least a portion of the plastic feedstock is allowed to be converted to products of at least one of olefins and aromatic compounds within the reactor, at least some of the products being contained in a liquid product stream. At least a portion of the liquid product stream is directed to one or more of the following (A)-(E), wherein:

(A) is a catalytic reformer under conditions suitable for producing aromatics to form reformed products containing aromatic compounds and non-aromatic compounds, and directing the reformed products to a separating unit to provide an aromatic-rich separated product and a non-aromatic-rich separated product from at least a portion of the reformed products and recycling the non-aromatic-rich product to the reactor;

(B) is a separation unit to provide an aromatic-rich separated product and a non-aromatic-rich separated product, and directing at least a portion of the non-aromatic-rich separated product to the reactor;

(C) is a hydroprocessing unit under conditions suitable for hydroprocessing to provide a hydroprocessed product and recycling at least a portion of the hydroprocessed product to the reactor;

(D) is a separation unit to provide an aromatic-rich separated product and a non-aromatic-rich separated product, and directing at least a portion of the non-aromatic-rich separated product as a feed to a hydroprocessing unit under conditions suitable for hydroprocessing to provide a hydroprocessed product and recycling at least a portion of the hydroprocessed product to the reactor; and (E) is a pyrolysis reactor to provide a liquid and gas pyrolysis product stream of which the liquid product is separated into an aromatics-rich product and a non-aromatics-rich product, the non-aromatic-rich product being recycled back to the reactor with or without being hydroprocessed prior to being recycled.

In certain embodiments, the FCC catalyst is comprised of at least one of an X-type zeolite, a Y-type zeolite, mordenite, faujasite, nano-crystalline zeolites, MCM mesoporous materials, SBA-15, a silico-alumino phosphate, a gallophosphate, and a titanophosphate.

The amount of ZSM-5 zeolite catalyst of the catalyst composition may make up from 30 wt. % to 45 wt. % of the total weight of the FCC catalyst and the ZSM-5 zeolite catalyst in some cases.

In certain applications, at least a portion of the liquid product stream is directed to (A). In others, at least a portion of the liquid product stream is directed to (B). In still others, at least a portion of the liquid product stream is directed to (C). In others, at least a portion of the liquid product stream is directed to (D). And in still other instances, at least a portion of the liquid product stream is directed to (E).

BRIEF DESCRIPTION OF THE DRAWINGS

For a more complete understanding of the present invention, reference is now made to the following descriptions taken in conjunction with the accompanying figures, in which.

DETAILED DESCRIPTION

Figure 1:
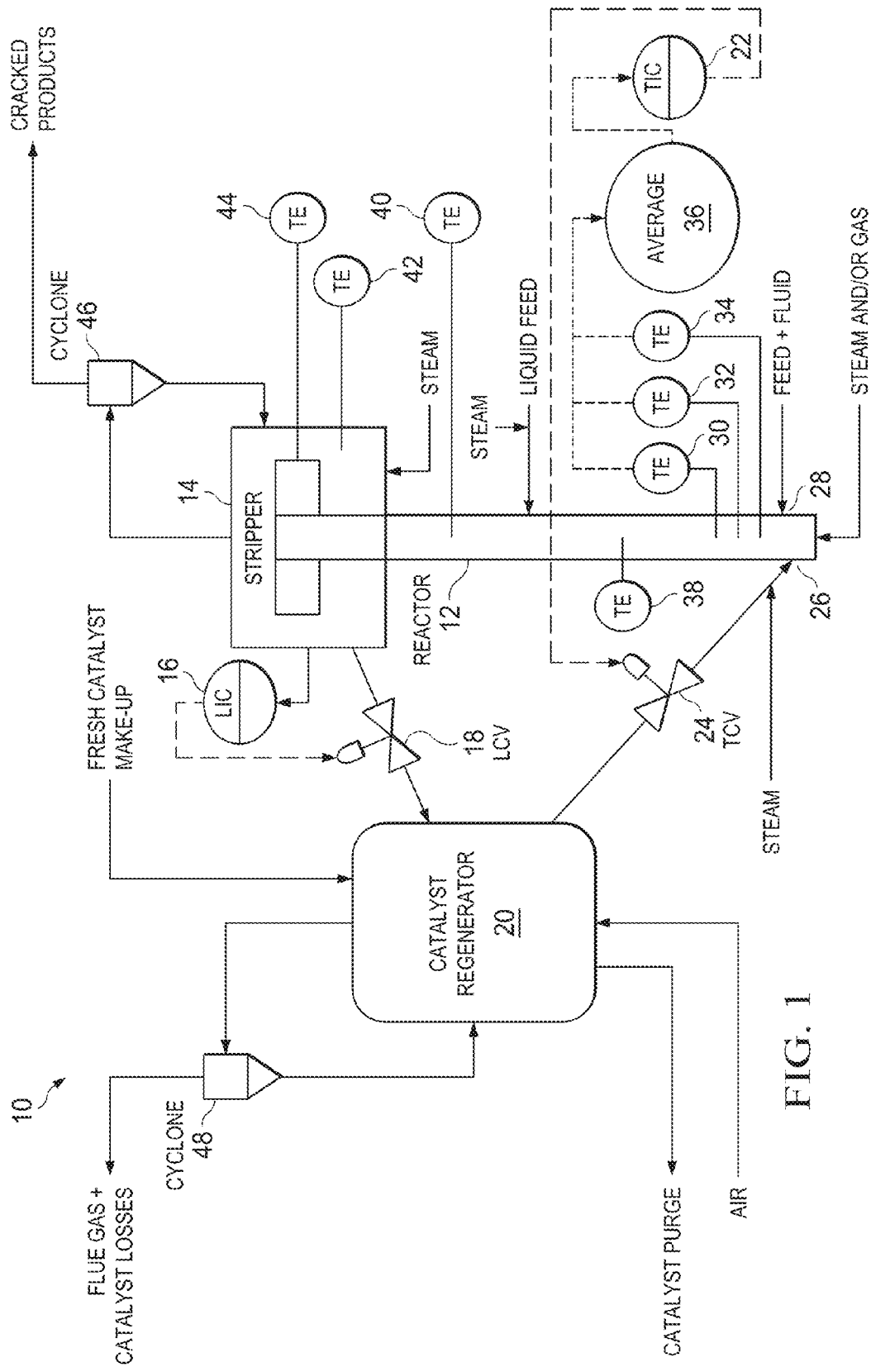
FIG. 1 is a schematic for a control system of a catalytic plastics pyrolysis reactor using average longitudinal and lateral temperatures monitored at a short temperature-monitoring distance near the reactor bottom.

In the present invention, plastics and other hydrocarbons are converted through pyrolysis to monomers with high yields of light gas olefins (e.g., ethylene, propylene and butenes) and aromatics, with low yields of methane. The conversion can be accomplished with a low residence time (on the order of seconds) making it ideally suited for large scale commercial operations.

The process utilizes a catalyst composition that is suitable for converting the plastic or hydrocarbon feedstock to at least one of olefins and aromatic compounds through pyrolysis. These may include conventional catalysts used for such processes. Non-limiting examples of conventional catalyst compositions are those described in U.S. Pat. Nos. 4,664,780; 4,970,183; 5,173,463; 5,348,643; 6,613,710; and 6,696,378, each of which is incorporated herein by reference in its entirety. These may include FCC catalysts, resid FCC catalysts, alumina/silica catalysts, mesoporous materials and various zeolites.

In other embodiments, the catalyst composition may include a novel catalyst system that is described in copending U.S. application Ser. No. 13/764,886, filed Feb. 12, 2013, published as U.S. Pat. App. Pub. No. US2014/0228204, which is hereby incorporated herein by reference in its entirety for all purposes. The catalyst composition described therein is comprised of a fluid catalytic cracking (FCC) catalysts and a ZSM-5 zeolite catalyst additive that are used in combination with one another in a catalyst composition to facilitate the pyrolytic conversion of the plastic or hydrocarbon feed.

The FCC catalysts are those useful in the cracking of petroleum feeds. Such petroleum feeds may include vacuum gas oil (350-550° C. boiling range), atmospheric gas oil and diesel (220-370° C. boiling range), naphtha (<35° C. to 220° C. boiling range) or residues (boiling at >550° C. range) from a crude oil atmospheric and vacuum distillation units or the various such streams generated from all secondary processes in refineries including hydrotreating, hydrocracking, coking, visbreaking, solvent deasphalting, fluid catalytic cracking, naphtha reforming and such or their variants. The FCC catalysts are typically composed of large pore molecular sieves or zeolites. Large pore zeolites are those having an average pore size of from 7 Å or more, more typically from 7 Å to about 10 Å. Suitable large pore zeolites for FCC catalysts may include X-type and Y-type zeolites, mordenite and faujasite, nano-crystalline Zeolites, MCM mesoporous materials (MCM-41, MCM-48, MCM-50 and other mesoporous materials), SBA-15 and silico-alumino phosphates, gallophosphates, titanophosphates. Particularly useful are Y-type zeolites.

In Y-type zeolites used for FCC catalysts, the silica and alumina tetrahedral are connected by oxygen linkages. In order to impart thermal and hydrothermal stability, the Y-zeolite may be subjected to treatment to knock off some framework alumina (one of these routes is steaming at high temperature). Typically Y-zeolites have Si/Al ratio of about 2.5:1. The dealuminated Y-zeolite typically has a Si/Al ratio of 4:1 or more. The dealuminated Y-zeolite, with a higher framework Si/Al ratio, has stronger acid sites (isolated acid sites) and is thermally and hydrothermally more stable and is thus called ultrastable Y-zeolite (USY-zeolite). In units like fluid catalytic cracking where the catalysts see temperatures of 700° C. and also moisture in a catalyst regenerator, the thermal and hydrothermal stability is important so that catalyst activity is maintained over a longer period of time. Hence, in such types of operation USY-zeolite may be the preferred FCC catalyst.

The ultrastable zeolites may also be rare-earth-exchanged. The rare-earth content may be higher than 0% and may be as high as 10% by weight of the zeolite, with from 0.1-3% by weight of zeolite being typical. The higher the rare earth content, however, the more olefinicity of the products is lost by favoring hydrogen transfer reactions to make paraffins. Some amount of rare earth in the zeolite Y may be useful because it imparts stability to the zeolite. The rare earth materials may include cerium, lanthanum and other rare earth materials.

It should be understood that with respect to any concentration or amount range listed or described in the summary and detailed description as being useful, suitable, or the like, it is intended to include every concentration or amount within the range, including the end points, and is to be considered as having been specifically stated. For example, "a range of from 1 to 10" is to be read as indicating each and every possible number along the continuum between about 1 and about 10. Thus, even if specific data points within the range, or even no data points within the range, are explicitly identified or refer to only a specific few, it is to be understood that the inventors appreciate and understand that any and all data points within the range are to be considered to have been specified, and that the inventors are in possession of the entire range and all points within the range.

The FCC catalysts are typically the afore-mentioned zeolites embedded in an active matrix. The matrix may be formed from an active material, such as an active alumina material that could be amorphous or crystalline, a binder material, such as alumina or silica, and an inert filler, such as kaolin. The zeolite component embedded in the matrix of the FCC catalyst may make up from 10 to 90% by weight of the FCC catalyst. The FCC catalyst with the zeolite material embedded within the active matrix material may be formed by spray drying into microspheres. These catalysts are hard and have very good attrition resistance to withstand the particle-particle and particle-wall collisions that usually occur when the catalysts are fluidized. The particle size distribution for the FCC catalyst may range from greater than 0 to 150 microns. In certain embodiments, 90-95% of the particle size distribution may be within the range of from greater than 0 to 110 microns or 120 microns, with from 5-10% of the particles having particle sizes of greater than 110 microns. As a result of the distribution of particle sizes, the average or median particle size for the FCC catalyst is typically 70 to 75 microns. In certain instances, finer particles of the FCC catalyst may be used with larger particles to provide good fluidization. In certain embodiments, for example, 15% or less of the FCC catalyst may have a particle size of 40 microns or less. Good fluidization is imparted by presence of fines in a mix of fine and coarse particles. Loss of fine particles leads to de-fluidization.

The FCC catalysts may be further characterized based on certain physical, chemical, surface properties and catalytic activity. Fresh FCC catalysts have a very high surface area typically 300-400 $m^2/g$ or higher and a high activity. As a result of the high activity of the fresh FCC catalyst, cracking of petroleum feeds with the fresh FCC catalyst usually results in high yields of coke, such as 8-10 wt. %, and light gas. The very high yields of coke can affect the heat balance of the reaction as all the heat generated by coke formation may not be needed for cracking. Heat removal from a reactor-regenerator system thus may be necessary. This means that the feed is not effectively utilized. It would be more economically valuable if just enough coke required for supporting the cracking process heat requirements was made, with the balance that otherwise goes into excess coke formation being used to form useful products. Also, high yields of light gases (methane, ethane) from the fresh FCC catalyst are undesirable and may exceed the plant wet gas compressor equipment constraints or limits in an FCC complex. High yields of methane are undesirable because of its limited utility in forming chemicals (even though it is possible to form higher hydrocarbons from methane through syngas-methanol-olefins route). Ethane on the other hand may be used for making ethylene, a valuable chemical. In most cases, however, higher ethane yield is accompanied by a higher methane yield.

In order to overcome these problems, the FCC cracking unit is typically operated by maintaining a constant activity or conversion. This is done by having a circulating inventory of partially deactivated catalyst and then periodically purging a small portion of the used or non-fresh catalyst and making that up with fresh FCC catalyst. The use of used or non-fresh catalyst helps in maintaining the catalyst activity at a constant level without producing high levels of methane and coke. The circulating inventory of plant catalyst is partially deactivated or equilibrated under plant operating conditions. The portion of this catalyst that is purged out periodically is the spent catalyst. Thus in terms of catalyst activity it generally has the same activity of the circulating catalyst inventory in the FCC unit before make-up fresh catalyst is added. This catalyst make-up and purging is typically done on a regular basis in an operating FCC unit. The circulating catalyst inventory has roughly 50% or less of the surface area of the fresh catalyst and activity or conversion that is roughly 10 conversion units lower than that of fresh catalyst. In other words, if fresh catalyst were to provide a conversion of 80 wt. % of vacuum gas oil range material to dry gas ($H_2$—$C_2$), LPG ($C_3$-$C_4$), gasoline (35-220° C. boiling hydrocarbons) and coke, then the circulating partially deactivated catalyst inventory could provide a conversion of 70 wt. %. The FCC fresh catalyst particles added through make-up to the circulating unit would on an average spend several days (age) in the unit before it is purged out. Thus, due to the fact that daily make-up is made to the catalyst inventory, the circulating catalyst inventory would typically have catalyst particles of different ages, i.e., there is an age distribution of catalyst particles in the inventory. The catalyst activity of a particle is proportional to its deactivation in the FCC unit which in turn is also proportional to the age of the catalyst. The following Table 1 below lists typical properties between fresh and spent FCC catalysts.

TABLE 1

| Property | Fresh FCC Catalyst | Spent FCC Catalyst |
| --- | --- | --- |
| Total surface area, m²/g | 320-360 | 130-170 |
| Unit cell size, angstroms | 24.4-24.7 | 24.2-24.4 |
| Conversion of standard petroleum feed or activity, wt. % | 78-85 | 67-73 |
| Ni + V, ppm | 0 | Typically 500-3000 |
| Coke on the catalyst, wt. % | 0 | 0-0.5 typically |
| Sulfur oxide (Sox) reduction and/or Sulfur reduction additives present? | No | Yes* |

*Sox and S reduction additives are usually from 10-15 wt. %. Sox and S reduction additives would not have catalyst activity for cracking and thus would dilute the catalyst activity. These additives are usually added to meet automotive fuel specification requirements for streams generated from the FCC unit and for mitigating Sox liberation to environment. Usually oxides of magnesium are used in such additives and they would be having lower or no conversion for breaking molecules and would thus reduce the ability of the FCC catalyst to convert heavier molecules to lighter molecules i.e. activity dilution.

In embodiments of the present invention that make use of a catalyst composition that comprises an FCC catalyst and a ZSM-5 zeolite catalyst, the composition can be made up of either fresh FCC catalyst, non-fresh FCC catalyst, or a mixture of both. This may include spent FCC catalyst that is removed from the fluidized catalytic cracking process, as described previously. Because spent FCC catalyst is typically a waste product from the fluidized catalytic cracking process, its use in the conversion of plastics to useful products is particularly advantageous. This is due to both its lower cost and availability and due to its favorable activity in not forming more coke and methane. The spent FCC catalyst is essentially "used" or "non-fresh" FCC catalyst that has been used in the fluidized catalytic cracking process and has been removed for replacement with fresh catalyst, as previously described. As used herein, the expression "non-fresh" with respect to the FCC catalyst is meant to encompass any FCC catalyst, as they have been described, that has some amount (i.e. greater than 0%) of coke deposition. Fresh FCC catalyst would have no coke deposits. In some embodiments, the coke deposition on the non-fresh FCC catalyst may be from 0.01%, 0.05%, 0.1%, 0.2%, 0.3%, 0.4% or more by weight of the catalyst. Typically, the coke deposition for the non-fresh FCC catalyst will range from greater than 0 to 0.5% by weight of the catalyst. The spent FCC catalyst may have non-fresh catalyst particles with differing degrees of catalyst coking due to differences in the catalyst ages of use in the cracking process. The non-fresh FCC catalyst also has a reduced surface area compared to fresh FCC catalyst due to catalyst hydrothermal deactivation in the FCC unit. Typical surface area for the non-fresh catalyst may range from 100 m²/g to 200 m²/g. Additionally, in some embodiments the FCC catalyst may include a combination of non-fresh or spent FCC catalyst and fresh FCC catalyst and may be used in the pyrolysis conversion reaction.

The ZSM-5 zeolite catalyst additive used in combination with the FCC catalyst is a molecular sieve that is a porous material containing intersecting two-dimensional pore structure with 10-membered oxygen rings. Zeolite materials with such 10-membered oxygen ring pore structures are often classified as medium-pore zeolites. Such medium-pore zeolites typically have pore diameters ranging from 5.0 Å to 7.0 Å. The ZSM-5 zeolite is a medium pore-size zeolite with a pore diameter of from about 5.1 to about 5.6 Å. The ZSM-5 zeolite and their preparation are described in U.S. Pat. No. 3,702,886, which is herein incorporated by reference. The ZSM-5 zeolite may be free from any metal loading.

The ZSM-5 zeolite is also typically embedded in an active matrix, which may be the same or similar to those used for the zeolite of the FCC catalyst, as previously described. The matrix may be formed from an active material, such as an active alumina material, a binder material, such as alumina or silica, and an inert filler, such as kaolin.

The zeolite component embedded in the matrix of the ZSM-5 catalyst may make up from 5 to 90% by weight of the ZSM-5 zeolite catalyst and more typically between 10-80% by weight of the ZSM-5 zeolite catalyst, and still more typically between 10 to 50% by weight of the ZSM-5 zeolite catalyst. The ZSM-5 zeolite catalyst with the ZSM-5 zeolite material embedded within the active matrix material may also be formed by spray drying into microspheres. The particle size distribution for the ZSM-5 zeolite catalyst may range from greater than 0 to 150 microns. In certain embodiments, 90-95% of the particle size distribution may be within the range of from greater than 0 to 110 microns or 120 microns. The average or median particle size for the ZSM-5 zeolite catalyst is typically 70 to 75 microns. In certain instances, finer particles of the ZSM-5 zeolite catalyst may be used with larger particles to provide good fluidization. In certain embodiments, for example, 15% or less of the ZSM-5 zeolite catalyst may have a particle size of 40 microns or less.

In certain embodiments, the zeolite material (e.g. X-type zeolite or Y-type zeolite) of the FCC catalyst and the ZSM-5 zeolite may be embedded and formed within the same matrix material unit so that catalyst particles containing both the FCC catalyst and ZSM-5 catalyst materials are formed. These particles may be of the same size and configuration as those previously described for the separate FCC catalyst and ZSM-5 zeolite catalyst. One of the advantages of combining the FCC and ZSM-5 zeolite component in a single matrix or particle is that it may result in a higher activity that can be obtained by minimizing the in-active diluents in the individual catalysts.

The catalysts selected for use in the plastic pyrolysis may have similar properties to FCC catalysts in terms of particle size distribution and attrition resistance, as these parameters may greatly influence the integrity of the catalyst recipe in an operating fluidized bed environment. Very fine particles can lead to their high losses due to their being entrained with product gases, while bigger catalyst particle sizes tend to not fluidize properly and result in non-uniform activity. In certain embodiments, however, pure forms of the FCC catalyst and the ZSM-5 zeolite without any matrix material or smaller particle sizes may be employed in systems where there is less probability of the catalyst being lost, such as in rotary kilns and slurry reactors.

In the present invention, plastic pyrolysis using the catalyst system produces valuable monomers of light gas olefins and aromatics, such as benzene, toluene and xylenes. The process yields are tunable to the desired yields of olefins and aromatics by using a combination of the catalyst system and process operating conditions. It has been found that with a combination of FCC catalysts and ZSM-5 zeolite catalyst additive, as has been described, higher yields of olefins and aromatics can be obtained as compared to using only an FCC catalyst. Specifically, a catalyst system containing from 10 wt. % or more of ZSM-5 zeolite catalyst by weight of the FCC catalyst and the ZSM-5 zeolite catalyst provides increased yields of olefins and aromatics. As used herein, weight percentages of the ZSM-5 zeolite catalysts and FCC catalysts are based upon the total weight of the catalyst, including any matrix material, unless expressly stated otherwise. Where no matrix material is employed in the reactions the weight percentages of the ZSM-5 zeolite catalysts and FCC catalysts are the weight percentage of the zeolites only.

In certain embodiments, the amount of ZSM-5 zeolite catalyst of the catalyst composition makes up from 10 wt. % to 50 wt. % of the total weight of the FCC catalyst and the ZSM-5 zeolite catalyst. Thus, the amount of ZSM-5 zeolite catalyst of the catalyst composition makes up from 10 wt. %, 15% wt. %, 20% wt. %, 25% wt. %, 30% wt. %, or 35% wt. % to 40% wt. %, 45% wt. %, or 50 wt. % of the total weight of the FCC catalyst and the ZSM-5 zeolite catalyst. In still other embodiments, the amount of ZSM-5 zeolite catalyst of the catalyst composition makes up from 30 wt. % to 45 wt. % of the total weight of the FCC catalyst and the ZSM-5 zeolite catalyst. In further embodiments, the amount of ZSM-5 zeolite catalyst of the catalyst composition makes up from 35 wt. % to 40 wt. % of the total weight of the FCC catalyst and the ZSM-5 zeolite catalyst. In particular instances, it has been found that the highest yields of olefins and aromatics are produced when the ZSM-5 zeolite catalyst is used in an amount of approximately 37.5 wt. % of the total weight of the FCC catalyst and the ZSM-5 zeolite catalyst.

The plastic feed used in the conversion reaction may include essentially all plastic materials, such as those formed from organic polymers. Non-limiting examples include polyolefins, such as polyethylene, polypropylene, etc., polystyrene, polyethylene terephthalate (PET), polyvinyl chloride (PVC), polyamide, polycarbonate, polyurethane, polyester, natural and synthetic rubber, tires, filled polymers, composites and plastic alloys, plastics dissolved in a solvent, etc. While plastic feeds may be used in the conversion reaction, other hydrocarbon materials may also be used as the feedstock. These hydrocarbons may include biomass, bio oils, petroleum oils, etc. Thus, while the present description is directed primarily to the conversion of plastic feeds, it should be understood that the invention has applicability to and encompasses the use of other hydrocarbons as well. When production of light gas olefins is desired, a plastic feed of polyolefins or that is primarily or contains a substantial portion of polyolefins may be preferred. Mixtures of various different plastic and hydrocarbon materials may be used without limitation.

The plastic feed may be provided in a variety of different forms. In smaller scale operations, the plastic feed may be in the form of a powder. In larger scale operations, the plastic feed may be in the form of pellets, such as those with a particle size of from 1 to 5 mm.

The catalyst and plastic feed may be mixed together prior to introduction into the reactor or may be fed separately. The amount or ratio of catalyst used to plastic feed may vary and may be dependent upon the particular system used and process conditions. Plastics can be converted using a very low or very high catalyst-to-feed (C/F) ratio. Longer contact times may be needed in the case of a low C/F ratio, while shorter contact times may be need for a high C/F ratio. In testing, C/F ratios of from 4 to 12 were used, with C/F ratios of from 6 to 9 being most frequently used. In large scale industrial process wherein a circulating fluidized bed riser or downer may be used, the C/F ratio may be determined by the reactor heat balance or other parameters.

Various reactors may be used for the conversion process. For large scale operations, a circulating fluidized bed riser or downer reactor may be used. A bubbling bed reactor where the catalyst is bubbled in-situ, with the feed being added to the bubbling bed may also be used. Slurry-type reactors and rotating kiln-type reactors may also be used in some applications.

The catalyst composition composed of the FCC catalyst and ZSM-5 zeolite catalyst and the plastic feed are introduced (mixed or added separately) into a reactor, such as a fluidized bed reactor, as previously described. The reactor is operated at a reactor temperature wherein all or a portion of the reactor is at a temperature of 550° C. or higher. In some embodiments, the reactor is operated at a reactor temperature wherein all or a portion of the reactor is at a temperature of 570° C. or higher. In certain embodiments, the reactor is operated at a reactor temperature wherein all or a portion of the reactor is at a temperature of from 550° C. to 730° C., more particularly from 570° C. to 680° C., 690° C. or 700° C. Reactor pressures may range from ambient to 50 bar(g) (5 MPa) and more typically from ambient to 3 bar(g) (0.3 MPa). Nitrogen, dry gas ($H_2$—$C_2$), steam or other inert gases or mixture of gases may be used as a carrier gas in which the catalyst and feed are entrained. A range of fluidization gas flow rates can be employed in different modes, such as bubbling fluidized bed mode, circulating fluidized bed mode, slurry tank reactor mode. Other reactor configurations and modes may also be used. In particular embodiments, a circulating fluidized mode may be used because it offers advantages on coke management, better heat transfer and contacting between feed and catalysts. The catalyst/feed ratio (C/F) can range from as low as 2 and as high as 30 and more typically in the range of 4-12.

The process yields of plastics pyrolysis are tunable to the desired yields of olefins and/or aromatics by using a combination of catalysts and process operating conditions. This may be accomplished by using temperature sensors or thermocouples that measures the reactor temperature at a selected position or positions. These selected positions may be an area at or adjacent to the inlet or inlets where the catalyst composition and/or plastic feed are introduced into a continuous flow reactor or at or adjacent to an area in the catalyst bed having complete or greatest mixing of plastic feed and catalyst composition in a batch reactor. Such locations are where the most temperature changes occur during the process, and this is where most of the conversions take place within the reactor.

The temperature variation in these zones is high as feed and catalyst are charged into the reactor. Most of the temperature changes occur in the first minute following the addition of the catalyst and feed into the reactor in the case of a batch reactor. For a continuous flow reactor, most temperature changes occur at or downstream the inlet or inlets where the catalyst composition and/or plastic feed are introduced into the reactor. In the case of the batch reactor, during this one (1) minute period or within a few meters from the feed and/or catalyst composition inlets in continuous flow reactor, there may be a rapid temperature drop due to the introduction of cold feed and due to the endothermic nature of the cracking.

In the case of a continuous flow reactor operating adiabatically, there is a continuous drop in temperature in the reactor downstream from the inlet point(s). There is a reaction zone, however, where the temperature drop is steep as compared to the rest of the continuous flow reactor. There is also a minimum temperature in this steep temperature-change zone. In the case of an isothermal continuous reactor (externally heated), there is a drop in temperature near the plastic feed and/or catalyst composition inlets and a temperature regain downstream. This reduced temperature resulting from the charging of the feed and catalyst at the start of the reaction may be referred to as the "minimum catalyst bed temperature," the "minimum reactor bed temperature," or similar expressions. In a continuous flow reactor, this minimum temperature is reached within short distance (e.g., within a few meters) downstream of the feed and/or catalyst composition inlets.

In batch-type reactors, the minimum reactor bed temperature is usually reached within 10 to 15 seconds after charging of the feed. In a batch reactor, the reactor is usually preheated to a set temperature before the start of the reaction. When the feed and catalyst are charged, however, there are several things that are taking place at the same time. These include the preheating of the feed to the reactor temperature, the phase change of feed and products from solid to liquid or liquid to gas, the heat of reaction for the cracking reaction (which is endothermic), the heating of the catalyst to the reactor temperature, the latent heat for loss of any water present in the catalyst, etc. All of these changes need to be accounted and accommodated for in the batch reactor and using the furnace that is used to heat the reactor. Even though the reactor is heated with the furnace, which is controlled with a temperature control, there is a finite time before the control action for restoring the pre-set bed temperature takes effect. This therefore contributes to the observed drop in temperature as the feed and catalyst are charged into the batch unit.

A time-interval average catalyst bed temperature may be useful for control purposes in batch reactions and can be correlated to monitored temperatures at located different monitoring positions in continuous flow reactors, as will be described later on. This "time-interval average catalyst bed temperature" may be, for example, a one-minute average bed temperature, 5-minute average bed temperature, 10-minute average bed temperature, etc. The time-interval average bed temperature may be defined by the formula (1) below:

$$T_I = 1/N \times (T_1 + \ldots + T_{N-3} + T_{N-2} + T_{N-1} + T_N) \quad (1)$$

where $T_I$ is the time-interval average bed temperature over time interval I; and N=the number of temperature measurements made over the selected time interval I. As an example, a one-minute average bed temperature (I=1 min) may have five different temperatures (i.e. N=5) that are measured and recorded at 0 seconds, 10 seconds, 20 seconds, 40 seconds and at 1 minute. It is to be understood that instead of just only an arithmetic average of temperatures recorded at the sampled time, one may also use a weighted average, where different weights are accorded to the different temperatures measured.

Because most of the temperature changes occur in the first minute following the addition of the catalyst and feed in batch reactions, the minimum reactor bed temperature and time-interval average bed temperatures within short time intervals where I is 2 minutes or less may be particular useful in control schemes. The minimum reactor bed temperature and a one-minute average bed temperature, for example, have been shown to track olefin yields, which may in turn be correlated and applied to continuous flow or steady state processes. Time-interval average catalyst bed temperatures in batch reactions measured over longer time intervals may also be useful in certain applications. These may include long time intervals of over 2 minutes, such as 3 minutes, 4 minutes, 5 minutes, 10 minutes, 15 minutes, etc. In many cases, the long time intervals will be between 2 minutes and 15 minutes.

In continuous steady state flow processes, for example in a tubular flow reactor (steady state in a tubular flow reactor means concentrations and conditions vary along the spatial variable and is not variant in time for each position in space), temperatures measured at and immediately downstream of the feed introduction point(s) are similar to and thus may be used to replace short time-interval average reaction bed temperatures in a batch process. This is because time derivative (variations) of bed temperature in an unsteady tubular batch reactor may be treated analogous to spatial derivative (variations) of temperature in a continuous steady state flow reactor. In the case of continuous stirred tank reactors (CSTR), at all points inside the reactor, temperature and composition are the same as long as flow into the reactor or the reaction extent is the same. Hence in the case of CSTR, average temperature would mean temperature measured in the reactor.

Temperatures measured at and immediately downstream of the feed introduction point(s) in a continuous flow reactor can then be used in control schemes to control variables that may affect the reaction and thus the products formed. These variables may include a) the catalyst composition introduced into the reactor; b) the flow rate of the catalyst composition into the reactor; c) the flow rate of plastic feedstock into the reactor; and/or d) heat input used to heat the reactor, particularly where an isothermal or a preferred heating profile operation is desired. For example, the flow of a regenerated hot catalyst from a regenerator can be varied to attain a desired reactor temperature and as a result it varies the catalyst severity. In response to the monitored temperatures, these variables can be controlled to optimize olefin yields as well as minimize the formation of undesirable products, such as liquid product heavy ends boiling above 370° C.

In a continuous flow reactor, the reactor will typically have one or more inlets for introducing the plastic feedstock and the catalyst composition. The reactor will further have at least one outlet for removing reaction products from the reactor that is spaced from the one or more inlets along an overall reactor flow path, which may be substantially linear or non-linear. The flow path of the reactor has a length, which may be represented by the designation "L," between the one or more inlets and the outlet or outlets. In certain instances, the inlet from which the measurement L is made may constitute the location where both the plastic feed and catalyst contact one another after being introduced into the reactor, such as when the plastic feed and catalyst are introduced separately through separate inlets. This therefore may not be the location for the actual inlet(s) or inlet nozzle(s) itself where the plastic feed and catalyst do not actually contact one another at such location. Such position may be above or below any particular inlet. For most reactors having a linear configuration, the length L will typically be the length of the reactor as measured between the inlets and outlets. A batch type reactor may also have a similar configuration and the length L, as it is used in the temperature monitoring in accordance with invention, has application to batch reactions and reactors, as well. The length L of the reactor flow path will typically be the measurement between the inlet and outlet that are closest to one another if there are multiple inlets and outlets, unless expressly stated otherwise. In such other cases, the length L may be measured between any inlet and outlet, such as the most distant inlet and outlet, or the distance between intermediate positions located between multiple inlets and/or multiple outlets.

In certain instances, the reactor may have multiple feed and/or catalyst inlets that form local zones within the reactor. Each local zone may have its own local control scheme wherein the length L is the length between the inlet(s) of the particular zone and the outlet(s) of the reactor.

To facilitate monitoring of temperatures where the maximum or most rapid temperature changes occur within the reactor of a continuous flow reactor, temperature measurements are made using appropriate sensors at one or more locations that are adjacent to the inlet or inlets where the plastic and catalyst feed are introduced at a short temperature-monitoring distance. As used herein, the expression "short temperature-monitoring distance" or similar expressions is meant to be construed as the distance that is from 0.3 L or less from the one or more inlets where the catalyst and plastic feed are introduced. In certain embodiments, the short temperature-monitoring distance may be a distance of from 0.2 L or less from the inlet(s). In other embodiments, the short temperature-monitoring distance may be from 0.1 L or less from the inlet(s) or even 0.05 L or less from the inlet(s). The short temperature-monitoring distance may thus be from 0.3 L, 0.2 L, 0.1 L 0.05 L, 0.01 L, 0.005 L, 0.001 L or less from the inlet or inlets.

As an example, in a reactor, such as a fluidized bed riser or downer reactor, having a height or length that defines a flow path that is 18 meters long (i.e., L=18 meters), using 0.3 L or less as the criteria for short temperature-monitoring distance, temperature sensors may be placed from 0 meters to 5.4 meters (i.e., 0.3×18 meters) meters along the reactor flow path from the inlet(s) of the reactor.

In certain embodiments, the temperature measurements may be made at multiple positions such as at 3, 4, 5, 6, 7, 8, 9, or 10 or more different temperature-monitoring locations. Where multiple temperature-monitoring locations are used, some of them may be positioned at long temperature-monitoring distances. As used herein, the expression "long temperature-monitoring distances" is meant to be construed as those distances that are greater than 0.3 L from the one or more inlets where the catalyst and plastic feed are introduced. In most instances, however, at least 1, 2, 3, 4, 5, 6 or more of the temperature-monitoring locations will be within the short temperature-monitoring distance of from 0.3 L, 0.2 L, 0.1 L 0.05 L, 0.01 L, 0.005 L, 0.001 L or less from the inlet or inlets, with the remainder being at a long temperature-monitoring distance along the length of the reactor flow path L.

The temperature measurements may be made at two or more temperature-monitoring locations that may be spaced apart longitudinally and/or laterally at equal or non-equal distances from each other within the reactor. The temperature-monitoring locations may include being laterally spaced apart circumferentially and/or radially from one another in a plane that is perpendicular to a longitudinal axis of the flow path of the reactor at any given point along the reactor flow path. Thus, for example, temperature sensors may be provided near the center of the reactor, others near the reactor walls, and still others at intermediate positions between the center of the reactor and the reactor walls in any angular position. Such temperature sensors that are located at the same distance along the flow path L but that are at different lateral positions may sense a different temperature within the reactor such as due to improper mixing of reactor contents at that particular distance along the flow path.

The various monitored temperatures are continuously or periodically monitored during the course of the reaction. The monitored temperatures are weighted and used in a control scheme for the reactor. In one weighting method, the average temperatures of the monitored temperatures at any given time are averaged together to provide the weighted temperature value. In other instances, different weights can be assigned temperatures monitored at different positions. Thus, different weights may be provided not only to different longitudinal positions but also to lateral positions. For example if you have a core-annulus flow, with the core flow upwards and the annular flow downwards, then one might have lower temperatures near the walls and higher temperatures away from the walls. If for example, the plastic feed gets injected more in a lower temperature zone, then the reaction yield will be affected adversely and while injecting in a high severity zone the reaction yield might be as desired or better. Such weighting, however, in many instances will only be known upon operating a particular reactor unit. In certain cases, one could have a weighted average at lateral and longitudinal positions with the possibility of assigning weights as any fraction from 0 to 1. With whatever weighting method used, the monitored temperatures may be weighted or averaged in a computing block or device in a plant automation control system, such as a distributed control system (DCS), programmable logic controller (PLC), or similar system used for online plant monitoring and control.

The weighted temperature value is then used as an input to a temperature controller that computes the difference in the weighted measured value from a pre-set or pre-selected temperature value (set point) that is suitable for a desired product yield, such as a desired yield of olefins. In response to the difference in the weighted measured temperature and the set point, a controller can be programmed to control the system to provide an appropriate response. This may include altering or adjusting a) the catalyst composition introduced into reactor; b) the flow rate of the catalyst composition into the reactor; c) the flow rate of plastic feedstock into the reactor; and/or d) heat input used to heat the reactor, particularly where an isothermal or a preferred heating profile operation is desired. Such adjustments are usually carried out through the use of control valves actuated by an appropriate actuator.

The response from the controller may be proportionate to the difference of the weighted measured temperature and the set point to provide a proportionate signal to the control valves used for adjusting the various flows of catalyst and plastic feedstock. In this way, it is possible to maintain the weighted measured temperatures very close to the desired set value that provides the greatest yields of the desired products. The controller may be any type of control system suitable for such type of control that uses feedback from the monitored and/or weighted measured temperatures. This may include a proportional, proportional-integral (PI), proportional-integral-derivative (PID), etc., controller, commonly used in industrial process control.

Referring to FIG. 1, a schematic for a plastic conversion system 10 is shown with a particular control system. The conversion system 10 includes a reactor 12, which may be representative of a continuous flow circulating fluidized bed riser reactor or other suitable reactor. In FIG. 1, the reactor/riser 12 is where the reaction occurs when hot catalytic composition from a regenerator contacts the plastic feed. The catalyst along with products and any unconverted feed (heavies) exits the reactor 12 through a termination device and falls into a stripper 14. Here the catalyst is stripped of trapped hydrocarbons using steam. The steam stripped catalyst flows on level control (LIC) 16 via level control valve (LCV) 18 to regenerator 20. In the regenerator 20, the coke on the catalyst composition is burnt using oxygen, air or oxygen enriched air supplied by a blower or piped in and the catalyst is thus regenerated. The hot regenerated catalyst composition from the regenerator flows to the reactor 12 in response to temperature control (TIC) 22 via a temperature controlled valve (TCV) 24 through catalyst inlet 26. Plastic feed is introduced through inlet 28 of the reactor 12. In such reactor there is a continuous flow of feed to and withdrawal of products from the reactor. In the embodiment of FIG. 1, an average of temperatures monitored through different laterally and/or longitudinally positioned sensors 30, 32, 34 located at or a short temperature-monitoring distance (i.e., 0.3 L or less) from the catalyst and feed introduction points 26, 28 located at or near the bottom of the reactor 12 is used for controlling the catalyst flow from catalyst regenerator 20. This zone at or immediately downstream from the feed entry points is where maximum conversion of products occurs, as well as maximum temperature changes. The average temperature of the catalyst bed within this zone has the most impact on the products produced from the conversion process and their yields. This monitoring of and weighted averaging of temperatures solely near the feed and catalyst introduction points correlates to the short time-interval average bed temperatures (i.e. 2 minutes or less) in batch reactors.

The temperatures from the sensors (TE) 30, 32, 34 are periodically or continuously monitored and weighted or averaged in a computing block or device 36 that provides an average measured temperature that is provided as feedback to the temperature controller 22. The temperature sensors are of any suitable type and capable of monitoring catalyst bed temperatures. In the embodiment shown, the controller 22 controls temperature control valve 24 that allows the introduction of hot regenerated catalyst from regenerator 20. When a higher temperature is set, the valve 24 is opened to allow more hot catalyst to flow to the reactor 12 to facilitate the higher heat requirements in the reactor. In other applications, the controller 22 could be used to control other valves for the introduction of plastic feed, to adjust the particular catalyst composition, and/or adjust the heat input from an external heating source, such as where an isothermal or a preferred heating profile operation is desired. In still other embodiments, the controller 22 may be used to control other conditions or flows that facilitate control of the reaction.

In the embodiment shown, other temperature sensors 38, 40, 42, 44 are placed downstream along the length of the reactor 12 for monitoring the reaction but are not used in the process control in this example.

Steam or other fluidizing gas is added at different locations to maintain the proper fluidization and transfer operations. The feed to the reactor may be fed by a multiple of different methods including but not limited by for example through an extruder, by pneumatic transfer using, for example, a fluidizing gas, and through a controlled addition device, etc. Single or multiple cyclones linked by a manifold can be provided on the reactor stripper 14 (cyclone 46) and/or regenerator 20 (cyclone 48) to remove particulate matter exiting with the effluent from these vessels and returning collected particulate matter back to the beds in these vessels.

Figure 2:
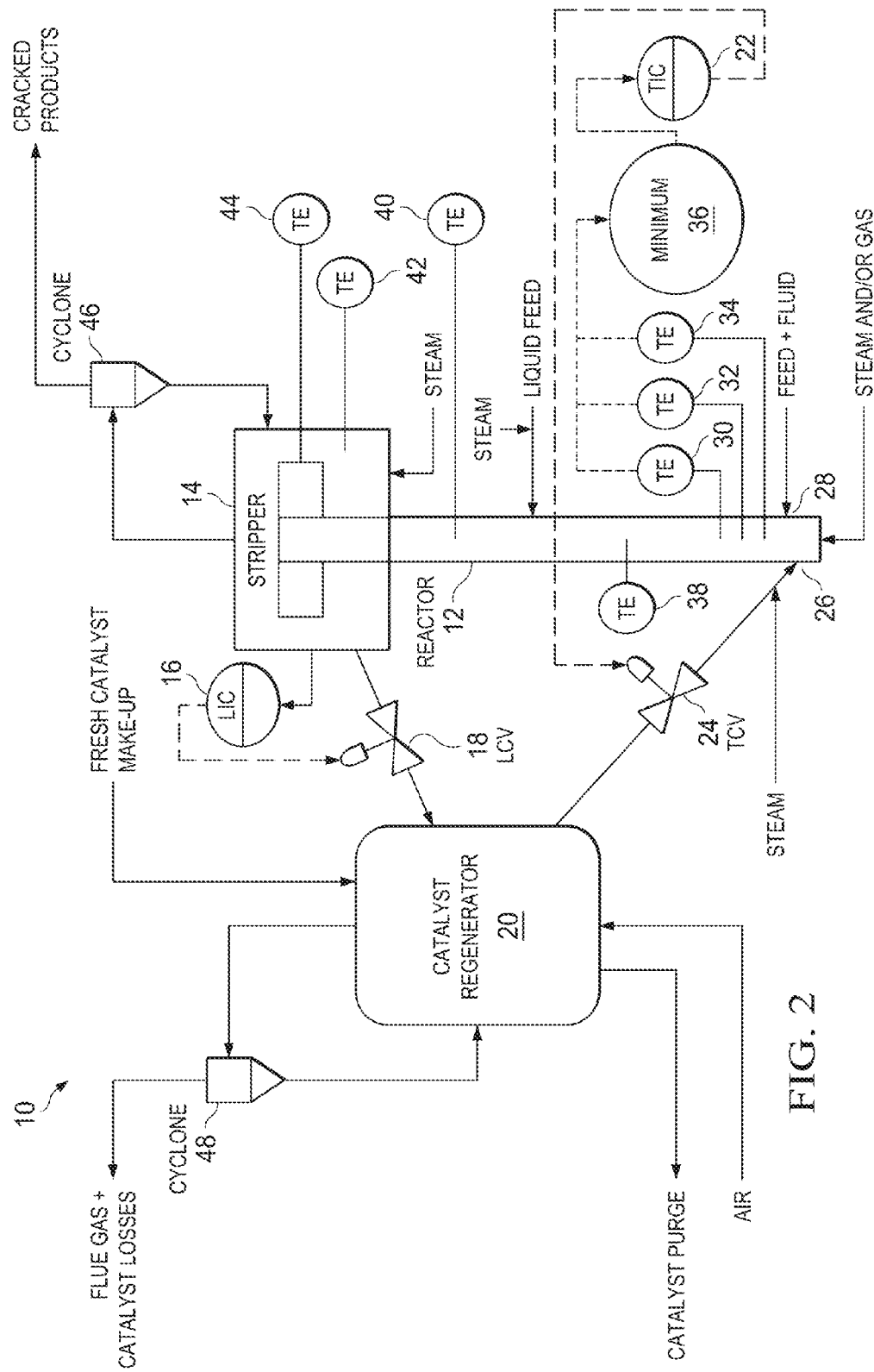
FIG. 2 is a schematic for a control system of a catalytic plastics pyrolysis reactor using a minimum longitudinal and lateral temperature monitored at a short temperature-monitoring distance near the reactor bottom.

Referring to FIG. 2, an alternate schematic for the plastic conversion system 10 of FIG. 1 with a particular control system, with similar components labeled with the same reference numerals, is shown. In this control schematic, the temperatures from the sensors 30, 32, 34 located at or a short temperature-monitoring distance (i.e., 0.3 L or less) from the catalyst and feed introduction points 26, 28 are used to provide a minimum temperature measured immediately after the introduction of feed at the reactor bottom. This is provided to the computing block or device 36 that determines the minimum measured temperature from any one of the sensors 30, 32, 34. This monitoring of minimum temperatures solely near the feed and catalyst introduction points correlates to the minimum bed temperature in batch reactors.

This minimum temperature is periodically or continuously monitored and is provided as feedback to temperature controller (TIC) 22. The point at which the feed and the hot catalyst are well mixed or equilibrated is the point beyond which the temperature may drop further but the drop is less steep as compared to the drop rate encountered prior to this. The well mixed temperature will typically be the lowest measured temperature immediately downstream of the feed introduction point. Based upon the temperature set for the controller 22 the valve 24 is opened to allow the appropriate amount of hot catalyst from the catalyst regenerator 20 to supply the necessary heat requirements in the reactor 12 for supporting the endothermic reaction for the operating throughput and to provide the desired product yields. In other applications, the controller 22 could be used to control other valves for the introduction of plastic feed, to adjust the particular catalyst composition, and/or adjust the heat input from an external heating source, such as where an isothermal or a preferred heating profile operation is desired. In still other embodiments, the controller 22 may be used to control other conditions or flows that facilitate control of the reaction.

Figure 3:
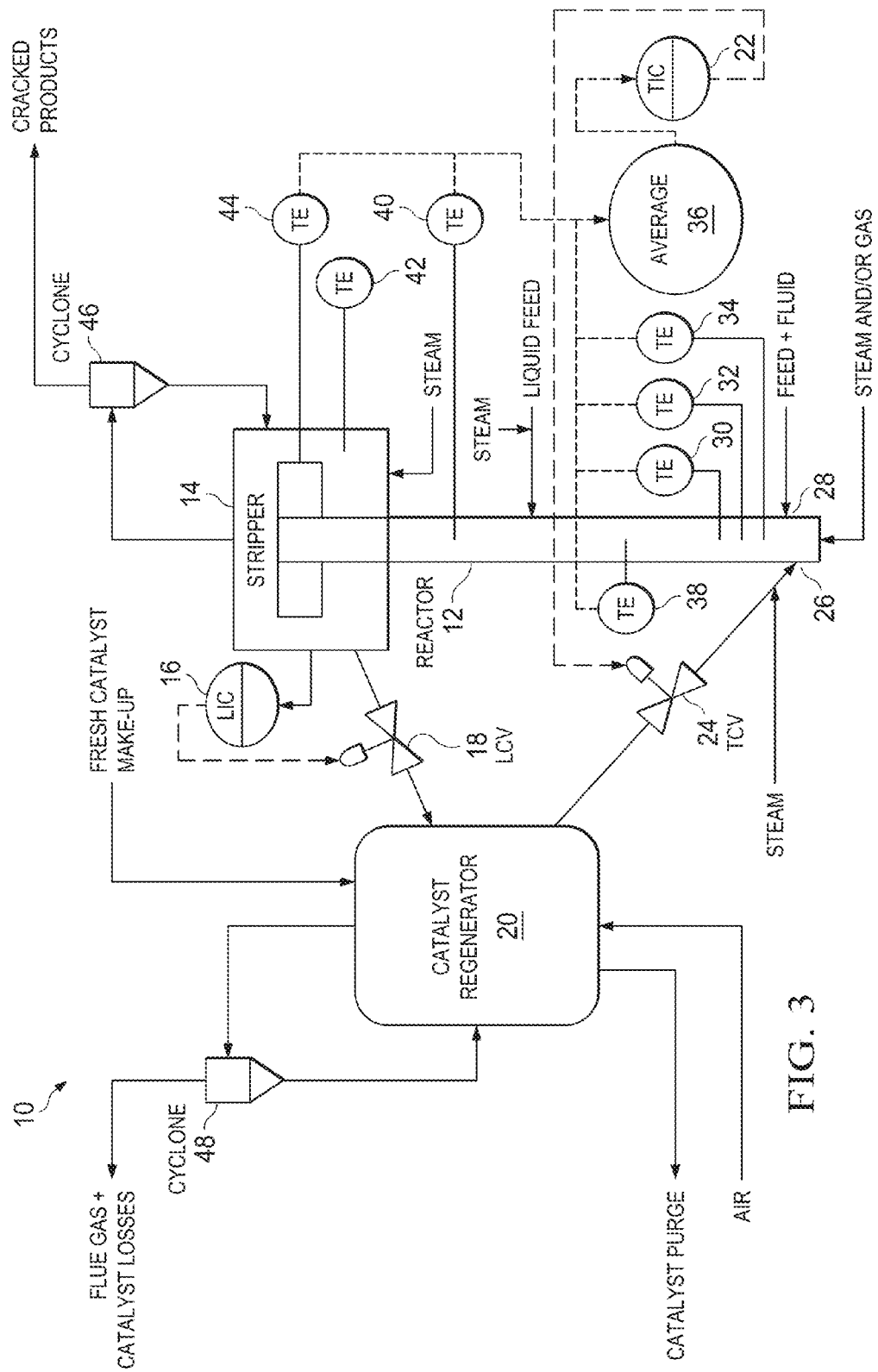
FIG. 3 is a schematic for a control system of a catalytic plastics pyrolysis reactor using average longitudinal and lateral temperature monitored at distances along the length of the reactor.

Referring to FIG. 3, another schematic for the plastic conversion system 10 of FIG. 1 with a particular control system, with similar components labeled with the same reference numerals, is shown. In this control schematic, the temperatures from the sensors 30, 32, 34 located at a short temperature-monitoring distance (i.e., 0.3 L or less) from the catalyst and feed introduction points 26, 28 are used in combination with long temperature-monitoring distances (i.e., >0.3 L) from the feed introduction points and may be located along substantially the entire length of the reactor flow path at different positions. Here, measured temperatures monitored with differently located sensors 38, 40 and 44, which are located downstream from sensors 30, 32, 34, are positioned at intermediate portions of the reactor 12 and near the product outlet of the reactor 12. The measured temperatures from sensors 38, 40 and 44 are provided to the computer block of device 36 and weight-averaged with the temperatures from the sensors 30, 32, 34. The computing block 36 provides a weighted-average measured temperature from the sensors 30, 32, 34, 38, 40 and 44, which is provided as feedback to temperature controller (TIC) 22. This correlates to long time-interval average bed temperatures determined in batch reactors, where the bed temperatures are monitored over times of greater than 2 minutes (e.g. 10 minutes) and averaged together.

These temperatures are periodically or continuously monitored, weight-averaged and provided as feedback to temperature controller (TIC) 22. The well mixed temperature will be the lowest measured temperature immediately downstream of the feed introduction point. Based upon the temperature set for the controller 22, the valve 24 is opened to allow the appropriate amount of hot catalyst from the catalyst regenerator 20 to supply the necessary heat requirements in the reactor for supporting the endothermic reaction for the operating throughput and to provide the desired product yields. In other applications, the controller 22 could be used to control other valves for the introduction of plastic feed, to adjust the particular catalyst composition, and/or adjust the heat input from an external heating source, such as where an isothermal or a preferred heating profile operation is desired. In still other embodiments, the controller 22 may be used to control other conditions or flows that facilitate control of the reaction.

The above-described control schemes differ from conventional control schemes used in FCC units in that in conventional control of FCC units only the temperature at the outlet of the reactor is monitored and provided as feedback to any control unit. The temperature near the outlet of the reactor, however, is located at a far distance from where maximum conversion and temperature changes occur within the reactor. This results in a poor correlation with the products and yields that are being produced in the reactor. If the outlet temperature is the sole temperature used as feedback to a controller, it would not provide the desired degree of control or assure the desired yield of products in contrast to the control schemes of the invention.

The pyrolysis products produced in the reactions include light gas olefins, such as ethylene, propylene, butenes, etc., and aromatics, such as benzene, toluene, xylenes, and ethyl benzene. These may be selectively produced in large quantities. Complete conversion of the feed plastics to various products occurs. Products produced include gases ($H_2$—$C_4$), gasoline or naphtha (boiling point 35-220° C.), diesel (boiling point 220-370° C.), a small fraction of heavier stream (boiling point>370° C.) and coke. The yield of various products could be varied by using different catalyst recipe or any or all of the above mentioned parameters including contact time, fluidization flow rate and specific features of the reactor hardware, such as diameter, length or feed and/or gas distribution design or mixing/contacting related hardware modifications, recycles of products into the reactor for further conversion and such other parameters. Saturated products, such as methane, ethane, propane, and butanes, are also produced, as well as hydrogen gas ($H_2$). In testing, low yields of methane and butadiene were obtained (<2 wt. % and 0.5 wt. %, respectively) when employing the particular weighted monitored temperatures. This indicates that even though the weighted temperature severity employed is high (e.g., 550° C. or higher), the observed activity is predominantly probably due to catalytic activity than thermal cracking. The catalyst composition can be used under conditions that successfully suppress methane formation and at the same time offer high conversions and minimize heavy products. The process also minimizes the formation of heavy liquid products, i.e., those product heavy ends boiling above 370° C.

The use of the ZSM-5 zeolite catalyst in combination with FCC catalyst also facilitates cleaving the side chains of alkylated aromatics as well as suppresses isomerization activity to iso-paraffins. This results in increased production of light gas olefins hydrocarbons and aromatics. The ZSM-5 catalyst also acts on hydrocarbons in the gasoline range of $C_5$ to $C_{12}$ to convert them to light gas olefins.

Thus, by use of a combination of operating conditions and catalyst composition in the pyrolysis conversion itself can provide increased yields of light gas olefins and aromatics.

In the present invention, the reactors may be operated where the reactor has 1) a time-interval average catalyst bed temperature of from 470° C. to 730° C. wherein the time interval is 3 minutes or less for batch reactor from the start of the reaction; or 2) a temperature in the reactor of from 470° C. to 730° C. at at least one location that is from 0.3 L or less from the at least one inlet where the plastic feedstock and the catalyst composition are introduced, where L is the length of the reactor flow path can result increased yields of light gas olefins and aromatics. In certain cases, weighted or averaged monitored temperatures in the reactor ranging from 470° C. to 730° C. at two or more locations that is from 0.3 L or less and/or to 0.3 L or greater from at least one inlet where the plastic feedstock and the catalyst composition are introduced, where L is the length of the reactor flow path, can result in increased yields of light gas olefins and aromatics.

Higher reaction temperatures can increase yields of aromatics in pyrolysis conversion. In certain embodiments, the reactor may be operated to maintain the weighted or average temperature of two or more different monitored temperature locations or time-interval average bed temperatures to be at least 550° C. For isothermal continuous flow and adiabatic or isothermal batch reactions the temperatures may be from 420° C. or above. In some embodiments, the reactor is operated to maintain the weighted or average temperature of two or more different monitored temperature locations to be at least 570° C. or higher. In other embodiments, the reactor is operated to maintain the weighted or average temperature of two or more different monitored temperature locations or time-interval average bed temperatures to be from 550° C. to 730° C., more particularly from 570° C. to 680° C., 690° C. or 700° C.

In a continuous flow reactor to provide the desired products of light olefins at desired yields, the reactor is operated to provide a selected weighted or averaged temperature. This may be done according to the control schemes of the invention as they have been described above. The above-described temperature monitoring and control schemes are further described in copending U.S. application Ser. No. 13/764,923, filed Feb. 12, 2013, published as U.S. Pat. App. Pub. No. US2014/0228605, which is hereby incorporated herein by reference in its entirety for all purposes.

Additionally, while the use of certain catalyst compositions and control schemes in plastic pyrolysis reactions provide high yields of light gas olefins and aromatics, further increases in these products can be achieved. The liquid products, which may be on a substantially aromatics-free basis, may be further processed to even further increase yields of aromatics and/or light gas olefins.

Figure 14:
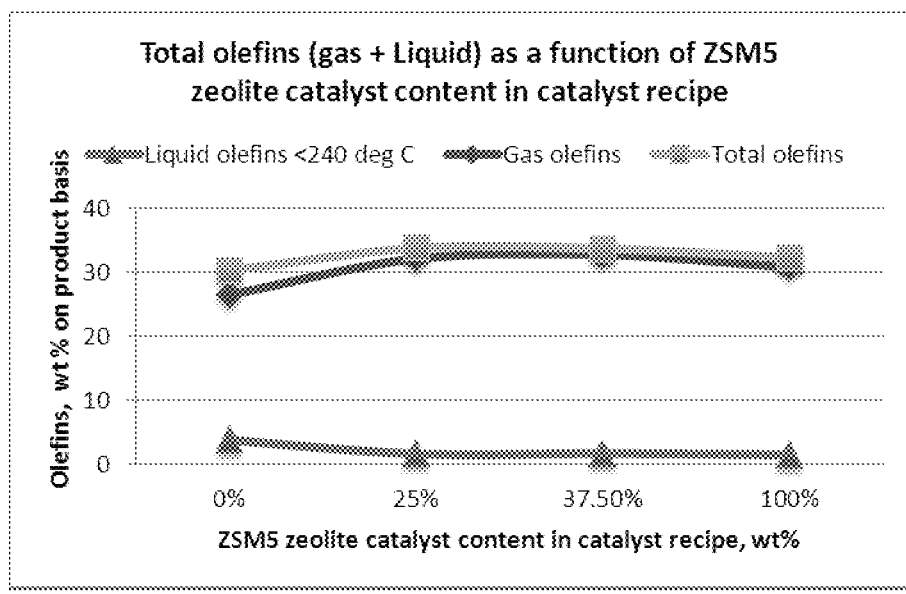
FIG. 14 is a plot of total olefin yields as a function of ZSM-5 zeolite catalyst content of the catalyst composition used in plastics pyrolysis conversion reactions.
Figure 15:
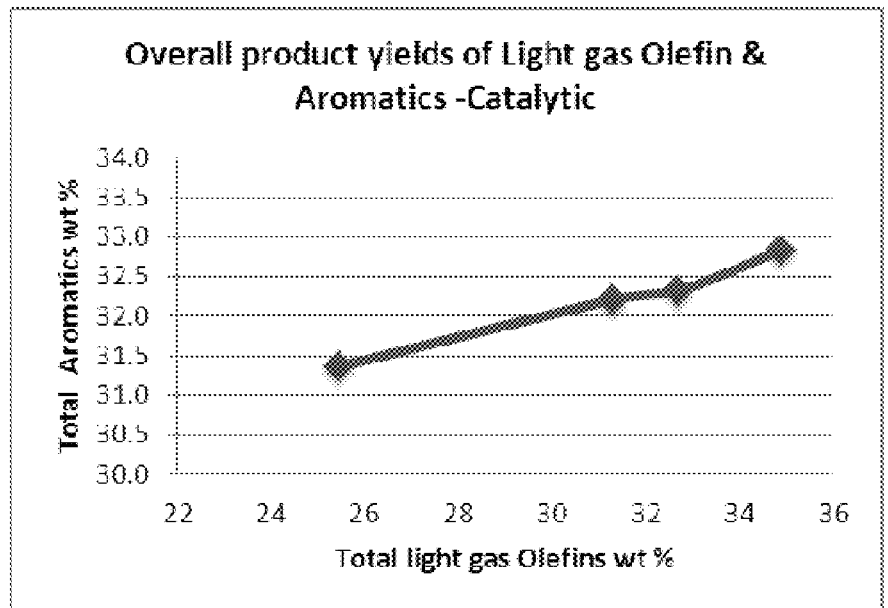
FIG. 15 is a plot of the total aromatic products as a function of total light gas olefins produced in plastic pyrolysis conversion reactions.

In the pyrolysis of plastics to produce high yields of light gas olefins and aromatics in accordance with the methods described above, it has been found that there is a correlation between the production of light gas olefins and aromatic products. In particular, it has been found that there is a substantially one-to-one correlation between the light gas olefin and aromatic products produced. That is, the catalyst composition and conditions employed help in simultaneous increase in yields of light gas olefins and aromatic products, both of which are valuable products. Thus, the process does not necessarily favor one product over the other. This is evidenced as a linear increase in light gas olefins yields with increasing aromatic product yields, and vice versa, as shown in FIGS. 14 and 15 of the examples. This means in commercial scale operations, it is possible to not only produce light gas olefins at a particular demand but also produce aromatics at a particular demand by adjusting operating conditions or operations, such as catalyst composition (i.e., ZSM-5 zeolite catalyst content) in the recipe, short-time-interval or short temperature-monitoring distance used in control schemes and others, as have been disclosed.

Figure 4:
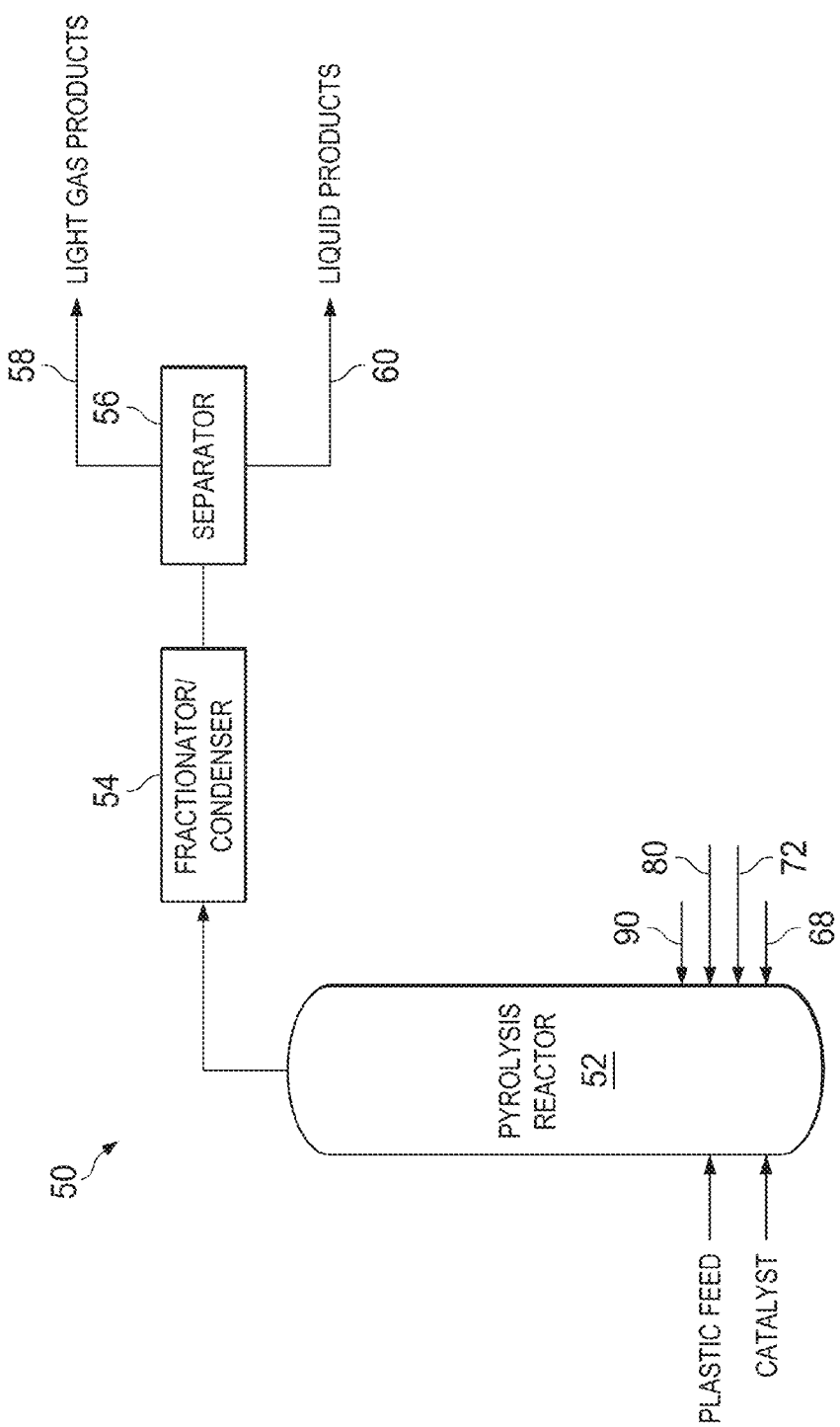
FIG. 4 is process flow diagram for a catalytic plastics pyrolysis system that produces light gas and liquid products in accordance with the invention.

Referring to FIG. 4, a conversion system 50 configured in accordance with the invention wherein plastic feed and catalyst are introduced into a pyrolysis reactor 52 is shown. The pyrolysis products from the reactor 52 are typically passed to a unit 54, which may be a fractionation column with a condenser or alternately a condenser. The condenser 54 is typically operated to provide condensation of products having a boiling point lower than 35° C. at standard atmospheric conditions. Products from the condenser 54 may be passed to a separator 56, where light gas products 58 may be separated from liquid products 60. The light gas products 58 typically include the light gas olefins, such as ethylene, propylene, butenes, etc. Saturated products, such as methane, ethane, propane, and butanes, may also be contained in the light gas products.

These light gas products can be separated as required into methane, ethane, ethylene, propane, propylene, butanes, butene isomers etc. by utilizing appropriate sized distillation columns or by using component specific adsorption columns or membrane systems known commercially for separating gaseous hydrocarbons or a combination of these. Typically, this separation section configuration can be adapted from or be similar to the furnace downstream section of a steam cracking of naphtha or gas plant, or it could be adapted from or be similar to a gas plant section of a fluid catalytic cracking (FCC) unit. Where unit 54 is a fractionation column, overheads of the fractionation column would yield gas products that are separated as discussed above, while separate liquid boiling cut fractions may be withdrawn as side and bottom cuts (naphtha 35-220° C. and diesel 220-370° C. as side cuts and heavies boiling above 370° C. as a bottoms cut product from the fractionation column. Any other intermediate boiling fraction cuts in the range 35° C. to final boiling point of liquid can also be specified for such cuts. In such a case, the downstream gas-liquid separator 56 is not required.

The liquid products 60 may be processed in a variety of different ways to further increase light olefin gas and aromatic yields. As discussed above, the liquid products contain a range of components of which some components might boil at temperatures higher than 220° C. or 240° C. The liquid products 60 will contain both aromatic compounds and non-aromatic compounds. The liquid aromatic compounds of benzene, toluene, xylenes, and ethyl benzene, all boil below 240° C. and are commercially desirable. Non-aromatic liquid compounds will typically be composed of iso-paraffins, paraffins, naphthenes and olefins, with the dominant product being isoparaffins at higher severities of operating temperature and catalyst-to-feed ratio.

Figure 5:
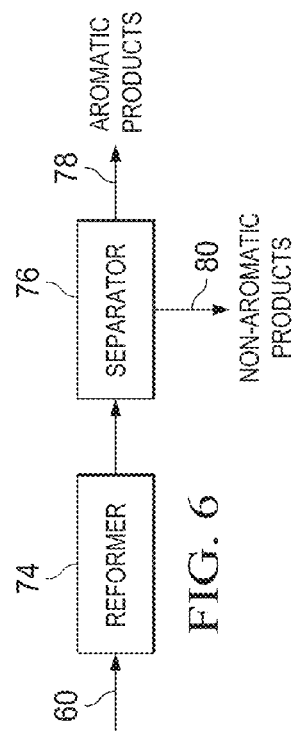
FIG. 5 is a process flow diagram for liquid products from the pyrolysis system of FIG. 4, wherein the aromatic and non-aromatic liquid products are separated, with the non-aromatic liquid separated products being provided directly for recycle to a pyrolysis unit or to a hydroprocessing unit, wherein the hydroprocessed products are provided for recycle to a pyrolysis unit.

As shown in FIG. 5, in one technique for increasing light gas olefins and aromatics, the liquid products, such as the liquid products 60 of FIG. 4 or liquid products from the fractionator/condenser 54, are passed to a further separator 62 where liquid aromatic products 64 are separated from non-aromatic products 66. The separator 62 may be any system suitable for separation or extraction of aromatics from non-aromatic hydrocarbons, such as solvent extraction, extractive distillation, etc. Examples of such commercially existing separation processes are those based on use of blended solvents or sulfolane or N-formylmorpholine or N-methylpyrrolidone or glycols or glycol blends extraction. A non-limiting feed for separator 62 would be a naphtha product drawn from fractionator column 54 of FIG. 4. A portion of the liquid products 60 may not be processed for aromatics separation, but instead be directly processed by hydroprocessing or other techniques disclosed.

It should be understood, that the liquid aromatic products 64 may contain some amount of non-aromatic compounds, such as olefins, but will be composed predominantly of aromatic compounds so that it constitutes an "aromatic-rich separated product." Accordingly, the use of the expression "liquid aromatic separated products," "aromatic separated products" or similar expressions with respect to such separated products is meant to refer to such aromatic-rich separated products that may contain small quantities of non-aromatic compounds, unless expressly stated otherwise. Similarly, the non-aromatic products 66 may contain some amount of aromatic compounds, but will be composed predominantly of non-aromatic compounds so that it constitutes a non-aromatic-rich separated product. Accordingly, the use of the expression "liquid non-aromatic separated products," "non-aromatic separated products" or similar expressions with respect to such separated products is meant to refer to such non-aromatic-rich separated products that may contain small quantities of aromatic compounds, unless expressly stated otherwise. All or a portion of the non-aromatic separated product 66 may then be recycled as recycle stream 68 to the pyrolysis reactor 52 (FIG. 4) or other pyrolysis reactor(s) of the system where they are further cracked to form olefins and aromatics, as has been described. In such instances, no additional hydrogen enrichment of the non-aromatic separated product, such as through hydroprocessing, may be conducted.

In another technique for increasing light olefin gas and aromatics, the non-aromatic separated product, such as the product stream 66 (FIG. 5), may be further processed by saturating the liquid non-aromatic separated product with hydrogen, such as in the hydroprocessing unit 70. This hydrogenates the unsaturated olefin and naphthene molecules to saturate them to their respective paraffins. Hydrogenating such compounds makes them more crackable. The products can thus be more readily converted to olefins and aromatics in a pyrolysis reactor. The hydroprocessed product stream 72 can then be recycled back to the pyrolysis reactor, such as the reactor 52 of FIG. 4 or other reactor.

The hydroprocessing catalysts can be any suitable hydroprocessing catalyst. Typically Co/Mo on alumina or Ni/Mo on alumina or tungsten/Mo on alumina or multi-metallic catalysts on alumina or other substrates, noble metal catalysts are used for hydroprocessing. The process is usually carried out in a fixed bed reactor or reactors, in single/multi-stage, at low to high severity of operations (e.g., pressures ranging from 20-100 bar(g) (2-10 MPa) or higher and temperatures from 280-450° C.). Other options like ebullated or slurry bed hydroprocessing can also be adopted.

Figure 6:
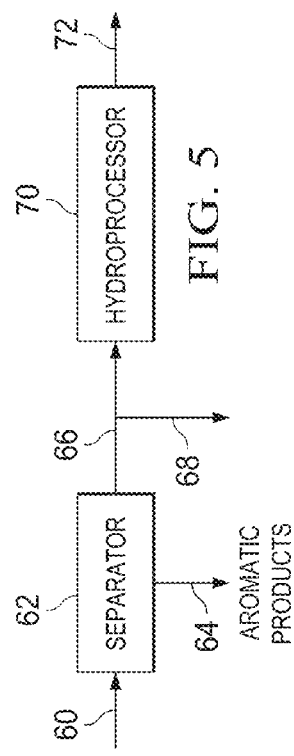
FIG. 6 is a process flow diagram for liquid products from the pyrolysis system of FIG. 4, wherein the liquid products are reformed, with the reformed products being directed to a separator wherein the aromatic and non-aromatic liquid products are separated, with the non-aromatic liquid separated products being provided for recycle to a pyrolysis unit.

In other embodiments, the liquid products from the pyrolysis reactions, such as the liquid products 60 of FIG. 4 or liquid products from fractionation column 54, are directed to a catalytic reformer 74, as shown in FIG. 6, without any separation of aromatics and non-aromatics. Such non-aromatics may include n-paraffins, iso-paraffins, olefins and naphthenes. In a typical pyrolysis conversion according to the invention, the total n-paraffins, olefins and naphthenes may make up from 20 wt. % to 60 wt. % of the liquid products on an aromatics-free basis. The reforming step facilitates the conversion of these non-aromatic compounds directly to aromatics. This is useful because it is difficult to separate aromatics as a pure stream from other hydrocarbons when olefins are present with the aromatics. Therefore any extracted or separated aromatics in a solvent extraction or extractive distillation step would typically be contaminated with olefins. The n-paraffins, olefins and naphthenes may be readily converted to aromatics through catalytic reforming.

The reforming may be carried out using conventional reforming techniques. The reforming processes could employ fixed or moving beds of catalysts. Typical reforming catalysts that may be used may include Pt on alumina, Pt—Re on alumina, Pt—Sn on alumina, Ni on alumina and other such catalysts known for their aromatizing activity in addition to any combination of these with zeolites (ZSM5) to enhance aromatization by some amount of cracking. Typical conditions include temperatures of 370-700° C. and pressures from 2-50 bar (g) (0.2-5 MPa). A non-limiting example for such reforming would be to subject only the naphtha cut from the fractionation column 54 of FIG. 4 to reforming, while the rest of the liquid products are subjected to other processes disclosed herein.

The majority of the liquid products from the pyrolysis conversion boil in the gasoline (i.e., $C_5$ to $C_{12}$ hydrocarbons) range, with smaller quantities of liquid products boiling above the $C_{12}$ range. In certain embodiments, the liquid products boiling above the $C_{12+}$ range can be separated from those having a lower boiling point and recycled back to the pyrolysis unit. The liquid products in the $C_5$ to $C_{12}$ range (i.e., naptha) may be then be directed to a catalytic naphtha reformer.

In certain embodiments, a pyrolysis reactor unit may be used for the reforming step. The pyrolysis unit can be provided with a different set of operating conditions and catalyst to reform the pyrolysis liquid products to provide a higher yield of aromatics.

The balance of the non-aromatic liquid products that are not converted to aromatics in the reformer may be made up of iso-paraffins. Iso-paraffins may be less prone to conversion in the reforming step. Iso-paraffins may be formed in the reforming process by rapid isomerization of paraffins. The various reactions that occur during reforming are isomerization of paraffins to iso-paraffins, dehydrocyclization of paraffins to aromatics, dehydroisomerization and dehydrogenation of naphthenes to aromatics, hydrocracking, coke formation and saturation of olefins. Because iso-paraffins may not be converted in a reforming step, the output from the reformer 74 may be passed to a separator 76, as shown in FIG. 6, where liquid aromatic separated products 78 are separated from liquid non-aromatic separated products 80. The separator 76 may be any system suitable for separation or extraction of aromatics from non-aromatic hydrocarbons, such as described previously for separator 62 of FIG. 5. The non-aromatic separated products 80 many then be recycled or fed to a pyrolysis unit, such as the pyrolysis unit 52 of FIG. 4. This facilitates conversion of the iso-paraffins to olefins and aromatics, as well as lower iso-paraffins.

Figure 7:
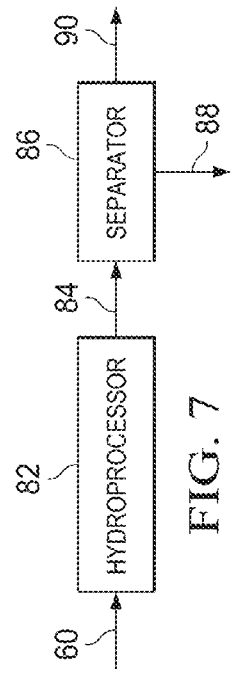
FIG. 7 is a process flow diagram for liquid products from the pyrolysis system of FIG. 4, wherein the liquid products are hydroprocessed, with the hydroprocessed products being directed to a separator wherein the aromatic and non-aromatic liquid products are separated, with the non-aromatic liquid separated products being provided for recycle to a pyrolysis unit.

FIG. 7 shows still another embodiment for increasing light olefin gas and aromatics from the liquid products from the pyrolysis conversion. Here, liquid products, such as the liquid products 60 of FIG. 4 or liquid products from fractionation column 54, are passed to a hydroprocessing unit 82 where liquid products are saturated with hydrogen. This hydrogenates the unsaturated olefin and naphthene molecules to saturate them to their respective paraffins. Hydrogenating such compounds makes them more crackable and reduces olefin content of the liquid product so that non-aromatics may be more readily separated from aromatics. The hydroprocessed liquid products 84 may then be directed to a separator 86, which may be any system suitable for separation or extraction of aromatics from non-aromatic hydrocarbons, such as described previously for separator 62 of FIG. 5, where liquid aromatic separated products 88 are separated from liquid non-aromatic separated products 90. The extent of hydroprocessing can be varied from a saturation of olefins and ring opening of naphthenes to saturation (less severe) to hydrocracking involving ring opening of aromatics and cracking of paraffins. Depending on the severity of operation, the extracted aromatics from separator 86 can be varied. The non-aromatic liquid separated products 90 may then be recycled to a pyrolysis reactor, such as the reactor 52 of FIG. 4 or other reactor.

Figure 8:
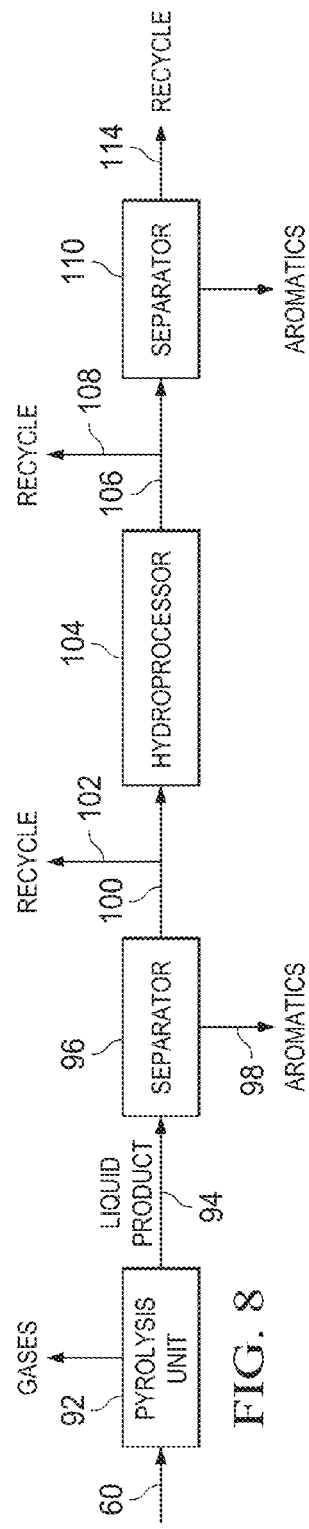
FIG. 8 is a process flow diagram for liquid products from the pyrolysis system of FIG. 4, wherein the liquid products are sent to a pyrolysis unit and the liquid products from this latter pyrolysis unit is separated into aromatics and non-aromatics. The non-aromatics are recycled back to pyrolysis unit or hydroprocessed and recycled back to pyrolysis unit.
Figure 9A:
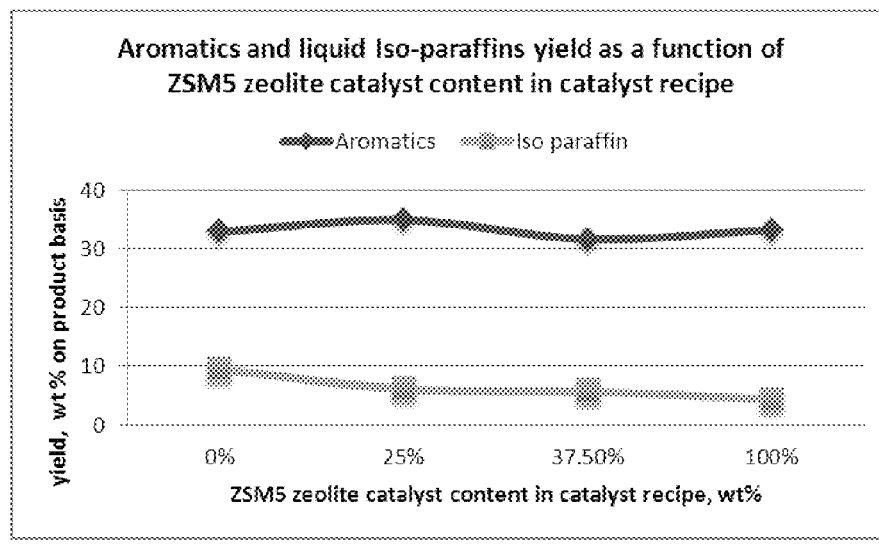
FIG. 9A is a plot of overall aromatics and iso-paraffin yields as a function of ZSM-5 zeolite catalyst content of the catalyst composition used in plastics pyrolysis conversion reactions.
Figure 9B:
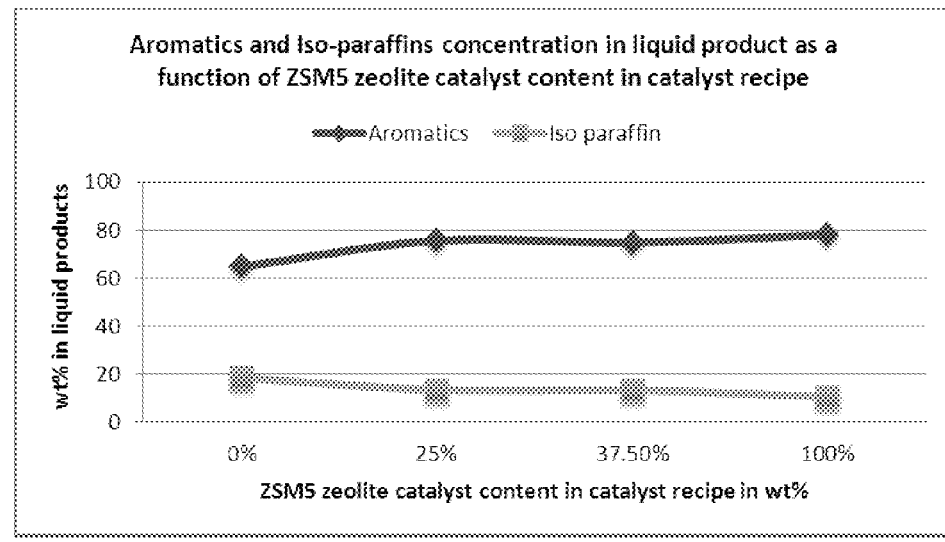
FIG. 9B is a plot of aromatics and iso-paraffin yields in liquid products boiling below 240° C. as a function of ZSM-5 zeolite catalyst content of the catalyst composition used in plastics pyrolysis conversion reactions.
Figure 10A:
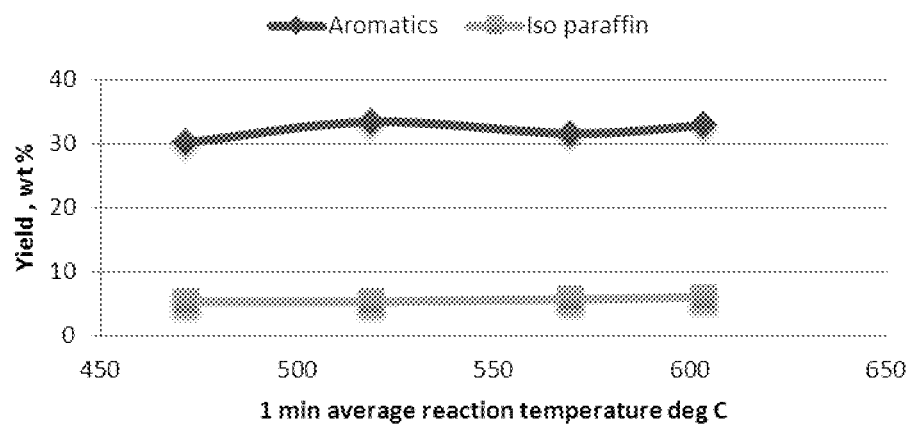
FIG. 10A is a plot of overall aromatics and iso-paraffin yields as a function of one-minute average reactor bed temperatures in plastic pyrolysis conversion reactions.
Figure 10B:
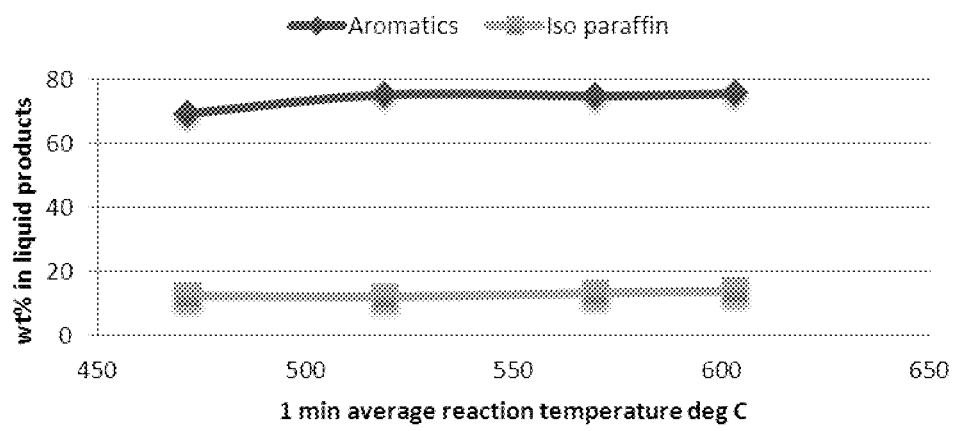
FIG. 10B is a plot of aromatics and iso-paraffin yields in liquid products boiling below 240° C. as a function of one-minute average reactor bed temperatures in plastic pyrolysis conversion reactions.

FIG. 8 shows still another embodiment for increasing light olefin gas and aromatics from the liquid products from the pyrolysis conversion. Here, liquid products, such as the liquid products 60 of FIG. 4 or liquid products from fractionation column 54, are sent to a second pyrolysis unit 92 and the liquid products 94 from this latter pyrolysis unit 92 is separated in separator 96 into aromatics 98 and non-aromatics 100. The non-aromatics 100 may be recycled back as recycle stream 102 to a pyrolysis unit, such as unit 52 of FIG. 4 or pyrolysis unit 92. The non-aromatics products may also be hydroprocessed, such as in hydroprocessor 104. All or a portion of the hydroprocessed products 106 may be recycled in a recycle stream 108 to the pyrolysis unit 52 (FIG. 4) or pyrolysis unit 92. All or a portion of the hydroprocessed products 106 may also be directed to a separator 110 where the products are separated into aromatics 112 and non-aromatics 114. The non-aromatics 114 may be further processed by recycling them back to the pyrolysis unit 52 (FIG. 4) or pyrolysis unit 92.

Any one or a combination of the above-described processing techniques downstream of the pyrolysis unit for increasing light olefin gas and aromatics may be used to increase light gas olefin and aromatics production.

The light gas olefin and aromatic products produced in accordance with the invention can be used in a variety of processes. For example the light gas olefins formed (ethylene, propylene and butenes) can be used in polymerization, the aromatics can be used as building blocks for derivatives or can be used as such in specific applications, the saturated gases can be cracked further to light gas olefins or can be directed to fuel gas ($H_2$, methane and ethane) for use in furnace firing as fuel for processes like steam naphtha crackers and liquefied petroleum gas (LPG) ($C_3$-$C_4$) pool or can be used as a fuel in the pyrolysis or any other process. The coke formed can be used as an energy source for supplying the necessary heat requirements for the pyrolysis process. Any deficiencies in heat balance of the pyrolysis process could be overcome by injecting heavies (undesired products) or cracked products into the reactor (making additional coke) or by firing of heavy products in a regenerator as fuel without using any other auxiliary fuel. Cracked liquid products are rich in aromatics and hence when subjected to cracking again can result in coke lay down on the catalyst.

The following examples serve to further illustrate the invention.

EXAMPLES

Experimental

In each of the examples presented below, an in-situ fluidized bed lab tubular reactor having a length of 783 mm and an inner diameter of 15 mm was used. The reactor was housed in a split-zone 3-zone tubular furnace with independent temperature control for each zone. The size of each zone was 236.2 mm. The overall heated length of the reactor placed inside the furnace was 591 mm. The reactor wall temperature was measured at the center of each zone and was used to control the heating of each furnace zone. The reactor had a conical bottom and the reactor bed temperature was measured using a thermocouple housed inside a thermowell and placed inside the reactor at the top of the conical bottom. Also, the reactor wall temperature was measured at the conical bottom to ensure that the bottom of the reactor was hot. The reactor bottom was placed at the middle of the furnace bottom zone for minimizing the effect of furnace end cap heat losses and maintaining the reactor bottom wall temperature within a difference of 20° C. of the internal bed temperature measured. One-minute average reaction temperatures were determined by using formula (1) where $T_f=1/N \times (T_1+ \ldots +T_{N-3}+T_{N-2}+T_{N-1}+T_N)$, where N is the number of instances of temperature measurement. Temperatures were measured at time t=0, 10, 20, 40 and 60 s after charging of feed and catalyst mixture and these were arithmetic averaged (by assigning equal weights) to get the one-minute average reaction temperature as used in the FIGS. 9-28.

The plastic feeds were in the form of a 200 micron plastic powder. The FCC catalyst was a spent FCC catalyst obtained from an operating refinery. The FCC spent catalyst used had a residual coke on it of 0.23 wt. %. The ZSM-5 zeolite catalyst used was a commercially available ZSM-5 zeolite catalyst. The plastic feed was mixed with catalyst by swirling in a cup and then fed into the reactor. The plastic feed had the composition set forth in Table 2 below.

TABLE 2

| Material | Amount |
| --- | --- |
| HDPE | 19 wt. % |
| LDPE | 21 wt. % |
| PP | 24 wt. % |
| C4-LLDPE | 12 wt. % |
| C6-LLDPE | 6 wt. % |
| PS | 11 wt. % |
| PET | 7 wt. % |

The conversion products from the reactor were collected and condensed in a condenser. The uncondensed products were collected in a gas collection vessel and the gas composition was analyzed using a refinery gas analyzer (M/s AC Analyticals B.V., The Netherlands). Liquid products were characterized for their boiling point distribution using a simulated distillation GC (M/s AC Analyticals B.V., The Netherlands). In addition a detailed hydrocarbon analysis (up to C13 hydrocarbons) was carried out using a DHA analyzer (M/s AC Analyticals B.V., The Netherlands). The coke deposited on the catalyst was determined using an IR-based CO and $CO_2$ analyzer. The mass balances were determined by summing the yields of gas, liquid and coke. Individual product yields were determined and reported on a normalized product basis.

Example 1

Plastic feed and different catalysts compositions comprised of 0 wt. %, 25 wt. %, 37.5 wt. %, and 100 wt. % ZSM-5 zeolite catalyst, with the remainder being spent FCC catalyst, were used in pyrolysis conversion. The reactor was operated at a reaction temperature at start of reaction of 670° C. The one-minute average bed temperatures achieved are provided in Tables 3A and 3B below. Fluidization $N_2$ gas flow rate used was 175N cc/min. The catalyst/feed (C/F) ratio used was ~6 and the plastic feed charged was 1.5 g of a composition presented in Table 2. Overall aromatic and liquid iso-paraffin product yields and aromatic and liquid iso-paraffin content in liquid product boiling below 240° C. as a function of ZSM-5 zeolite catalyst content were determined and are presented in FIGS. 9A and 9B, respectively. As can be seen in these figures, the yields of liquid iso-paraffins products and iso-paraffins content in the liquid product decrease with an increase in ZSM-5 zeolite catalyst content in the catalyst composition. The aromatics in the liquid product generally increase with the ZSM-5 catalyst content.

TABLE 3A

| | | Catalyst Composition | | | |
| --- | --- | --- | --- | --- | --- |
| | Wt. % | Spent FCC catalyst (100%) | Spent FCC catalyst (75%) + ZSM5 zeolite Catalyst (25%) | Spent FCC catalyst (62.50%) + ZSM5 zeolite catalyst (37.5%) | ZSM5 zeolite catalyst (100%) |
| C/F ratio | g/g | 6.00 | 5.98 | 6.0 | 5.91 |
| Reaction temperature at start | ° C. | 670 | 670 | 670 | 670 |
| 1 min average reaction temperature | ° C. | 565.6 | 567.8 | 569.6 | 566.2 |
| Dry catalyst fed | g | 9.00 | 8.97 | 8.95 | 8.87 |
| Feed weight transferred | g | 1.50 | 1.50 | 1.50 | 1.50 |
| Yield of Aromatics boiling below 240° C. | Wt. % | 32.86 | 34.85 | 31.60 | 33.16 |
| Yield of Isoparaffins boiling below 240° C. | Wt. % | 9.35 | 6.19 | 5.76 | 4.47 |

TABLE 3B

| | | Catalyst Composition | | | |
| --- | --- | --- | --- | --- | --- |
| | Wt. % | Spent FCC catalyst (100%) | Spent FCC catalyst (75%) + ZSM5 zeolite Catalyst (25%) | Spent FCC Catalyst (62.50%) + ZSM5 zeolite catalyst (37.5%) | ZSM5 zeolite catalyst (100%) |
| C/F ratio | g/g | 6.00 | 5.98 | 6.0 | 5.91 |
| Reaction temperature at start | ° C. | 670 | 670 | 670 | 670 |
| 1 min average reaction temperature | ° C. | 565.6 | 567.8 | 569.6 | 566.2 |
| Dry catalyst fed | g | 9.00 | 8.97 | 8.95 | 8.87 |
| Feed weight transferred | g | 1.50 | 1.50 | 1.50 | 1.50 |
| Aromatics conc. In liquid products boiling below 240° C. | Wt. % | 64.62 | 75.50 | 74.72 | 77.89 |

TABLE 3B-continued

| | Wt. % | Spent FCC catalyst (100%) | Spent FCC catalyst (75%) + ZSM5 zeolite Catalyst (25%) | Spent FCC Catalyst (62.50%) + ZSM5 zeolite catalyst (37.5%) | ZSM5 zeolite catalyst (100%) |
|---|---|---|---|---|---|
| | | Catalyst Composition | | | |
| Iso paraffin conc. In liquid products boiling below 240° C. | Wt. % | 18.38 | 13.41 | 13.22 | 10.51 |

Example 2

Plastic feed and a catalyst composition comprised of 37.5 wt. % ZSM-5 catalyst, with the remainder being spent FCC catalyst, were used in pyrolysis conversions with different one-minute average reactor bed temperatures. The reaction temperature at start of reaction was varied from 600-700° C. The one-minute average bed temperatures achieved are provided in Tables 4A and 4B below. A C/F ratio of 6 and 1.5 g of plastic feed having a composition specified in Table 2 was used. Fluidization $N_2$ gas flow rate used was 175N cc/min. Overall aromatic and liquid iso-paraffin product yields and aromatic and liquid iso-paraffin content in liquid product boiling below 240° C. as a function of one-minute average reactor bed temperature were determined and are presented in FIGS. 10A and 10B, respectively. As can be seen in these figures, the yields of iso-paraffins product and iso-paraffins content in the liquid product changed only slightly with the change in one-minute average reactor bed temperature. The aromatics content in the liquid product generally increased with the increase in one-minute average reactor bed temperature, however.

TABLE 4A

| | Wt. % | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) |
|---|---|---|---|---|---|
| | | Catalyst Composition | | | |
| C/F ratio | g/g | 6.0 | 6.0 | 5.97 | 5.96 |
| Reaction temperature at start | ° C. | 700 | 670 | 635 | 600 |
| 1 min average reaction temperature | ° C. | 603.4 | 569.6 | 519 | 471.8 |
| Dry catalyst fed | g | 8.95 | 8.95 | 8.95 | 8.95 |
| Feed weight transferred | g | 1.50 | 1.50 | 1.50 | 1.50 |
| Yield of Aromatics boiling below 240° C. | Wt. % | 32.84 | 31.60 | 33.41 | 30.19 |
| Yield of isoparaffins boiling below 240° C. | Wt. % | 6.05 | 5.76 | 5.40 | 5.40 |

TABLE 4B

| | Wt. % | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) |
|---|---|---|---|---|---|
| | | Catalyst Composition | | | |
| C/F ratio | g/g | 6.0 | 6.0 | 5.97 | 5.96 |
| Reaction temperature at start | ° C. | 700 | 670 | 635 | 600 |
| 1 min average reaction temperature | ° C. | 603.4 | 569.6 | 519 | 471.8 |
| Dry catalyst fed | g | 8.95 | 8.95 | 8.95 | 8.95 |
| Feed weight transferred | g | 1.50 | 1.50 | 1.50 | 1.50 |
| Aromatics conc. In liquid products boiling below 240° C. | Wt. % | 75.37 | 74.72 | 75.03 | 69.23 |

TABLE 4B-continued

|  | Wt. % | Catalyst Composition | | | |
|---|---|---|---|---|---|
|  |  | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) |
| Iso paraffin conc. In liquid products boiling below 240° C. | Wt. % | 13.88 | 13.22 | 12.12 | 12.39 |

Example 3

Figure 11:
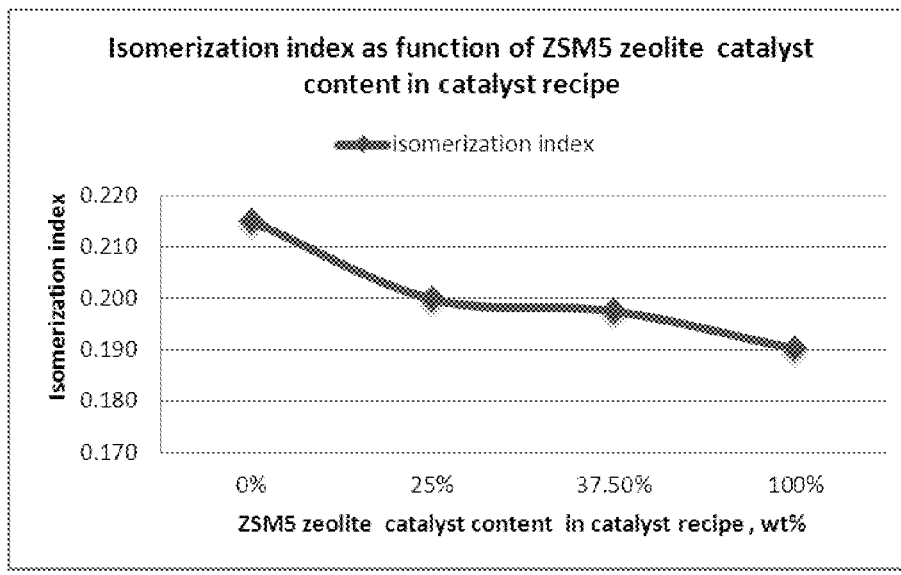
FIG. 11 is a plot of the isomerization index for butenes as a function of ZSM-5 zeolite catalyst content of the catalyst composition used in plastics pyrolysis conversion reactions.
Figure 12:
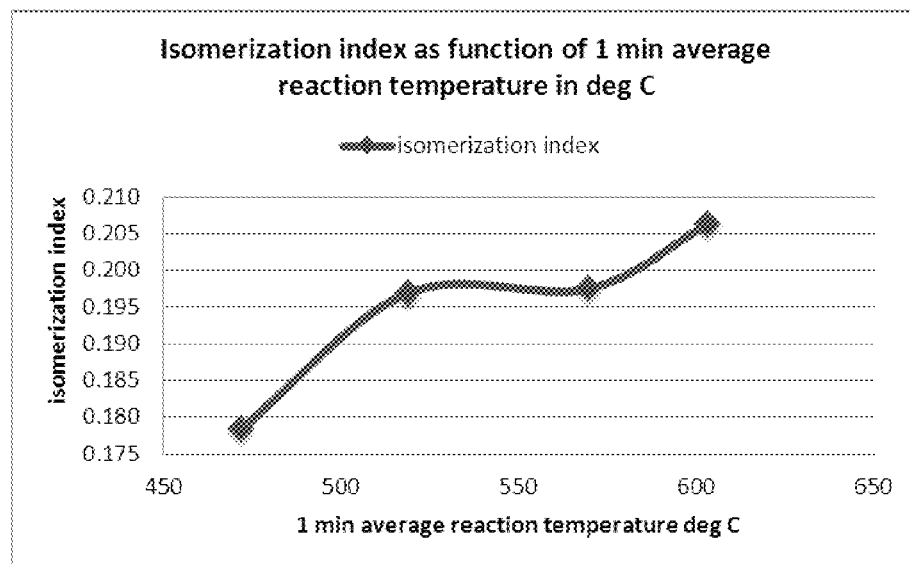
FIG. 12 is a plot of the isomerization index for butenes as a function of one-minute average reactor bed temperatures in plastic pyrolysis conversion reactions.

Plastic feed at 1.5 g and 9 g of different catalysts compositions comprised of 0 wt. %, 25 wt. %, 37.5 wt. %, and 100 wt. % ZSM-5 zeolite catalyst, with the remainder being spent FCC catalyst, were used in pyrolysis conversion. The reactor was operated to provide a reaction temperature at start of reaction of 670° C. The one-minute average bed temperatures achieved are provided in Table 5. The C/F ratio was 6. Fluidization $N_2$ gas flow rate used was 175N cc/min. The yields of butenes were determined and an isomerization index was determined where the isomerization index=(1-butene yield)/(isobutylene yield+cis-2-butene yield+trans-2-butene yield). A lower isomerization index indicates that the formation of branched carbon chains is greater compared to the straight chain molecules. The isomerization indices as a function of ZSM-5 catalyst content of the catalyst composition are presented in FIG. 11. As shown in FIG. 11, there is a drop in the isomerization index for butenes, which reflects a drop in yields of 1-butenes, with an increase in ZSM-5 zeolite catalyst content.

TABLE 5

|  | Wt. % | Catalyst Composition | | | |
|---|---|---|---|---|---|
|  |  | Spent FCC catalyst (100%) | Spent FCC catalyst (75%) + ZSM5 zeolite Catalyst (25%) | Spent FCC Catalyst (62.50%) + ZSM5 zeolite catalyst (37.5%) | ZSM5 zeolite catalyst (100%) |
| C/F ratio | g/g | 6.00 | 5.98 | 6.0 | 5.91 |
| Reaction temperature at start | ° C. | 670 | 670 | 670 | 670 |
| 1 min average reaction temperature | ° C. | 565.6 | 567.8 | 569.6 | 566.2 |
| Dry catalyst fed | g | 9.00 | 8.97 | 8.95 | 8.87 |
| Feed weight transferred | g | 1.50 | 1.50 | 1.50 | 1.50 |
| Isomerization Index |  | 0.215 | 0.200 | 0.197 | 0.190 |

Example 4

Plastic feed at 1.5 g and a catalyst composition comprised of 37.5 wt. % ZSM-5 zeolite catalyst, with the remainder being spent FCC catalyst, were used in pyrolysis conversions with different one-minute average reactor bed temperatures. The reaction temperature at start of reaction was varied from 600-700° C. The one-minute average bed temperatures achieved are provided in Table 6. The C/F ratio was 6. Fluidization $N_2$ gas flow rate used was 175N cc/min. The isomerization indices as a function of one-minute average reaction temperature are presented in FIG. 12. The isomerization indices increase with increase in one-minute average reaction temperature.

TABLE 6

|  | Wt. % | Catalyst Composition | | | |
|---|---|---|---|---|---|
|  |  | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) |
| C/F ratio | g/g | 6.0 | 6.0 | 5.97 | 5.96 |
| Reaction temperature at start | ° C. | 700 | 670 | 635 | 600 |

TABLE 6-continued

|  | Wt. % | Catalyst Composition | | | |
|---|---|---|---|---|---|
|  |  | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) |
| 1 min average reaction temperature | °C. | 603.4 | 569.6 | 519 | 471.8 |
| Dry catalyst fed | g | 8.95 | 8.95 | 8.95 | 8.95 |
| Feed weight transferred | g | 1.50 | 1.50 | 1.50 | 1.50 |
| Isomerization Index |  | 0.206 | 0.197 | 0.197 | 0.178 |

Example 5

Figure 13:
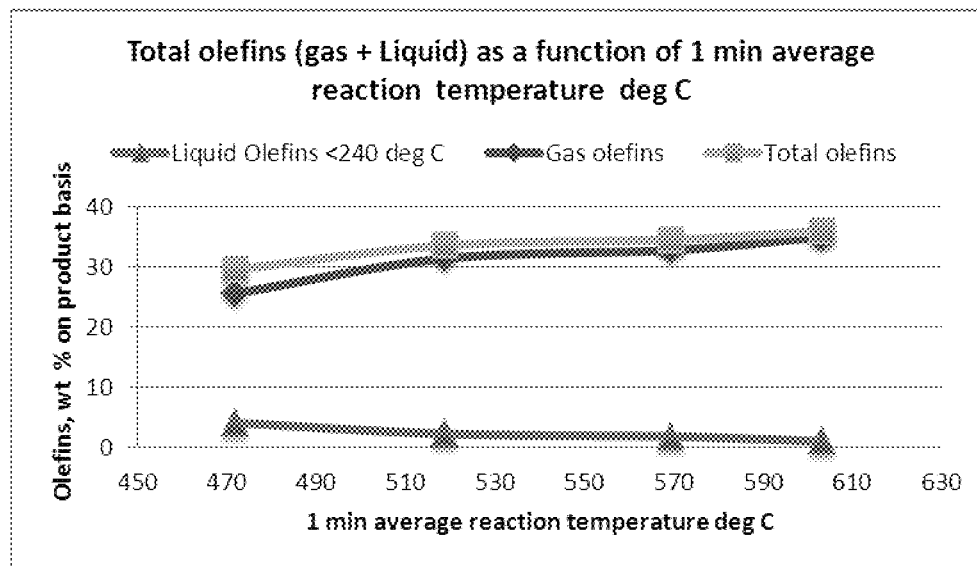
FIG. 13 is a plot of total olefin yields as a function of one-minute average reactor bed temperatures in plastic pyrolysis conversion reactions.

Plastic feed at 1.5 g and a catalyst composition comprised of 37.5 wt. % ZSM-5 zeolite catalyst, with the remainder being spent FCC catalyst, were used in pyrolysis conversions with different one-minute average reactor bed temperatures (Table 7). The reaction temperature at start of reaction was varied from 600-700° C. The C/F ratio was 6. Fluidization $N_2$ gas flow rate used was 175N cc/min. The total olefin yields (both gas and liquid) were determined and are presented as a function of the one-minute average reactor bed temperatures in FIG. 13. As shown in FIG. 13, there is an increase in the olefin yields with an increase in the one-minute average reactor bed temperature. The yield of liquid olefins boiling below 240° C. is decreasing with increasing one-minute average temperature indicating a higher conversion to lower molecular weight molecules.

catalyst, were used in pyrolysis conversion. The reactor was operated to provide a reaction temperature at start of reaction of 670° C. The one-minute average reactor bed temperatures achieved are provided in Table 8. The C/F ratio was 6. Fluidization $_{N2}$ gas flow rate used was 175 Ncc/min. The total olefin yields (both gas and liquid) were determined and are presented as a function of ZSM-5 zeolite catalyst content of the catalyst composition in FIG. 14. As can be seen in FIG. 14, the total and light gas olefins yield increase to a high at around 37.5 wt. % concentration of ZSM-5 zeolite catalyst in the catalyst mixture. Further increases in ZSM-5 zeolite catalyst in the catalyst recipe starts resulting in a gradual drop of these olefins yield. Variation in the yields of liquid olefins is minimal in the range 25-100 wt. % ZSM-5 zeolite catalyst in the catalyst mixture while the gas olefins yield register an increase from 25-37.5 wt. % ZSM-5

TABLE 7

|  | Wt. % | Catalyst Composition | | | |
|---|---|---|---|---|---|
|  |  | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) |
| C/F ratio | g/g | 5.96 | 5.97 | 6 | 6 |
| Reaction temperature at start | °C. | 600 | 635 | 670 | 700 |
| 1 min average reaction temperature | °C. | 471.8 | 519 | 569.6 | 603.4 |
| Dry catalyst fed | g | 8.95 | 8.95 | 8.95 | 8.95 |
| Feed weight transferred | g | 1.50 | 1.50 | 1.50 | 1.50 |
| Total olefins (gas + liquid boiling below 240° C.) yield | Wt. % | 29.46 | 33.47 | 34.40 | 35.84 |
| Gaseous olefins ($C_2$-$C_4$) yield | Wt. % | 25.47 | 31.31 | 32.69 | 34.91 |
| Liquid olefins ($C_5$-240° C.) yield | Wt. % | 3.99 | 2.16 | 1.71 | 0.93 |

Example 6

Plastic feed at 1.5 g and different catalysts compositions comprised of 0 wt. %, 25 wt. %, 37.5 wt. %, and 100 wt. % ZSM-5 zeolite catalyst, with the remainder being spent FCC zeolite catalyst content in catalyst mixture. This indicates that the conversion of feed molecules is maximized to light olefins using a balanced mixture of the FCC spent catalyst and ZSM-5 zeolite catalyst.

TABLE 8

|  |  | Catalyst Composition | | | |
|---|---|---|---|---|---|
|  |  | Spent FCC catalyst (100%) | Spent FCC catalyst (75%) + ZSM5 zeolite Catalyst (25%) | Spent FCC Catalyst (62.50%) + ZSM5 zeolite catalyst (37.5%) | ZSM5 zeolite catalyst (100%) |
| C/F ratio | g/g | 6.00 | 5.98 | 6.0 | 5.91 |
| Reaction temperature at start | °C. | 670 | 670 | 670 | 670 |

TABLE 8-continued

| | | Catalyst Composition | | | |
|---|---|---|---|---|---|
| | | Spent FCC catalyst (100%) | Spent FCC catalyst (75%) + ZSM5 zeolite Catalyst (25%) | Spent FCC Catalyst (62.50%) + ZSM5 zeolite catalyst (37.5%) | ZSM5 zeolite catalyst (100%) |
| 1 min average reaction temperature | ° C. | 565.6 | 567.8 | 569.6 | 566.2 |
| Dry catalyst fed | g | 9.00 | 8.97 | 8.95 | 8.87 |
| Feed weight transferred | g | 1.50 | 1.50 | 1.50 | 1.50 |
| Total olefins (gas + liquid boiling below 240° C.) yield | Wt. % | 30.20 | 33.67 | 33.62 | 32.21 |
| Gaseous olefins ($C_2$-$C_4$) yield | Wt. % | 26.41 | 32.05 | 32.69 | 30.72 |
| Liquid olefins ($C_5$-240° C.) yield | Wt. % | 3.79 | 1.62 | 1.71 | 1.49 |

Example 6

Plastic feed at 1.5 g and a catalyst composition and a catalyst composition comprised of 37.5 wt. % ZSM-5 zeolite catalyst with the balance being spent FCC catalyst were fed into the reactor. The C/F ratio was 6. Fluidization $N_2$ gas flow rate used was 175N cc/min. The reactor was operated to provide a one minute average reactor bed temperature of 569.6° C. with the reactor temperature at the start of the reaction being 670° C. The products were collected and the liquid product yield was 49.6 wt. % of the total products. The yield of liquid products boiling above 240° C. as a wt. % of overall products was ~14.9 wt. % and the yield of liquid products boiling below 240° C. was ~34.7 wt. %. The liquid products having a boiling point below 240° C. were analyzed with the results being presented in Table 9 below.

TABLE 9

| Carbon | n-parrafins | Isoparrafins | Olefins | naphthenes | Aromatics | Total |
|---|---|---|---|---|---|---|
| C5 | 0.013 | 0.02 | 0.169 | 0.031 | — | 0.233 |
| C6 | 0.101 | 0.219 | 1.031 | 0.318 | 5.28 | 9.113 |
| C7 | 0.254 | 1.243 | 2.267 | 0.665 | 17.188 | 21.618 |
| C8 | 0.544 | 2.703 | 0.354 | 1.125 | 30.339 | 35.066 |
| C9 | 0.22 | 3.98 | 0.107 | 1.44 | 10.95 | 16.70 |
| C10 | 0.12 | 2.07 | — | 0.217 | 3.89 | 6.30 |
| C11 | 0.10 | 2.53 | — | 0.299 | 1.53 | 4.39 |
| C12 | 0.05 | 0.46 | — | — | 3.37 | 3.88 |
| C13 | 0.03 | — | — | — | — | 0.03 |
| total | 1.42 | 13.22 | 3.928 | 4.03 | 74.72 | 97.32 |
| Unknowns | | | | | | 2.69 |
| On aromatics-free basis | 6.3 | 58.5 | 17.4 | 17.8 | | |

From Table 9 it can be seen that the liquid product after complete extraction of aromatics is rich in iso-paraffins, has nearly equal amounts of naphthenes and olefins and a small amount of n-paraffins. Table 9 shows that the liquid product from the pyrolysis conversion in accordance with the invention offers a good feed for further processing by any of those processing techniques used downstream from the pyrolysis conversion to provide an increased yield of light gas olefins and aromatics. Also, the portion of the liquid products boiling above 240° C. can be processed by any of the disclosed processing techniques used downstream of the pyrolysis conversion to provide an increased yield of light gas olefins and aromatics.

Example 7

Figure 16:
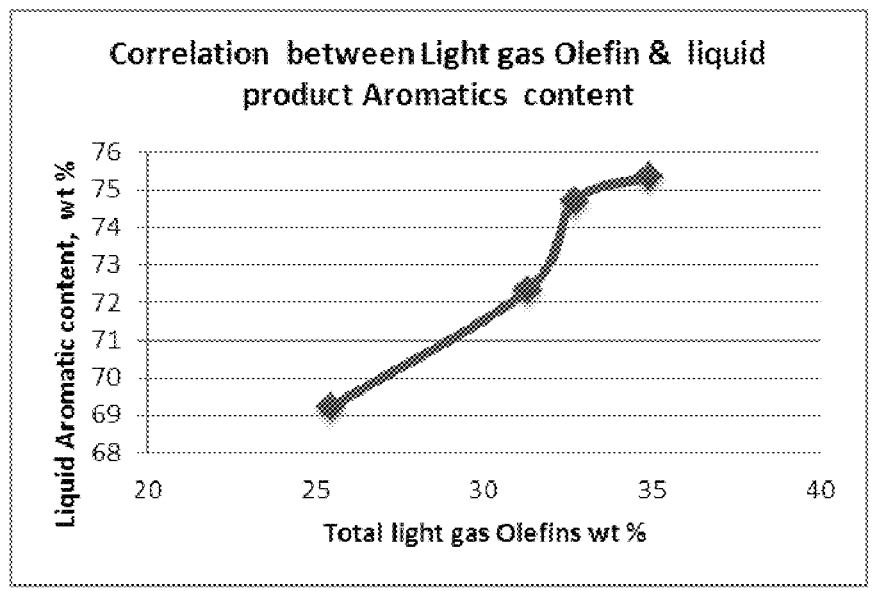
FIG. 16 is a plot of liquid aromatic yields as a function of total light gas olefins produced in plastic pyrolysis conversion reactions.

Plastic feed at 1.5 g and a catalyst composition and a catalyst composition comprised of 37.5 wt. % ZSM-5 zeolite catalyst with the balance being spent FCC catalyst were used in pyrolysis reactions. The reaction temperature at start of reaction was varied from 600-700° C. to provide a variation in one-minute average reaction bed temperature as provided in Table 10. The C/F ratio was 6. Fluidization $N_2$ gas flow rate used was 175N cc/min. Light gas olefins (i.e., $C_2$+$C_3$+$C_4$) and liquid products having a boiling point below 240° C. were collected and analyzed. FIG. 15 shows a plot of the overall product yield of light gas olefins and aromatics. FIG. 16 is a plot of the correlation between light gas olefin yields and liquid product aromatic content. As can be seen from FIG. 16, the liquid product is highly aromatic. There is also a linear correlation between the yields of aromatic products and the light gas olefins. That is, there is a simultaneous increase in production of light gas olefins and aromatics, both of which are valuable products. This means in large scale operations, it is possible to get not only light gas olefins at a particular demand, but also produce aromatics as per demand by adjusting pyrolysis conversion operating conditions, such as ZSM-5 zeolite catalyst content in the recipe, one-minute average temperature spatial average bed temperatures and others as disclosed.

TABLE 10

| | Wt. % | Catalyst Composition | | | |
|---|---|---|---|---|---|
| | | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) |
| C/F ratio | g/g | 5.96 | 5.97 | 6 | 6 |
| Reaction temperature at start | ° C. | 600 | 635 | 670 | 700 |
| 1 min average reaction temperature | ° C. | 471.8 | 519 | 569.6 | 603.4 |
| Dry catalyst fed | g | 8.95 | 8.95 | 8.95 | 8.95 |
| Feed weight transferred | g | 1.50 | 1.50 | 1.50 | 1.50 |
| Yield of Total Aromatics boiling below 240° C. | Wt. % | 31.37 | 32.21 | 32.32 | 32.84 |
| Yield of light gas Olefins ($C_2$-$C_4$) | Wt. % | 25.47 | 31.31 | 32.69 | 34.91 |
| Aromatics conc. In liquid products boiling below 240° C. | Wt. % | 69.23 | 72.35 | 74.71 | 75.37 |

Example 8

Figure 17:
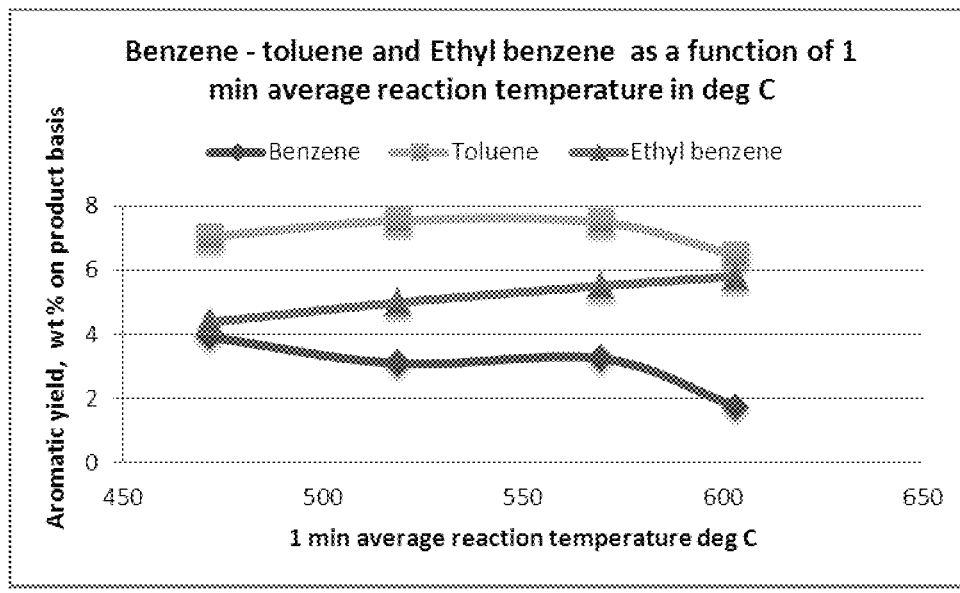
FIG. 17 is a plot of benzene, toluene and ethyl benzene yields as a function of one-minute average reactor bed temperatures in plastic pyrolysis conversion reactions.

Plastic feed at 1.5 g and a catalyst composition and a catalyst compositions comprised of 37.5 wt. % ZSM-5 zeolite catalyst, with the remainder being spent FCC catalyst, were used in pyrolysis conversions with different one-minute average reactor bed temperatures (Table 11). The reaction temperature at start of reaction was varied from 600-700° C. The C/F ratio was 6. Fluidization $N_2$ gas flow rate used was 175N cc/min. The yields of benzene, toluene and ethyl benzene were determined and are presented as a function of the one-minute average reactor bed temperatures in FIG. 17. As shown in FIG. 17, there is an increase in the yields of ethyl benzene with an increase in the one-minute average reactor bed temperature. Benzene and toluene yields decreased after reaching a one-minute average reaction bed of approximately 570° C.

Example 9

Figure 18:
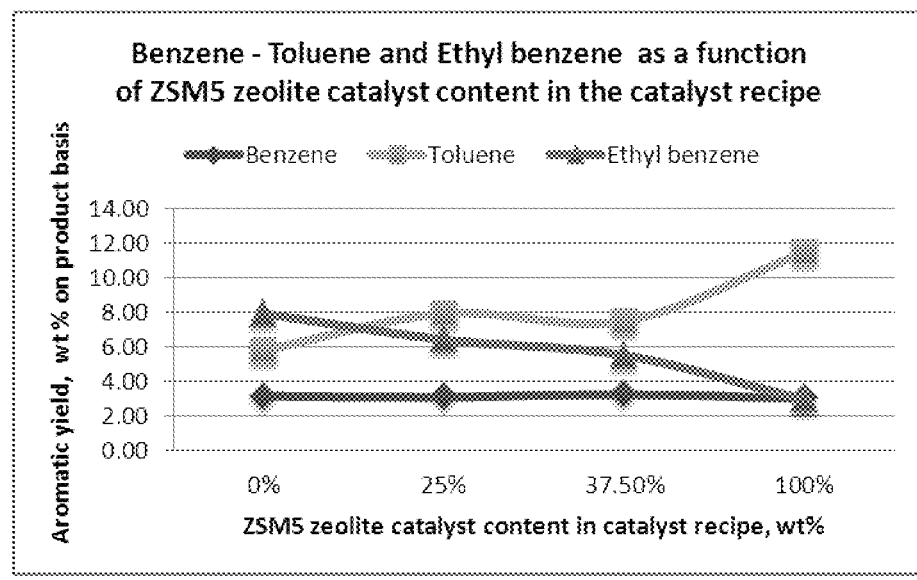
FIG. 18 is a plot of benzene, toluene and ethyl benzene yields as a function of ZSM-5 zeolite catalyst content of the catalyst composition used in plastics pyrolysis conversion reactions.

Plastic feed at 1.5 g and a catalyst composition and different catalysts compositions comprised of 0 wt. %, 25 wt. %, 37.5 wt. %, and 100 wt. % ZSM-5 zeolite catalyst, with the remainder being spent FCC catalyst, were used in pyrolysis conversion. The reactor was operated to provide a one-minute average reaction bed temperature from 565-570° C. (Table 12) corresponding to reactor temperature at start of reaction of 670° C. The C/F ratio was 6. Fluidization $N_2$ gas flow rate used was 175N cc/min. The yields of benzene, toluene and ethyl benzene were determined and are presented as a function of ZSM-5 zeolite catalyst content of the catalyst composition in FIG. 18. As can be seen in FIG. 18, yields of toluene increased while that of ethyl benzene decreased with increased ZSM-5 zeolite catalyst content. The benzene yield did not vary significantly with the change in ZSM-5 zeolite catalyst content.

TABLE 11

| | Wt. % | Catalyst Composition | | | |
|---|---|---|---|---|---|
| | | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) |
| C/F ratio | g/g | 5.96 | 5.97 | 6 | 6 |
| Reaction temperature at start | ° C. | 600 | 635 | 670 | 700 |
| 1 min average reaction temperature | ° C. | 471.8 | 519 | 569.6 | 603.4 |
| Dry catalyst fed | G | 8.95 | 8.95 | 8.95 | 8.95 |
| Feed weight transferred | g | 1.50 | 1.50 | 1.50 | 1.50 |
| Yield of Benzene | Wt. % | 3.91 | 3.09 | 3.24 | 1.74 |
| Yield of Toluene | Wt. % | 7.05 | 7.54 | 7.49 | 6.46 |
| Yield of Ethyl Benzene | Wt. % | 4.38 | 4.99 | 5.50 | 5.81 |

TABLE 12

| | Wt. % | Spent FCC catalyst (100%) | Spent FCC catalyst (75%) + ZSM5 zeolite Catalyst (25%) | Spent FCC Catalyst (62.50%) + ZSM5 zeolite catalyst (37.5%) | ZSM5 zeolite catalyst (100%) |
|---|---|---|---|---|---|
| C/F ratio | g/g | 6.00 | 5.98 | 6.0 | 5.91 |
| Reaction temperature at start | °C. | 670 | 670 | 670 | 670 |
| 1 min average reaction temperature | °C. | 565.6 | 567.8 | 569.6 | 566.2 |
| Dry catalyst fed | g | 9.00 | 8.97 | 8.95 | 8.87 |
| Feed weight transferred | g | 1.50 | 1.50 | 1.50 | 1.50 |
| Benzene yield | Wt. % | 3.14 | 3.10 | 3.24 | 3.02 |
| Toluene yield | Wt. % | 5.80 | 7.92 | 7.49 | 11.45 |
| Ethyl Benzene yield | Wt. % | 7.90 | 6.41 | 5.50 | 2.94 |

Example 10

Figure 19:
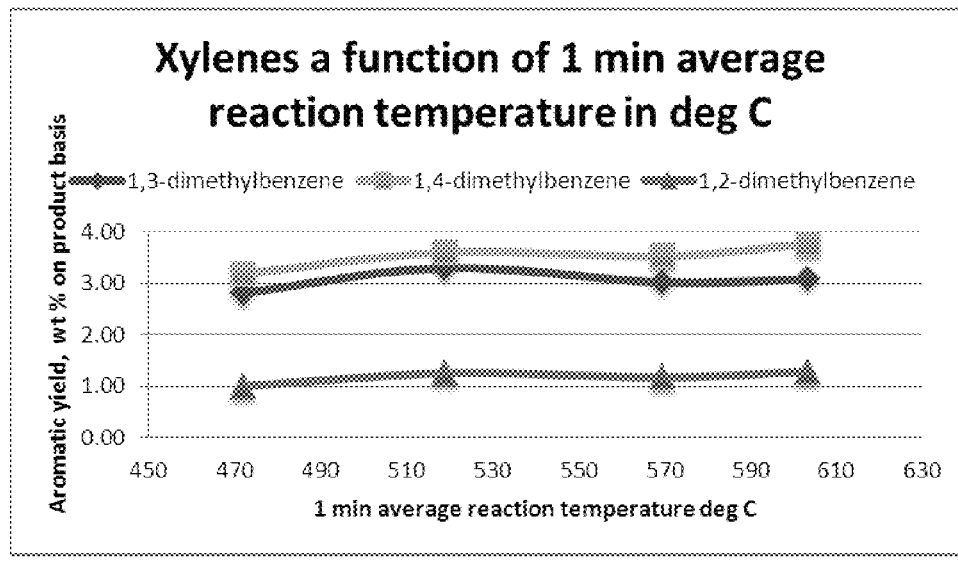
FIG. 19 is a plot of xylene yields as a function of one-minute average reactor bed temperatures in plastic pyrolysis conversion reactions.

Plastic feed at 1.5 g and a catalyst composition and a catalyst compositions comprised of 37.5 wt. % ZSM-5 zeolite catalyst, with the remainder being spent FCC catalyst, were used in pyrolysis conversions with different one-minute average reactor bed temperatures (Table 13). The reaction temperature at start of reaction was varied from 600-700° C. The C/F ratio was 6. Fluidization $N_2$ gas flow rate used was 175N cc/min. The yields of different xylene isomers were determined and are presented as a function of the one-minute average reactor bed temperatures in FIG. 19. As shown in FIG. 19, yields of all xylene isomers increased with increasing one-minute average reactor bed temperatures.

Example 11

Figure 20:
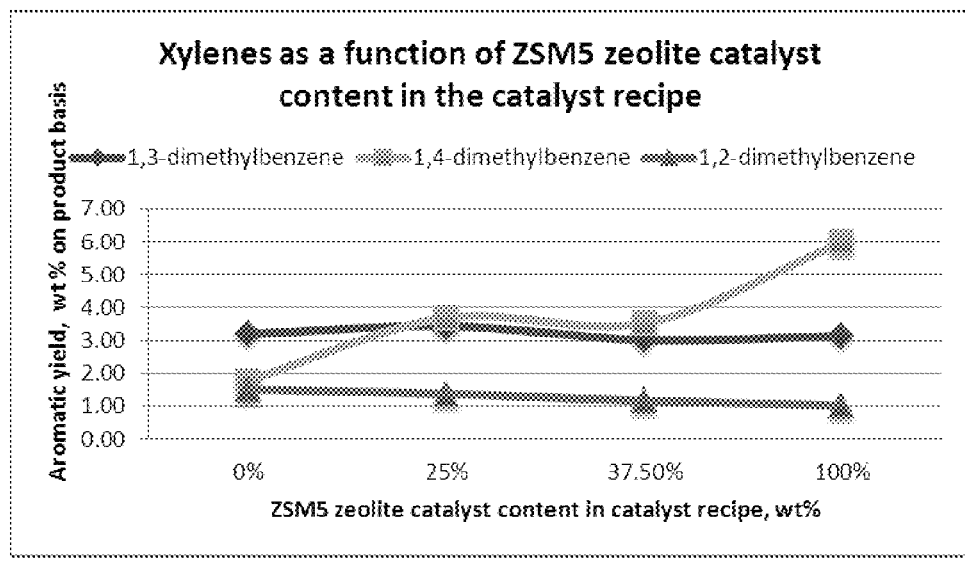
FIG. 20 is a plot of xylene yields as a function of ZSM-5 zeolite catalyst content of the catalyst composition used in plastics pyrolysis conversion reactions.

Plastic feed at 1.5 g and a catalyst composition and different catalysts compositions comprised of 0 wt. %, 25 wt. %, 37.5 wt. %, and 100 wt. % ZSM-5 zeolite catalyst, with the remainder being spent FCC catalyst, were used in pyrolysis conversion. The reactor was operated to provide a one-minute average reaction bed temperature from 565-570° C. (Table 14) corresponding to reactor temperature at start of reaction of 670° C. The C/F ratio was 6. Fluidization $N_2$ gas flow rate used was 175N cc/min The yields of xylene isomers were determined and are presented as a function of ZSM-5 zeolite catalyst content of the catalyst composition in FIG. 20. As can be seen in FIG. 20, while p-xylene yield increases with increase in ZSM-5 zeolite catalyst content in catalyst mixture, the yields of o-Xylene decreases with increase in ZSM-5 zeolite catalyst content in catalyst mixture and m-xylene yield increases marginally up to 25% ZSM-5 zeolite catalyst content in the catalyst mixture.

TABLE 13

| | Wt. % | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) |
|---|---|---|---|---|---|
| C/F ratio | g/g | 5.96 | 5.97 | 6 | 6 |
| Reaction temperature at start | °C. | 600 | 635 | 670 | 700 |
| 1 min average reaction temperature | °C. | 471.8 | 519 | 569.6 | 603.4 |
| Dry catalyst fed | g | 8.95 | 8.95 | 8.95 | 8.95 |
| Feed weight transferred | g | 1.50 | 1.50 | 1.50 | 1.50 |
| 1,3-dimethylbenzene yield | Wt. % | 2.81 | 3.29 | 3.02 | 3.08 |
| 1,4-dimethylbenzene yield | Wt. % | 3.18 | 3.59 | 3.53 | 3.76 |
| 1,2-dimethylbenzene yield | Wt. % | 1.00 | 1.25 | 1.17 | 1.28 |

TABLE 14

| | | Catalyst Composition | | | |
|---|---|---|---|---|---|
| | | Spent FCC catalyst (100%) | Spent FCC catalyst (75%) + ZSM5 zeolite Catalyst (25%) | Spent FCC Catalyst (62.50%) + ZSM5 zeolite catalyst (37.5%) | ZSM5 zeolite catalyst (100%) |
| C/F ratio | g/g | 6.00 | 5.98 | 6.0 | 5.91 |
| Reaction temperature at start | ° C. | 670 | 670 | 670 | 670 |
| 1 min average reaction temperature | ° C. | 565.6 | 567.8 | 569.6 | 566.2 |
| Dry catalyst fed | g | 9.00 | 8.97 | 8.95 | 8.87 |
| Feed weight transferred | g | 1.50 | 1.50 | 1.50 | 1.50 |
| 1,3-dimethylbenzene yield | Wt. % | 3.19 | 3.44 | 3.02 | 3.14 |
| 1,4-dimethylbenzene yield | Wt. % | 1.79 | 3.69 | 3.53 | 5.99 |
| 1,2-dimethylbenzene yield | Wt. % | 1.50 | 1.38 | 1.17 | 1.03 |

Example 12

Figure 21:
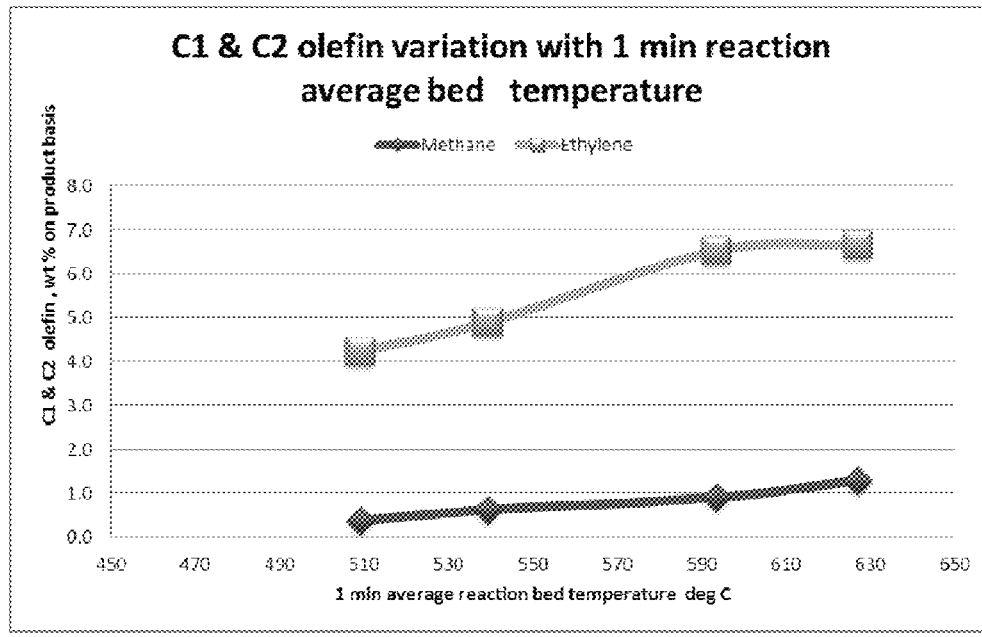
FIG. 21 is a plot of methane and ethylene yields as a function of one-minute average reactor bed temperatures in plastic pyrolysis conversion reactions.

Plastic feed at 0.75 g and a catalyst composition and a catalyst compositions comprised of 37.5 wt. % ZSM-5 zeolite catalyst, with the remainder being spent FCC catalyst, were used in pyrolysis conversions with different one-minute average reactor bed temperatures (Table 15). The reaction temperature at start of reaction was varied from 600-700° C. The C/F ratio used is provided in FIG. 21. Fluidization $N_2$ gas flow rate used was 175N cc/min. The yields of methane and ethylene were determined and are presented as a function of the one-minute average reactor bed temperatures in FIG. 21. As shown in FIG. 21, yields of methane were significantly suppressed, while ethylene yields increased substantially with increasing one-minute average reactor bed temperatures.

Example 13

Figure 22:
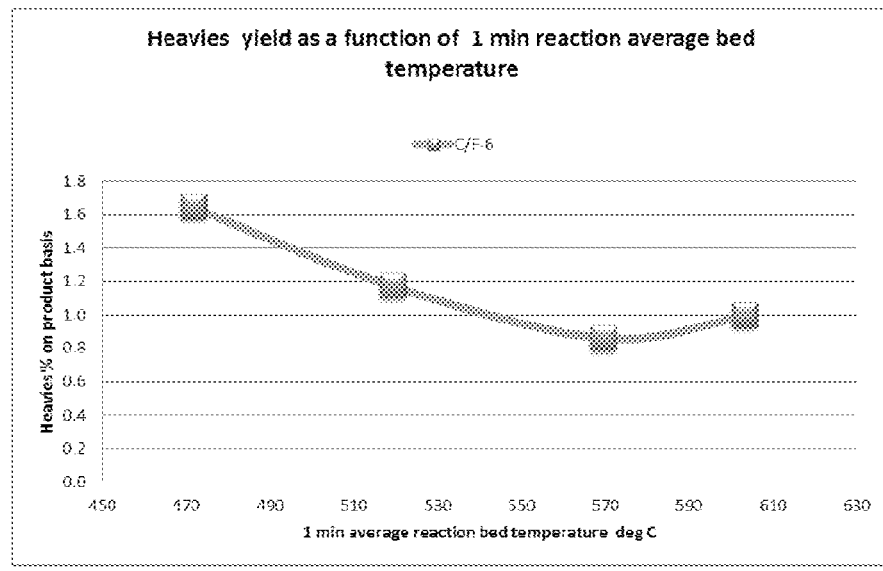
FIG. 22 is a plot of heavy liquid product yields (i.e., boiling over 370° C.) as a function of one-minute average reactor bed temperatures in plastic pyrolysis conversion reactions.

Plastic feed at 1.5 g and a catalyst composition and a catalyst composition comprised of 37.5 wt. % ZSM-5 zeolite catalyst, with the remainder being spent FCC catalyst, were used in pyrolysis conversions with different one-minute average reactor bed temperatures (Table 16). The reaction temperature at start of reaction was varied from 600-700° C. The C/F ratio used was 6. Fluidization $N_2$ gas flow $rat_e$ used was 175N cc/min Heavy liquid product yields (i.e., product boiling over 370° C.) were determined as a function of one-minute average reactor bed temperatures and are presented in FIG. 22. As shown in FIG. 22, a one-minute average reaction temperature of approximately 570° C. minimized the production of heavy liquid products.

TABLE 15

| | | Catalyst composition | | | |
|---|---|---|---|---|---|
| | Wt. % | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) | Spent FCC catalyst (62.50%) + ZSM5 zeolite Catalyst (37.5%) |
| C/F ratio | g/g | 9.0 | 7.0 | 9.0 | 9.95 |
| Reaction temperature at start | ° C. | 600 | 623 | 670 | 700 |
| 1 min average reaction bed temperature | ° C. | 509.2 | 539.4 | 593.6 | 627 |
| Dry catalyst fed | g | 6.80 | 5.22 | 6.76 | 7.46 |
| Feed weight transferred | g | 0.75 | 0.75 | 0.75 | 0.75 |
| Methane yield | Wt. % | 0.38 | 0.62 | 0.90 | 1.29 |
| Ethylene yield | Wt. % | 4.22 | 4.89 | 6.52 | 6.66 |

TABLE 16

| | Wt. % | Catalyst composition | | | |
|---|---|---|---|---|---|
| | | Spent FCC (62.5%) + ZSM5 Zeolite Catalyst (37.5%) | Spent FCC (62.5%) + ZSM5 Zeolite Catalyst (37.5%) | Spent FCC (62.5%) + ZSM5 Zeolite Catalyst (37.5%) | Spent FCC (62.5%) + ZSM5 Zeolite Catalyst (37.5%) |
| C/F ratio | g/g | 6.0 | 6.0 | 6.0 | 6.0 |
| Reaction temperature at start | °C. | 600 | 630 | 670 | 700 |
| 1 min average reaction bed temperature | °C. | 471.8 | 519.4 | 569.6 | 603.4 |
| Dry catalyst fed | g | 8.95 | 8.95 | 8.95 | 8.95 |
| Feed weight transferred | g | 1.5 | 1.5 | 1.5 | 1.5 |
| Yield of Heavies having boiling point >370° C. | Wt. % | 1.64 | 1.17 | 0.86 | 0.99 |

Example 14

Figure 23:
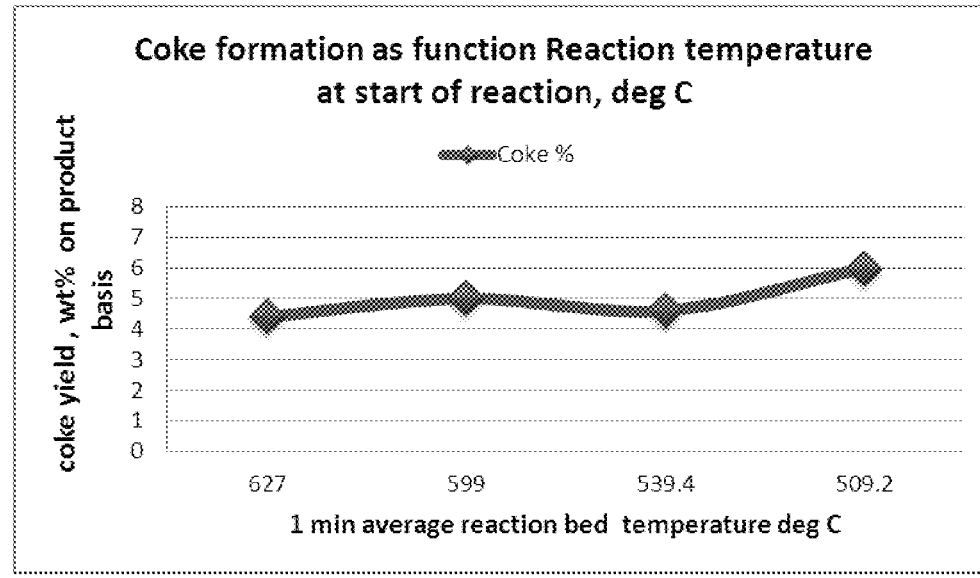
FIG. 23 is a plot of coke yields as a function of one-minute average reactor bed temperatures in plastic pyrolysis conversion reactions.

Plastic feed at 1.5 g and a catalyst composition and a catalyst compositions comprised of 37.5 wt. % ZSM-5 zeolite catalyst, with the remainder being spent FCC catalyst, were used in pyrolysis conversions with different one-minute average reactor bed temperatures (Table 17). The reaction temperature at start of reaction was v$^a$ried from 600-700° C. The C/F ratio used is given in FIG. 23. $_F$luidization $N_2$ gas flow rate used was 175N cc/min. The yields of coke were determined and are presented as a function of the one-minute average reactor bed temperatures in FIG. 23. As shown in FIG. 23, the coke yields vary in the region of 4 to 6 wt. %. This level of coke yield is in the range of coke yields typically needed in a large scale continuous flow and circulating reactors to support the required heat balance.

TABLE 17

| | Wt. % | Catalyst composition | | | |
|---|---|---|---|---|---|
| | | Spent FCC (62.5%) + ZSM5 Zeolite Catalyst (37.5%) | Spent FCC (62.5%) + ZSM5 Zeolite Catalyst (37.5%) | Spent FCC (62.5%) + ZSM5 Zeolite Catalyst (37.5%) | Spent FCC (62.5%) + ZSM5 Zeolite Catalyst (37.5%) |
| C/F ratio | g/g | 9.95 | 9.0 | 7.0 | 9.0 |
| Reaction temperature at start | °C. | 700 | 670 | 623 | 600 |
| 1 min average reaction bed temperature | °C. | 627 | 599 | 539.4 | 509.2 |
| Dry catalyst fed | g | 7.46 | 6.76 | 5.22 | 6.76 |
| Feed weight transferred | g | 0.75 | 0.75 | 0.75 | 0.75 |
| coke yield | Wt. % | 4.40 | 5.00 | 4.60 | 6.00 |

Example 15

Figure 24:
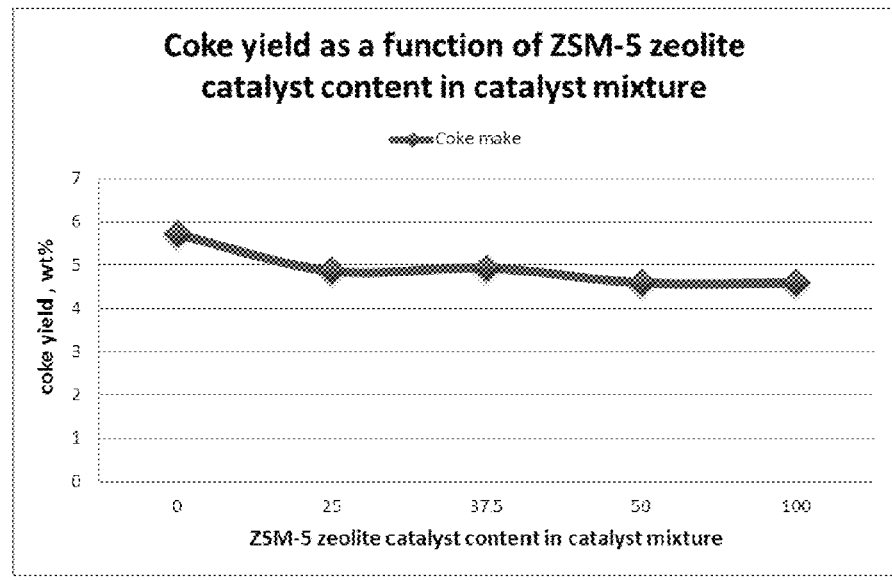
FIG. 24 is a plot of coke yields as a function of ZSM-5 zeolite catalyst content of the catalyst composition used in plastics pyrolysis conversion reactions.

Plastic feed at 0.75 g and a catalyst composition and different catalysts compositions comprised of 0 wt. %, 25 wt. %, 37.5 wt. %, and 100 wt. % ZSM-5 zeolite catalyst, with the remainder being spent FCC catalyst, were used in pyrolysis conversion (Table 18). The reactor was operated to provide a reactor temperature at start of reaction of 670° C. The C/F ratio was 9. Fluidization $N_2$ gas flow rate used was 175N cc/min. The coke yields were determined and are presented as a function of ZSM-5 zeolite catalyst content of the catalyst composition in FIG. 24. As can be seen in FIG. 24, coke yields generally decrease with increase in the ZSM-5 zeolite catalyst content of the catalyst composition.

When the ZSM-5 zeolite catalyst content was at 37.5 wt. %, which also corresponds to maximum conversion of olefins, as in Example 5, the coke yield was higher. Higher ZSM-5 zeolite content showed a lower yield of coke, which may correlate to reduced conversions.

TABLE 18

| | Wt. | ZSM5 Zeolite catalyst in catalyst mixture containing FCC and ZSM5 zeolite catalysts | | | | |
|---|---|---|---|---|---|---|
| | % | 0 | 25 | 37.5 | 50 | 100 |
| C/F ratio | g/g | 9.07 | 9.0 | 9.0 | 9.0 | 8.92 |
| Reaction temperature at start | °C. | 670 | 670 | 670 | 670 | 670 |

TABLE 18-continued

| | Wt. | ZSM5 Zeolite catalyst in catalyst mixture containing FCC and ZSM5 zeolite catalysts | | | | |
|---|---|---|---|---|---|---|
| | % | 0 | 25 | 37.5 | 50 | 100 |
| Dry catalyst fed | g | 6.80 | 6.77 | 6.76 | 6.75 | 6.70 |
| Feed weight transferred | g | 0.75 | 0.75 | 0.75 | 0.75 | 0.75 |
| Coke yield | Wt. % | 5.72 | 4.86 | 4.93 | 4.59 | 4.58 |

Example 16

Figure 25:
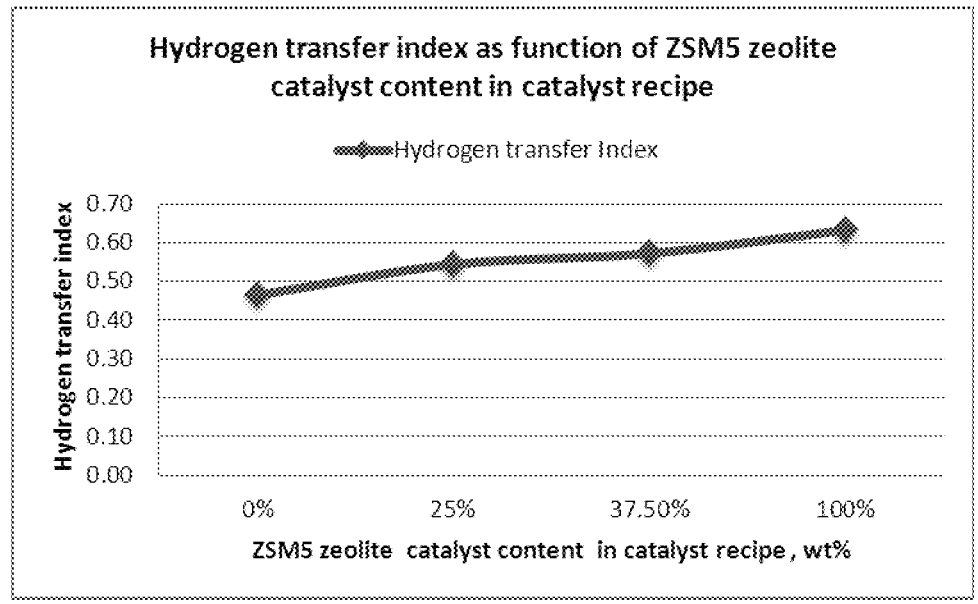
FIG. 25 is a plot of the hydrogen transfer index as a function of ZSM-5 zeolite catalyst content of the catalyst composition used in plastics pyrolysis conversion reactions.

Plastic feed at 1.5 g and a catalyst composition and different catalysts compositions comprised of 0 wt. %, 25 wt. %, 37.5 wt. %, and 100 wt. % ZSM-5 zeolite catalyst, with the remainder being spent FCC catalyst, were used in pyrolysis conversion. The reactor was operated to provide a one-minute average temperature from 565-570° C. (Table 19) corresponding to a reaction temperature at start of reaction of 670° C. The C/F ratio was 6. Fluidization $N_2$ gas flow rate used was 175 Nc c/min. The hydrogen transfer index, which is defined as the ratio of the yield of $C_3+C_4$ alkanes divided by the yield of $C_3$ olefins, was determined and is presented as a function of ZSM-5 zeolite catalyst content of the catalyst composition in FIG. 25. The lower the hydrogen transfer index, the more olefin products are produced. As can be seen in FIG. 25, hydrogen transfer index increased with increasing amounts of ZSM-5 zeolite catalyst content in the catalyst composition.

TABLE 19

|  | Wt. % | Spent FCC catalyst (100%) | Spent FCC catalyst (75%) + ZSM5 zeolite Catalyst (25%) | Spent FCC Catalyst (62.50%) + ZSM5 zeolite catalyst (37.5%) | ZSM5 zeolite catalyst (100%) |
|---|---|---|---|---|---|
| C/F ratio | g/g | 6.00 | 5.98 | 6.0 | 5.91 |
| Reaction temperature at start | °C. | 670 | 670 | 670 | 670 |
| 1 min average reaction temperature | °C. | 565.6 | 567.8 | 569.6 | 566.2 |
| Dry catalyst fed | g | 9.00 | 8.97 | 8.95 | 8.87 |
| Feed weight transferred | g | 1.50 | 1.50 | 1.50 | 1.50 |
| Hydrogen Transfer Index |  | 0.46 | 0.54 | 0.57 | 0.63 |

Example 17

Figure 26:
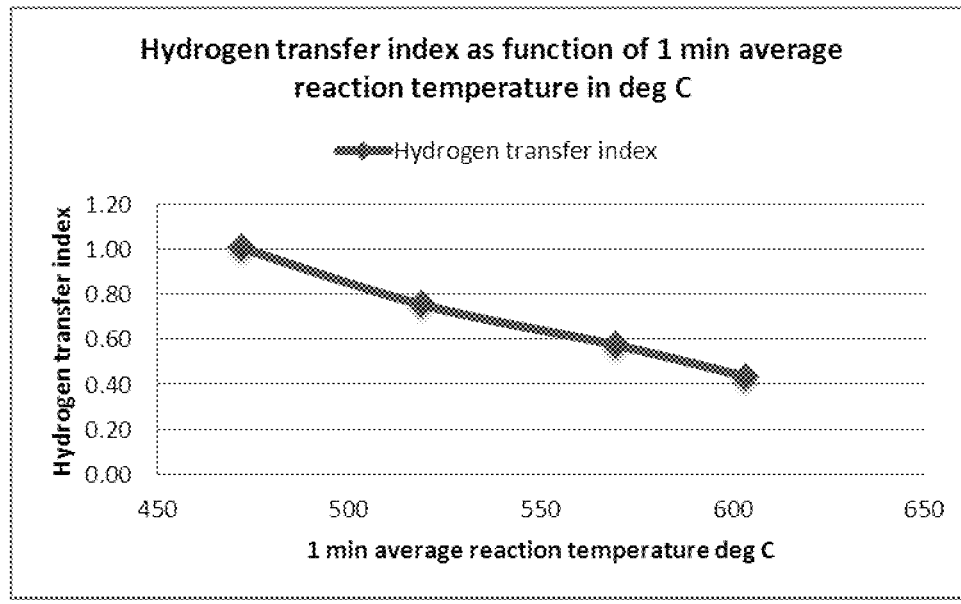
FIG. 26 is a plot of the hydrogen transfer index as a function of one-minute average reactor bed temperatures in plastic pyrolysis conversion reactions.

Plastic feed at 1.5 g and a catalyst composition and a catalyst composition comprised of 37.5 wt. % ZSM-5 zeolite catalyst, with the remainder being spent FCC catalyst, were used in pyrolysis conversions with different one-minute average reactor bed temperatures (Table 20). The reaction temperature at start of reaction was varied from 600-700° C. The C/F ratio was 6. Fluidization $N_2$ gas flow rate used was 175N cc/min. The hydrogen transfer index was determined and is presented as a function of one-minute average reactor bed temperatures in FIG. 26. As shown in FIG. 26, the hydrogen transfer index dropped with increases in one-minute average reaction temperatures.

TABLE 20

|  | Wt. % | Spent FCC (62.5%) + ZSM5 Zeolite Catalyst (37.5%) | Spent FCC (62.5%) + ZSM5 Zeolite Catalyst (37.5%) | Spent FCC (62.5%) + ZSM5 Zeolite Catalyst (37.5%) | Spent FCC (62.5%) + ZSM5 Zeolite Catalyst (37.5%) |
|---|---|---|---|---|---|
| C/F ratio | g/g | 6.0 | 6.0 | 5.97 | 5.96 |
| Reaction temperature at start | °C. | 700 | 670 | 635 | 600 |
| 1 min average reaction temperature | °C. | 603.4 | 569.6 | 519 | 471.8 |
| Dry catalyst fed | g | 8.95 | 8.95 | 8.95 | 8.95 |
| Feed weight transferred | g | 1.50 | 1.50 | 1.50 | 1.50 |
| Hydrogen Transfer Index |  | 0.43 | 0.57 | 0.75 | 1.00 |

Example 18

Figure 27:
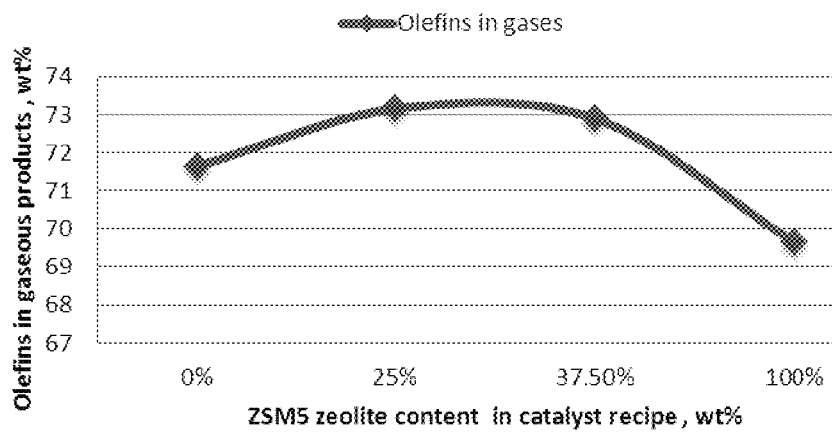
FIG. 27 is a plot of olefin content of gaseous products as a function of ZSM-5 zeolite catalyst content of the catalyst composition used in plastics pyrolysis conversion reactions.

Plastic feed at 1.5 g and a catalyst composition and different catalysts compositions comprised of 0 wt. %, 25 wt. %, 37.5 wt. %, and 100 wt. % ZSM-5 zeolite catalyst, with the remainder being spent FCC catalyst, were used in pyrolysis conversion. The reactor was operated to provide a one-minute average temperature from 565-570° C. (Table 21) corresponding to a reaction temperature at start of reaction of 670° C. The C/F ratio was 6. Fluidization $N_2$ gas flow rate used was 175N cc/min. The olefin content of gaseous products from the pyrolysis reaction were determined and are presented as a function of ZSM-5 zeolite catalyst content of the catalyst composition in FIG. 27. As can be seen in FIG. 27, the maximum olefin content of the gaseous products was achieved when the ZSM-5 zeolite catalyst content of the catalyst composition was from 25 wt. % to 40 wt. %.

TABLE 21

| | | \multicolumn{4}{c}{Catalyst Composition} | | | |
|---|---|---|---|---|---|
| | Wt. % | Spent FCC catalyst (100%) | Spent FCC catalyst (75%) + ZSM5 zeolite Catalyst (25%) | Spent FCC Catalyst (62.50%) + ZSM5 zeolite catalyst (37.5%) | ZSM5 zeolite catalyst (100%) |
| C/F ratio | g/g | 6.00 | 5.98 | 6.0 | 5.91 |
| Reaction temperature at start | ° C. | 670 | 670 | 670 | 670 |
| 1 min average reaction temperature | ° C. | 565.6 | 567.8 | 569.6 | 566.2 |
| Dry catalyst fed | g | 9.00 | 8.97 | 8.95 | 8.87 |
| Feed weight transferred | g | 1.50 | 1.50 | 1.50 | 1.50 |
| C2-C4 gaseous Olefins | Wt. % | 26.70 | 32.05 | 32.92 | 30.72 |
| Total gas yield | Wt. % | 37.27 | 43.81 | 45.17 | 44.12 |
| Olefinicity of gases | Wt. % | 71.64 | 73.15 | 72.88 | 69.63 |

Example 19

Figure 28:
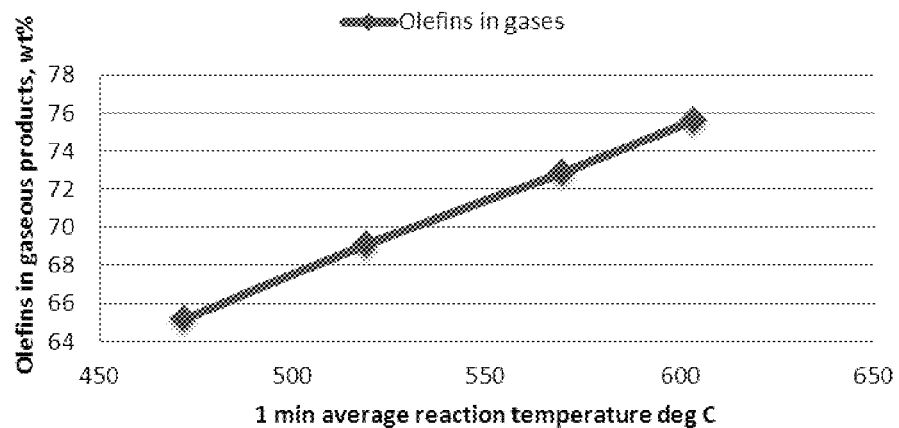
FIG. 28 is a plot of olefin content of gaseous products a as a function of one-minute average reactor bed temperatures in plastic pyrolysis conversion reactions.

Plastic feed at 1.5 g and a catalyst composition and a catalyst compositions comprised of 37.5 wt. % ZSM-5 zeolite catalyst, with the remainder being spent FCC catalyst, were used in pyrolysis conversions with different one-minute average reactor bed temperatures (Table 22). The reaction temperature at start of reaction was varied from 600-700° C. The C/F ratio was 6. Fluidization $N_2$ gas flow rate used was 175N cc/min. The olefin content of gaseous products from the pyrolysis reaction were determined and are presented as a function of one-minute average reactor bed temperatures in FIG. 28. As shown in FIG. 28, the olefin content of the gaseous products increased linearly with the increase one-minute average reactor bed temperature.

TABLE 22

| | | \multicolumn{4}{c}{Catalyst Composition} | | | |
|---|---|---|---|---|---|
| | Wt. % | Spent FCC (62.5%) + ZSM5 Zeolite Catalyst (37.5%) | Spent FCC (62.5%) + ZSM5 Zeolite Catalyst (37.5%) | Spent FCC (62.5%) + ZSM5 Zeolite Catalyst (37.5%) | Spent FCC (62.5%) + ZSM5 Zeolite Catalyst (37.5%) |
| C/F ratio | g/g | 6.0 | 6.0 | 5.97 | 5.96 |
| Reaction temperature at start | ° C. | 700 | 670 | 635 | 600 |
| 1 min average reaction temperature | ° C. | 603.4 | 569.6 | 519 | 471.8 |
| Dry catalyst fed | g | 8.95 | 8.95 | 8.95 | 8.95 |
| Feed weight transferred | g | 1.50 | 1.50 | 1.50 | 1.50 |
| C2-C4 gaseous Olefins | Wt. % | 34.91 | 32.92 | 31.31 | 25.47 |
| Total gas yield | Wt. % | 46.17 | 45.17 | 45.32 | 39.08 |
| Olefinicity of gases | % | 75.61 | 72.88 | 69.07 | 65.17 |

We claim:

1. A method of producing olefins and aromatic compounds from a feedstock, the method comprising:
    contacting a plastic feedstock and a catalyst composition at a temperature of from 420° C. to 730° C. within a reactor, the catalyst composition comprising a non-fresh fluidized catalytic cracking (FCC) catalyst and a ZSM-5 zeolite catalyst, the amount of ZSM-5 zeolite catalyst of the catalyst composition makes up from 10 wt. % to 50 wt. % of the total weight of the FCC catalyst and the ZSM-5 zeolite catalyst to simultaneously increase production of both light gas olefins and aromatics, the feedstock and the catalyst composition being at a catalyst-to-feed ratio of from 6 or greater;
    allowing at least a portion of the feedstock to be converted to products of olefins and aromatic compounds within the reactor, at least some of the products being contained in a liquid product stream; and
    directing at least a portion of the liquid product stream to one or more of the following (A) through (E), wherein:
        (A) is a catalytic reformer under conditions suitable for producing aromatics to form reformed products containing aromatic compounds and non-aromatic compounds, and directing the reformed products to a separating unit to provide an aromatic-rich separated product and a non-aromatic-rich separated product from at least a portion of the reformed products and recycling the non-aromatic-rich product to the reactor;
        (B) is a separation unit to provide an aromatic-rich separated product and a non-aromatic-rich separated product, the non-aromatic-rich separated product containing at least one of paraffins, iso-paraffins, and naphthenes and directing at least a portion of the non-aromatic-rich separated product to the reactor;
        (C) is a hydroprocessing unit under conditions suitable for hydroprocessing to provide a hydroprocessed product and recycling at least a portion of the hydroprocessed product to the reactor;
        (D) is a separation unit to provide an aromatic-rich separated product and a non-aromatic-rich separated product, and directing at least a portion of the non-aromatic-rich separated product as a feed to a hydroprocessing unit under conditions suitable for hydroprocessing to provide a hydroprocessed product and recycling at least a portion of the hydroprocessed product to the reactor; and
        (E) is a pyrolysis reactor to provide a liquid and gas pyrolysis product stream of which the liquid product is separated into an aromatics-rich product and a non-aromatics-rich product, the non-aromatic-rich product being further hydroprocessed and then recycled back to the reactor.

2. The method of claim 1, wherein:
    the FCC catalyst is comprised of at least one of an X-type zeolite, a Y-type zeolite, mordenite, faujasite, nano-crystalline zeolites, MCM mesoporous materials, SBA-15, a silico-alumino phosphate, a gallophosphate, and a titanophosphate.

3. The method of claim 1, wherein:
    the amount of ZSM-5 zeolite catalyst of the catalyst composition makes up from 30 wt. % to 45 wt. % of the total weight of the FCC catalyst and the ZSM-5 zeolite catalyst.

4. The method of claim 1, wherein:
    the temperature is from 570° C. to 680° C.

5. The method of claim 1, wherein:
    said temperature is at least one of 1) a time-interval average catalyst bed temperature of from 420° C. to 730° C. wherein the time interval is 3 minutes or less from the start of the reaction; 2) a temperature in the reactor of from 420° C. to 730° C. at at least one location that is from 0.3 L or less from the at least one inlet where the feedstock and the catalyst composition are introduced, where L is the length of the reactor flow path; and 3) a weight-averaged catalyst bed temperature in the reactor of from 420° C. to 730° C. weight-averaged at two or more locations that is from 0.3 L or less and/or to 0.3 L or greater from the at least one inlet where the feedstock and the catalyst composition are introduced, where L is the length of the reactor flow path.

6. The method of claim 1, wherein:
    the feedstock comprises at least one of polyolefins, polyethylene, polypropylene, polystyrene, polyethylene terephthalate (PET), polyvinyl chloride (PVC), polyamide, polycarbonate, polyurethane, polyester, natural and synthetic rubber, tires, filled polymers, composites, plastic alloys, and plastics dissolved in a solvent.

7. The method of claim 1, wherein:
    the reactor is at least one of a fluidized bed reactor, bubbling bed reactor, slurry reactor, rotating kiln reactor, and packed bed reactor.

8. The method of claim 1, wherein:
    at least a portion of the liquid product stream is directed to (A).

9. The method of claim 1, wherein:
    at least a portion of the liquid product stream is directed to (B).

10. The method of claim 1, wherein:
    at least a portion of the liquid product stream is directed to (C).

11. The method of claim 1, wherein:
    at least a portion of the liquid product stream is directed to (D).

12. The method of claim 1, wherein:
    at least a portion of the liquid product stream is directed to (E).

13. A method of producing olefins and aromatic compounds from a plastic feedstock, the method comprising:
    contacting a plastic feedstock and a catalyst composition at a temperature of from 420° C. to 730° C. within a reactor, said temperature being at least one of 1) a time-interval average catalyst bed temperature of from 420° C. to 730° C. wherein the time interval is 3 minutes or less from the start of the reaction; 2) a temperature in the reactor of from 420° C. to 730° C. at at least one location that is from 0.3 L or less from the at least one inlet where the plastic feedstock and the catalyst composition are introduced, where L is the length of the reactor flow path; and 3) a weight-averaged catalyst bed temperature in the reactor of from 420° C. to 730° C. weight-averaged at two or more locations that is from 0.3 L or less and/or to 0.3 L or greater from the at least one inlet where the plastic feedstock and the catalyst composition are introduced, where L is the length of the reactor flow path, and wherein the catalyst composition comprises a non-fresh fluidized catalytic cracking (FCC) catalyst and a ZSM-5 zeolite catalyst, wherein the amount of ZSM-5 zeolite catalyst makes up from 10 wt. % to 50 wt. % of the total weight of the non-fresh FCC catalyst and the ZSM-5 zeolite catalyst to simultaneously increase production of both light gas olefins and aromatics, the feedstock and the catalyst composition being at a catalyst-to-feed ratio of from 6 or greater;

allowing at least a portion of the plastic feedstock to be converted to products of at least one of olefins and aromatic compounds within the reactor, at least some of the products being contained in a liquid product stream; and directing at least a portion of the liquid product stream to one or more of the following (A)-(E), wherein:

(A) is a catalytic reformer under conditions suitable for producing aromatics to form reformed products containing aromatic compounds and non-aromatic compounds, and directing the reformed products to a separating unit to provide an aromatic-rich separated product and a non-aromatic-rich separated product from at least a portion of the reformed products and recycling the non-aromatic-rich product to the reactor;

(B) is a separation unit to provide an aromatic-rich separated product and a non-aromatic-rich separated product, and directing at least a portion of the non-aromatic-rich separated product to the reactor;

(C) is a hydroprocessing unit under conditions suitable for hydroprocessing to provide a hydroprocessed product and recycling at least a portion of the hydroprocessed product to the reactor;

(D) is a separation unit to provide an aromatic-rich separated product and a non-aromatic-rich separated product, and directing at least a portion of the non-aromatic-rich separated product as a feed to a hydroprocessing unit under conditions suitable for hydroprocessing to provide a hydroprocessed product and recycling at least a portion of the hydroprocessed product to the reactor; and (E) is a pyrolysis reactor to provide a liquid and gas pyrolysis product stream of which the liquid product is separated into an aromatics-rich product and a non-aromatics-rich product, the non-aromatic-rich product being recycled back to the reactor with or without being hydroprocessed prior to being recycled.

14. The method of claim 13, wherein:
the FCC catalyst is comprised of at least one of an X-type zeolite, a Y-type zeolite, mordenite, faujasite, nanocrystalline zeolites, MCM mesoporous materials, SBA-15, a silico-alumino phosphate, a gallophosphate, and a titanophosphate.

15. The method of claim 13, wherein:
the amount of ZSM-5 zeolite catalyst of the catalyst composition makes up from 30 wt. % to 45 wt. % of the total weight of the FCC catalyst and the ZSM-5 zeolite catalyst.

16. The method of claim 13, wherein:
at least a portion of the liquid product stream is directed to (A).

17. The method of claim 13, wherein:
at least a portion of the liquid product stream is directed to (B).

18. The method of claim 13, wherein:
at least a portion of the liquid product stream is directed to (C).

19. The method of claim 13, wherein:
at least a portion of the liquid product stream is directed to (D).

20. The method of claim 13, wherein:
at least a portion of the liquid product stream is directed to (E).

* * * * *